US010832564B2

(12) United States Patent
Subramanian et al.

(10) Patent No.: US 10,832,564 B2
(45) Date of Patent: Nov. 10, 2020

(54) BUILDING SECURITY SYSTEM WITH EVENT DATA ANALYSIS FOR GENERATING FALSE ALARM RULES FOR FALSE ALARM REDUCTION

(71) Applicants: Johnson Controls Technology Company, Auburn Hills, MI (US); Tyco Fire & Security GmbH, Neuhausen am Rheinfall (CH)

(72) Inventors: Gopi Subramanian, Boca Raton, FL (US); Christine Trainor, Boca Raton, FL (US); Jason Kapuschat, Churchville, NY (US); Michael C. Stewart, Deerfield Beach, FL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 150 days.

(21) Appl. No.: 15/947,725

(22) Filed: Apr. 6, 2018

(65) Prior Publication Data

US 2018/0315300 A1   Nov. 1, 2018

Related U.S. Application Data

(60) Provisional application No. 62/492,631, filed on May 1, 2017, provisional application No. 62/627,169, filed on Feb. 6, 2018.

(30) Foreign Application Priority Data

Dec. 28, 2017 (IN) .............................. 201741047029

(51) Int. Cl.
*G08B 29/18* (2006.01)
*G08B 31/00* (2006.01)
(Continued)

(52) U.S. Cl.
CPC ......... *G08B 29/185* (2013.01); *G06F 3/0481* (2013.01); *G06K 9/00771* (2013.01);
(Continued)

(58) Field of Classification Search
CPC .... G08B 29/185; G08B 31/00; G08B 19/005; G06F 3/0481; G06K 9/00771;
(Continued)

(56) References Cited

U.S. PATENT DOCUMENTS 3,868,669 A   2/1975   Minasy
5,748,086 A   5/1998   Bettine et al.
(Continued)

FOREIGN PATENT DOCUMENTS

EP   1 916 641 B1   4/2008
EP   3 101 636      12/2016
EP   3 139 359      3/2017

OTHER PUBLICATIONS

Stackexchange, How Do I Convert the Distance Between Two Lat/Long Points Into Feet/Meters?, https://math.stackexchange.com/questions/29157/how-do-i-convert-the-distance-between-two-lat-long-points-into-feet-meters, retrieved Jul. 6, 2018, 5 pages.
(Continued)

*Primary Examiner* — Brian A Zimmerman
*Assistant Examiner* — Kevin Lau
(74) *Attorney, Agent, or Firm* — Foley & Lardner LLP

(57) ABSTRACT

A system for generating a false alarm rule for preventing a false alarm that occurs at a building includes a processing circuit configured to receive, via a communications interface, building data including events for the building devices. The building events include a first non-alarm event, a second non-alarm event different than the first non-alarm event, and a false alarm event. The processing circuit is configured to generate an event sequence based on the events, where the
(Continued)

event sequence includes the first non-alarm event and the second non-alarm event and indicates a relationship between the first non-alarm event and the second non-alarm event that is indicative of a situation at the building that causes the false alarm event to occur. The processing circuit is configured to generate the false alarm rule based on the event sequence. The false alarm rule includes a recommendation for preventing the false alarm event from occurring.

20 Claims, 48 Drawing Sheets

(51) Int. Cl.
  *G06F 3/0481* (2013.01)
  *G06K 9/62* (2006.01)
  *G06K 9/00* (2006.01)
  *G08B 19/00* (2006.01)
(52) U.S. Cl.
  CPC ........... *G06K 9/626* (2013.01); *G06K 9/6278* (2013.01); *G08B 31/00* (2013.01); *G06K 9/6297* (2013.01); *G06K 2009/00738* (2013.01); *G08B 19/005* (2013.01)
(58) Field of Classification Search
  CPC .... G06K 9/626; G06K 9/6278; G06K 9/6297; G06K 2009/00738
  See application file for complete search history.

(56) References Cited

U.S. PATENT DOCUMENTS

| | | | |
|---|---|---|---|
| 5,917,409 A | 6/1999 | Wang | |
| 6,157,299 A | 12/2000 | Wang | |
| 6,166,633 A | 12/2000 | Wang | |
| 6,198,389 B1 | 3/2001 | Buccola | |
| 6,628,323 B1* | 9/2003 | Wegmann | G08B 13/19606 |
| | | | 348/143 |
| 7,218,217 B2 | 5/2007 | Adonailo et al. | |
| 7,302,481 B1 | 11/2007 | Wilson | |
| 9,384,656 B2 | 7/2016 | Patterson et al. | |
| 9,466,189 B2 | 10/2016 | Patterson et al. | |
| 10,147,307 B2 | 12/2018 | Patterson et al. | |
| 10,210,748 B2 | 2/2019 | Lamb et al. | |
| 10,359,771 B2 | 7/2019 | Trainor et al. | |
| 2002/0170002 A1 | 11/2002 | Steinberg et al. | |
| 2002/0190857 A1 | 12/2002 | Chicca | |
| 2004/0183666 A1 | 9/2004 | Wang | |
| 2004/0250133 A1 | 12/2004 | Lim | |
| 2006/0250231 A1 | 11/2006 | Wang et al. | |
| 2006/0291657 A1 | 12/2006 | Benson et al. | |
| 2010/0090822 A1 | 4/2010 | Benson et al. | |
| 2011/0032095 A1 | 2/2011 | Hicks, III | |
| 2011/0178977 A1 | 7/2011 | Drees | |
| 2012/0008819 A1* | 1/2012 | Ding | G06K 9/00335 |
| | | | 382/100 |
| 2013/0033375 A1 | 2/2013 | Doyle et al. | |
| 2013/0190095 A1 | 7/2013 | Gadher et al. | |
| 2014/0211002 A1 | 7/2014 | Lin et al. | |
| 2014/0266717 A1 | 9/2014 | Warren et al. | |
| 2016/0049071 A1 | 2/2016 | Beaver et al. | |
| 2017/0061783 A1* | 3/2017 | Nalukurthy | G08B 29/186 |
| 2017/0316680 A1 | 11/2017 | Lamb et al. | |
| 2018/0102045 A1 | 4/2018 | Simon | |
| 2018/0315299 A1 | 11/2018 | Subramanian et al. | |
| 2018/0315301 A1 | 11/2018 | Subramanian et al. | |
| 2018/0365593 A1 | 12/2018 | Galitsky | |
| 2018/0375444 A1 | 12/2018 | Gamroth | |

OTHER PUBLICATIONS

Invitation to Pay Additional Fees for International Application No. PCT/US2018/026611, dated Jun. 25, 2018, 13 pages.
Search Report for International Application No. PCT/US2018/026611, dated Aug. 17, 2018, 19 pages.

* cited by examiner

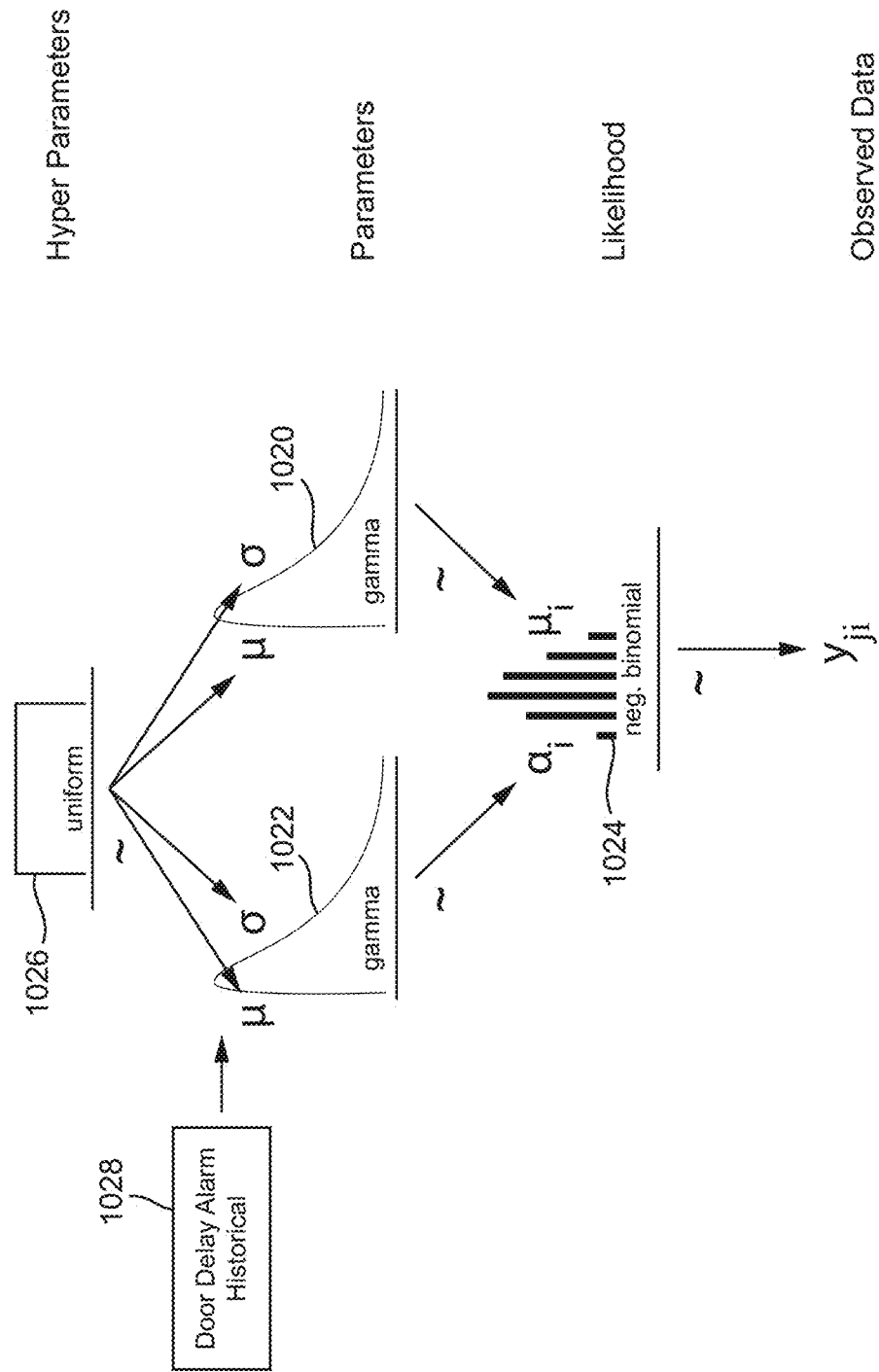

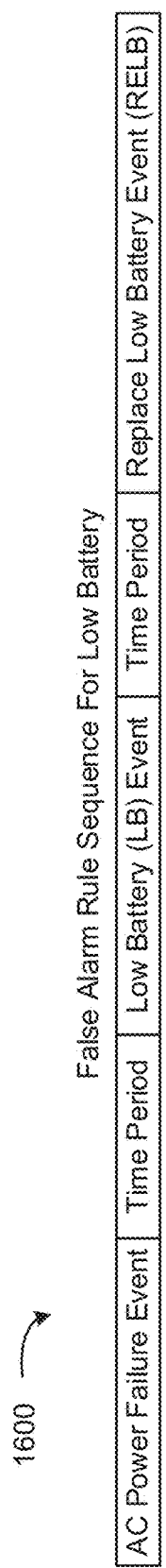
FIG. 16
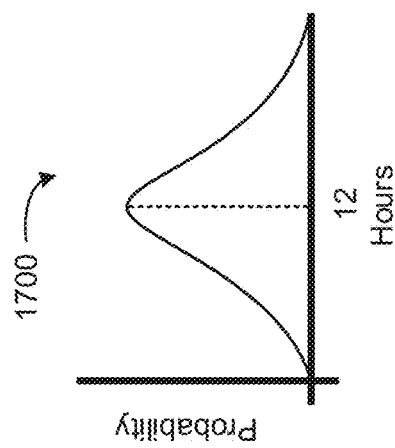
FIG. 17
FIG. 18

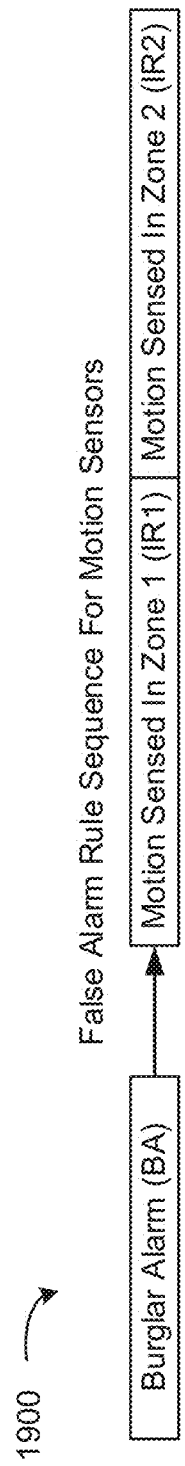
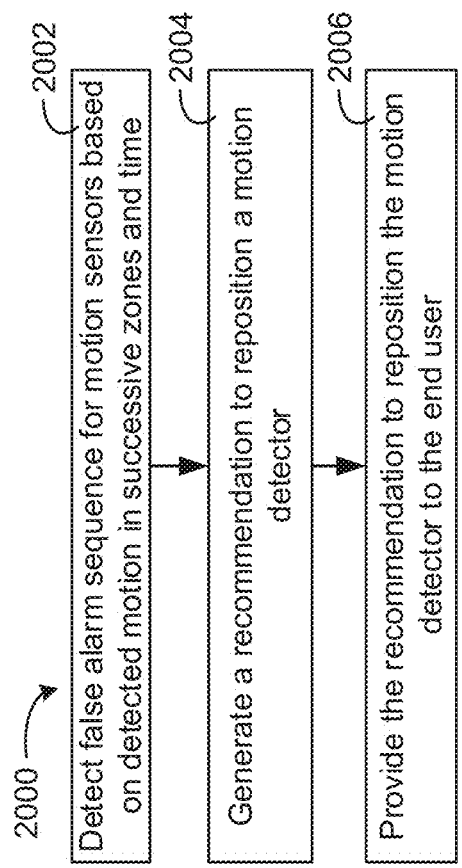
FIG. 19
FIG. 20

Spotlight Sites

Worst Performing 10 Sites — 3902

Worst Performing 10 Sites Trend Analysis — 3904

| Site | Rules This Week | Zone-Nodelay-Reprogram | Zone-Ddelay-Reprogram | Wrong-Door-Training | Panel-Training | Ground-Fault | Motion-Sensor-Adjustment | Unscheduled-CU | Branch |
|---|---|---|---|---|---|---|---|---|---|
| Store # 421 | 9 | 0 | 0 | 0 | 0 | 0 | 0 | 7 | 0 |
| Store # 290 | 0 | 0 | 0 | 0 | 0 | 0 | 0 | 0 | 0 |
| Store # 028 | 7 | 0 | 1 | 0 | 0 | 0 | 0 | 6 | 0 |
| Store # 918 | 7 | 0 | 0 | 0 | 0 | 0 | 0 | 7 | 0 |
| Store # 106 | 7 | 0 | 7 | 0 | 0 | 0 | 0 | 3 | 7 |
| Store # 773 | 7 | 0 | 4 | 0 | 0 | 0 | 0 | 3 | 0 |
| Store # 002 | 7 | 0 | 6 | 0 | 0 | 0 | 0 | 1 | 0 |
| Store # 555 | 0 | 0 | 0 | 0 | 0 | 0 | 0 | 4 | 1 |
| Store # 332 | 6 | 0 | 3 | 0 | 0 | 0 | 0 | 3 | 3 |
| Store # 511 | 6 | 0 | 0 | 0 | 0 | 0 | 0 | 0 | 1 |

FIG. 39

Place Order

| Executive Summary | Map | Spotlight Sites | Place Order | | User ID A |

Place Order

Select Rule: xxxxxxxxxxxxxx ▸

Order Successfully Sent

Place Order

| Name | Address | City | State | Zip | Alarm Count | Recommendation |
|---|---|---|---|---|---|---|
| Store # 592 | Address ABC | Flint | MI | 10507 | 1 | Reprogram zone "O/C-1" door delay to 30 seconds |
| Store # 012 | Address CDE | Hillside | IL | 60162 | 1 | Reprogram zone "O/C-1" door delay to 30 seconds |
| Store # 232 | Address EFG | Kent | WA | 98032 | 1 | Reprogram zone "O/C-1" door delay to 30 seconds |
| Store # 100 | Address HIJ | Kent | WA | 98032 | 1 | Reprogram zone "O/C-1" door delay to 30 seconds |
| Store # 332 | Address JKL | Costa Mesa | CA | 92627 | 1 | Reprogram zone "O/C-1" door delay to 30 seconds |
| Store # 109 | Address LMN | Hyattville | MD | 20787 | 1 | Reprogram zone "O/C-1" door delay to 30 seconds |
| Store # 986 | Address OPQ | Hyattville | MD | 20787 | 1 | Reprogram zone "O/C-1" door delay to 30 seconds |

Total Items: 7

Place Order

←-- Back to summary

ALARMS LIST    RECOMMENDATIONS    CONFIRM

Alarms List
Select an alarm from the list to approve recommendation

| door delay |
| ID: 5 Recommending: reprogram to 60 seconds |
| ID: 3 Recommending: reprogram to 60 seconds |
| ID: 3 Recommending: reprogram to 60 seconds |
| ID: 3 Recommending: reprogram to 60 seconds |
| ID: 5 Recommending: reprogram to 60 seconds |
| scheduling error |

☐ Show Work Order Alarms

Next >>

- Executive Summary
- Alarms
- Maps
- Recommendations
- Reports
- Users
- Work Orders
- Logout

BUILDING SECURITY SYSTEM WITH EVENT DATA ANALYSIS FOR GENERATING FALSE ALARM RULES FOR FALSE ALARM REDUCTION

CROSS-REFERENCE TO RELATED PATENT APPLICATIONS

This application claims the benefit of and priority to Indian Provisional Patent Application No. 2017/41047029 filed Dec. 28, 2017, U.S. Provisional Patent Application No. 62/492,631 filed May 1, 2017, and U.S. Provisional Patent Application No. 62/627,169 filed Feb. 6, 2018. The entire disclosure of each of these patent applications is incorporated by reference herein.

BACKGROUND

The present disclosure relates generally to building security systems of a building. The present disclosure relates more particularly to systems and methods for analyzing data generated by the building security systems to reduce false alarms of the building.

In a building, various building devices provide security monitoring and fire detection and response. A false alarm can be a serious problem for security or fire system. In some cases, the majority of the alarms (e.g., approximately 98%) generated by security or fire systems are false alarms. Responding to false alarms creates a heavy financial burden on customers, police departments, fire departments, and alarm system providers.

False alarms can, in some cases, be attributed to three preventable causes, user error, faulty equipment, and improper equipment installation. Examples of user error may be a user entering an incorrect keypad code into an alarm system, a user leaving a door or window open, or a user leaving objects near motion detectors. In some cases, the equipment itself is faulty. For example, the equipment may be reaching an end of life state and equipment parts may be wearing out or breaking. Regarding improper installation, motion detectors may not be installed in proper areas or placed at the proper heights.

SUMMARY

Event-Data Analysis

One implementation of the present disclosure is a system for generating a false alarm rule for preventing a false alarm that occurs at a building. The system includes a communications interface configured to receive building data from a plurality of building devices associated with the building, the building data including events and a processing circuit. The processing circuit is configured to receive, via the communications interface, the building data including the events of the building devices, where the events include a first non-alarm event, a second non-alarm event different than the first non-alarm event, and a false alarm event, generate an event sequence based on the events, where the event sequence includes the first non-alarm event and the second non-alarm event and indicates a relationship between the first non-alarm event and the second non-alarm event that is indicative of a situation at the building that causes the false alarm event to occur, and generate the false alarm rule based on the event sequence, wherein the false alarm rule includes a recommendation for preventing the false alarm event from occurring.

In some embodiments, the processing circuit is configured to provide, via the communications interface, the event sequence to a domain expert device of a domain expert and receive the recommendation for the event sequence from the domain expert via the domain expert device. In some embodiments, the processing circuit is configured to generate the false alarm rule based on the event sequence and further based on the recommendation received from the domain expert.

In some embodiments, the processing circuit is configured to select, via a classifier, the recommendation for the false alarm rule by selecting, based on the event sequence, the recommendation from a plurality of recommendations associated with a plurality of possible classifications of the classifier. In some embodiments, the processing circuit is configured to generate the false alarm rule based on the event sequence and further based on the recommendation selected via the classifier.

In some embodiments, the processing circuit is configured to receive, via the communications interface, second events from the building devices, determine, based on the second events, whether the false alarm rule is triggered, and provide the recommendation of the false alarm rule to a user via a user interface in response to determining that the false alarm rule is triggered.

In some embodiments, the processing circuit is configured to determine whether the false alarm rule is triggered by selecting, via a classifier, the false alarm rule from a plurality of false alarm rules based on the second events.

In some embodiments, the processing circuit is configured to generate the event sequence by performing a parameter search to group the events based on one or more characteristics of the events performing a sequence analysis on the grouped events to generate the event sequence.

In some embodiments, performing the sequence analysis includes performing at least one of a first order Markov chain analysis on the grouped events, a second Markov chain analysis on the grouped events, or a General Sequential Pattern (GSP) mining analysis on the grouped events.

In some embodiments, performing the parameter search to group the events includes at least one of searching the events based on a time window by identifying events that are associated with a time that is within the time window or performing the parameter search to group the events by searching the events based on a spatial distance window by identifying events that are associated with a location that is within the spatial distance window. In some embodiments, performing the parameter search based on the spatial distance window groups events that occur in a predefined area.

In some embodiments, the processing circuit is configured to receive first building data including first events associated with a first period of time, determine a number of times that the false alarm rule triggered during the first period of time based on the first building data, predict a number of times that the alarm rule will trigger in the future during a second period of time after the first period of time based on the number of times that the false alarm rule triggered during the first period of time, and generate an insight based on the predicted number of times the alarm rule will trigger in the future during the second period of time and provide the insight to a user via a user device.

In some embodiments, the processing circuit is configured to predict the number of times that the alarm rule will trigger in the future by performing a Bayesian analysis on the first building data associated with the first period of time.

Another implementation of the present disclosure is a method for generating a false alarm rule for preventing a false alarm that occurs at a building by one or more processing circuits. The method includes receiving, by the processing circuits, building data for building devices of the building, where the building data includes events of the building devices, wherein the events include a first non-alarm event, a second non-alarm event different than the first non-alarm event, and a false alarm event. The method includes generating, by the processing circuits, an event sequence based on the events, where the event sequence includes the first non-alarm event and the second non-alarm event and indicates a relationship between the first non-alarm event and the second non-alarm event that is indicative of a situation at the building that causes the false alarm event to occur. Furthermore, the method includes generating, by the processing circuits, the false alarm rule based on the event sequence, where the false alarm rule includes a recommendation for preventing the false alarm event from occurring.

In some embodiments, the method includes providing, by the one or more processing circuits, the event sequence to a domain expert device of a domain expert and receiving, by the one or more processing circuits, the recommendation for the event sequence from the domain expert via the domain expert device. In some embodiments, generating, by the processing circuits, the false alarm rule based on the event sequence includes generating the false alarm rule further based on the recommendation received from the domain expert.

In some embodiments, the method further includes selecting, by the one or more processing circuits via a classifier, the recommendation for the false alarm rule by selecting, based on the event sequence, the recommendation from a plurality of recommendations associated with a plurality of possible classifications of the classifier. In some embodiments, generating, by the processing circuits, the false alarm rule based on the event sequence includes generating the false alarm rule further based on the recommendation selected via the classifier.

In some embodiments, the method includes receiving, by the processing circuits, second events from the building devices, determining, by the processing circuits, whether the false alarm rule is triggered based on the second events, and providing, by the processing circuits, the recommendation of the false alarm rule to a user via a user interface in response to determining, by the one or more processing circuits, that the false alarm rule is triggered.

In some embodiments, determining, by the processing circuits, whether the false alarm rule is triggered includes selecting, via a classifier, the false alarm rule from a plurality of false alarm rules based on the second events.

In some embodiments, generating, by the processing circuits the event sequence includes performing a parameter search to group the events based on one or more characteristics of the events and performing a sequence analysis on the grouped events to generate the event sequence.

In some embodiments, performing the sequence analysis includes performing at least one of a first order Markov chain analysis on the grouped events, a second Markov chain analysis on the grouped events, or a General Sequential Pattern (GSP) mining analysis on the grouped events.

In some embodiments, performing the parameter search to group the events includes searching the events based on a time window by identifying events that are associated with a time that is within the time window or performing the parameter search to group the events by searching the events based on a spatial distance window by identifying events that are associated with a location that is within the spatial distance window, where performing the parameter search based on the spatial distance window groups events that occur in a predefined area.

Another implementation of the present disclosure is a non-transitory computer readable medium having machine instructions stored therein, the instructions being executable by a processor of a building management system to perform operations including receiving building data for building devices of the building, where the building data includes events of the building devices, where the events include a first non-alarm event, a second non-alarm event different than the first non-alarm event, and a false alarm event, generating an event sequence based on the events, where the event sequence includes the first non-alarm event and the second non-alarm event and indicates a relationship between the first non-alarm event and the second non-alarm event that is indicative of a situation at the building that causes the false alarm event to occur, generating the false alarm rule based on the event sequence, where the false alarm rule includes a recommendation for preventing the false alarm event from occurring, receiving second events from the building devices, determining whether the false alarm rule is triggered based on the second events, and providing the recommendation of the false alarm rule to a user via a user interface in response to determining that the false alarm rule is triggered.

In some embodiments, generating the event sequence includes performing a parameter search to group the events based on characteristics of the events, where performing the parameter search to group the events by searching the events based on a time window by identifying events that are associated with a time that is within the time window or performing the parameter search to group the events by searching the events based on a spatial distance window by identifying events that are associated with a location that is within the spatial distance window, wherein performing the parameter search based on the spatial distance window groups events that occur in a predefined area. In some embodiments, generating the event sequence includes performing a sequence analysis on the grouped events to generate the event sequence wherein performing the sequence analysis includes performing at least one of a first order Markov chain analysis on the grouped events, a second Markov chain analysis on the grouped events, or a General Sequential Pattern (GSP) mining analysis on the grouped events.

Recommendations and Self-Healing

One implementation of the present disclosure is a system for preventing a false alarm that occurs at a building. The system includes a communications interface configured to receive building data from building devices associated with the building, wherein the building data including events and a processing circuit configured to receive, via the communications interface, the building data including the events for the building devices. The processing circuit is configured to determine, based on the events, whether a false alarm rule has triggered, where the false alarm rule indicates relationships between one or more of the events that is indicative of a situation at the building site that causes the false alarm. The processing circuit is configured to generate a parameter update for at least one of the plurality of building devices in response to determining that the false alarm rule has triggered and implement the parameter update by providing, via the communications interface, the parameter update to the at least one of the building devices.

In some embodiments, the false alarm rule is associated with a recommendation for preventing the false alarm from occurring. In some embodiments, the processing circuit is configured to provide the recommendation to a user via a user device in response to determining that the false alarm rule has triggered.

In some embodiments, the building devices include a battery powered device powered by a battery and a main power source, where the false alarm rule is a battery replacement false alarm rule. In some embodiments, the processing circuit is configured to determine, based on the events, whether the battery replacement false alarm rule has triggered for the battery powered device. In some embodiments, the processing circuit is configured to generate, based on historical battery powered device data, a probability distribution identifying a probability for a time length between a main power failure event and a low battery event in response to the battery replacement false alarm rule triggering for the battery powered device, where the battery replacement data indicates a plurality of times between the main power failure event and the low battery event. In some embodiments, the processing circuit is configured to generate the replacement time window based on the probability distribution and cause the recommendation to include an indication of the replacement time window.

In some embodiments, the false alarm rule is a door delay false alarm rule including a sequence of events including a door opening event followed by an alarm event followed by a key code entering event. In some embodiments, the processing circuit is configured to determine whether the door delay false alarm rule has triggered based on the events and the sequence of events of the door delay false alarm rule, generate a probability distribution based on historical door delay data, wherein the probability distribution indicates probabilities of times between the door opening event and the key code entering event, wherein the historical door delay data indicates a plurality of lengths of time between the door opening event and the key code entering event, determine a spread value for the probability distribution and determine whether the spread value is greater than a predefined threshold, generate the parameter update based on the probability distribution in response to determining that the spread value is greater than the predefined threshold, wherein the parameter update is a door delay time and cause the recommendation to include an indication of the door delay time, and cause the recommendation to include an indication to perform maintenance on at least one of the building devices in response to determining that the spread value is less than the predefined threshold.

In some embodiments, the false alarm rule is a hardware failure rule, where the hardware failure rule includes a sequence of events indicative of the one of building devices failing. In some embodiments, the processing circuit is configured to determine whether the one of the building devices will fail based on the events and the sequence of events of the hardware failure rule and cause the recommendation to include an indication to perform maintenance on the one building device in response to determining that the piece of building equipment will fail.

In some embodiments, the false alarm rule is a motion sensor false alarm rule, where the motion sensor rule includes a sequence of events including a burglar alarm event followed by a first motion detection event in a first zone followed by a second motion detection event in a second zone, wherein the first zone and the second zone are successive zones of the building. In some embodiments, the processing circuit is configured to determine whether the motion sensor false alarm rule has triggered based on the events and the sequence of events of the motion sensor rule and cause the recommendation to include an indication to reposition alarm sensors associated with the burglar alarm event in response to the motion sensor false alarm rule triggering.

In some embodiments, the false alarm rule is an employee alarm trip rule, where the employee alarm trip rule includes a sequence of events including a burglar alarm event in a first zone of the building followed by a zone bypass event of the first zone. In some embodiments, the processing circuit is configured to determine whether the employee alarm trip rule has triggered based on the events and the sequence of events of the employee alarm trip rule and cause the recommendation to include an indication that an employee with an incorrect password is opening the building in response to the employee alarm trip rule triggering.

In some embodiments, the processing circuit is configured to generate a ground fault time window and a ground fault threshold based on historical ground fault data for one of the building devices, where the historical ground fault data includes a multiple ground fault events and a time associated with each of the ground fault events. In some embodiments, the processing circuit is configured to determine an actual number of ground fault events that occur within the ground fault time window based on the events of the building data and determine whether the actual number of ground fault events is greater than the ground fault threshold. In some embodiments, the processing circuit is configured to cause the recommendation to include an indication to perform maintenance on the one of the building devices in response to determining that the actual number of ground fault events is greater than the ground fault threshold.

In some embodiments, the building devices include an expansion module and a security panel, where the expansion module is configured to add additional device connections to the security panel, where the false alarm rule is an expansion module false alarm rule. In some embodiments, the processing circuit is configured to generate a restore time period based on historical expansion module data. In some embodiments, the restore time period indicates a time period which the expansion module must generate a restore event. In some embodiments, the historical expansion module data indicates lengths of time between an expansion module failure event and the expansion module restore event. In some embodiments, the processing circuit is configured to determine whether the expansion module generates a restore event within the time period after generating the expansion module failure event and cause the recommendation to include an indication to perform maintenance on the expansion module in response to determining that the expansion module has not generated the restore event within the time period.

In some embodiments, the processing circuit is configured to determine a number of security phone calls to the building and a number of missed security phone calls to the building based on the building data, determine a number of police dispatches associated with a false alarm and the missed security calls, and generate an indication of an improved call tree structure for the building by comparing the call tree structure of the building to call tree structures of other buildings in response to determining that the number of police dispatches associated with the false alarm and the missed security calls is greater than a predefined amount. In some embodiments, the processing circuit is configured to cause the recommendation to include the indication of the improved call tree structure.

In some embodiments, the recommendation indicates the parameter update. In some embodiments, the processing circuit is configured to filter the recommendation based on a set of filter parameters to determine whether the recommendation is approved for automatic implementation or requires manual approval, where the filter parameters indicate a first recommendation list that indicates a first plurality of recommendations that can be automatically implemented without user approval and a second recommendation list that includes a second plurality of recommendations that require user approval. In some embodiments, the processing circuit is configured to automatically implement the recommendation in response to determining that the recommendation is approved for automatic implementation by determining that the recommendation is associated with the first recommendation list and provide, via a user interface, a prompt to a user to approve the recommendation in response to determining that the recommendation requires manual approval by determining that the recommendation is associated with the second recommendation list.

In some embodiments, the processing circuit is configured to receive, via the user interface, an update for the filter parameters from the user, where the update for the filter parameters indicates that the recommendation is approved for automatic implementation and indicates that the recommendation should be associated with the first recommendation list. In some embodiments, the processing circuit is configured to update the filter parameters with the received update for the filter parameters to include the recommendation in the first recommendation list.

Another implementation of the present disclosure is a method for preventing a false alarm that occurs at a building by one or more processing circuits. The method includes receiving, by the one or more processing circuits the building data including the events for the building devices and determining, by the one or processing circuits, based on the events, whether a false alarm rule has triggered, where the false alarm rule indicates relationships between one or more of the events that is indicative of a situation at the building site that causes the false alarm. The method includes generating, by the one or more processing circuits, a parameter update for at least one of the plurality of building devices in response to determining that the false alarm rule has triggered and implementing, by the one or more processing circuits, the parameter update by providing, via the communications interface, the parameter update to the at least one of the building devices.

In some embodiments, the false alarm rule is associated with a recommendation for preventing the false alarm from occurring. In some embodiments, the method includes providing, by the one or more processing circuits, the recommendation to a user via a user device in response to determining that the false alarm rule has triggered.

In some embodiments, the false alarm rule is a hardware failure rule, where the hardware failure rule includes a sequence of events indicative of the one of building devices failing. In some embodiments, the method further includes determining, by the one or more processing circuits, whether the one of the building devices will fail based on the events and the sequence of events of the hardware failure rule and causing, by the one or more processing circuits, the recommendation to include an indication to perform maintenance on the one building device in response to determining that the piece of building equipment will fail.

In some embodiments, the recommendation indicates the parameter update, wherein the method further includes filtering, by the one or more processing circuits, the recommendation based on a set of filter parameters to determine whether the recommendation is approved for automatic implementation or requires manual approval, wherein the filter parameters indicate a first recommendation list that indicates a first plurality of recommendations that can be automatically implemented without user approval and a second recommendation list that includes a second plurality of recommendations that require user approval, automatically implementing, by the one or more processing circuits, the recommendation in response to determining that the recommendation is approved for automatic implementation by determining that the recommendation is associated with the first recommendation list, and providing, by the one or more processing circuits, via a user interface, a prompt to a user to approve the recommendation in response to determining that the recommendation requires manual approval by determining that the recommendation is associated with the second recommendation list.

In some embodiments, the method includes receiving, by the one or more processing circuits, via the user interface, an update for the filter parameters from the user, where the update for the filter parameters indicates that the recommendation is approved for automatic implementation and indicates that the recommendation should be associated with the first recommendation list and updating, by the one or more processing circuits, the filter parameters with the received update for the filter parameters to include the recommendation in the first recommendation list.

Another implementation of the present disclosure is a non-transitory computer readable medium having machine instructions stored therein, the instructions being executable by a processor of a building management system to perform operations including receiving the building data including the events for the building devices. The operations include determining, based on the events, whether a false alarm rule has triggered, where the false alarm rule indicates relationships between one or more of the events that is indicative of a situation at the building site that causes the false alarm, wherein the false alarm rule is associated with a recommendation for preventing the false alarm from occurring. The operations include generating a parameter update for at least one of the plurality of building devices in response to determining that the false alarm rule has triggered, implementing the parameter update by providing, via the communications interface, the parameter update to the at least one of the building devices, and providing the recommendation to a user via a user device in response to determining that the false alarm rule has triggered.

In some embodiments, the recommendation indicates the parameter update. In some embodiments, the operations further include filtering the recommendation based on a set of filter parameters to determine whether the recommendation is approved for automatic implementation or requires manual approval, where the filter parameters indicate a first recommendation list that indicates a first plurality of recommendations that can be automatically implemented without user approval and a second recommendation list that includes a second plurality of recommendations that require user approval. In some embodiments, the operations include automatically implementing the recommendation in response to determining that the recommendation is approved for automatic implementation by determining that the recommendation is associated with the first recommendation list and providing, via a user interface, a prompt to a user to approve the recommendation in response to determining that the recommendation requires manual approval by determining that the recommendation is associated with the second recommendation list.

In some embodiments, the operations further include receiving, via the user interface, an update for the filter parameters from the user, wherein the update for the filter parameters indicates that the recommendation is approved for automatic implementation and indicates that the recommendation should be associated with the first recommendation list and updating the filter parameters with the received update for the filter parameters to include the recommendation in the first recommendation list.

User Presentation

One implementation of the present disclosure is a system for determining and presenting false alarm reduction information to a user. The system includes a processing circuit configured to determine addressable false alarms by determining, based on events of building devices of a building and event sequences of one or more false alarm rules, whether the one or more false alarm rules are triggered, where the one or more false alarm rules each include at least one of the event sequences, where each of the event sequences indicates a relationship between a first non-alarm event and a second non-alarm event that is indicative of a situation at the building that causes one of the addressable false alarms. The processing circuit is configured to generate recommendations based on the triggered false alarm rules where the recommendations prompt the user to rectify situations at the building that cause the addressable false alarms. The processing circuit is configured to generate a user interface including an indication of the addressable false alarms and the plurality of recommendations and cause a display of a user device to display the user interface.

In some embodiments, the processing circuit is configured to generate a number of recommendations based on the plurality of recommendations, generate a recommendation meter indicating the number of recommendations, and cause the user interface to include the recommendation meter.

In some embodiments, the processing circuit is configured to record a number of the addressable false alarms over a period of time by recording the number of the addressable false alarms at a plurality of points in time over the period of time, generate an addressable false alarm trend including an indication of the number of addressable false alarms at each of the points in time, and cause the user interface to include the addressable false alarm trend.

In some embodiments, the processing circuit is configured to generate a progress window including indications of a first number of work orders for the addressable false alarms, a first number of alarms, and a first number of police dispatches associated with a first time period and a second number of work orders for the addressable false alarms, a second number of alarms, and a second number police dispatches associated with a second time window occurring after the first time window. In some embodiments, the processing circuit is configured to cause the user interface to include the progress window.

In some embodiments, the processing circuit is configured to generate a forecast window indicating a first predicted number of work orders for the addressable false alarms associated with a first future time period, a predicted first number of alarms associated with the first future time period, and a first number of police dispatches associated with the first future time period and a predicted second number of work orders for the addressable false alarms associated with a second future time period following the first future time period, a predicted second number of alarms associated with the second future time period, and a predicted second number of police dispatches associated with the second future time period. In some embodiments, the processing circuit is configured to cause the user interface to include the forecast window.

In some embodiments, the processing circuit is configured to generate a recommendations interface including an indication of each type of recommendation of the recommendations and An indication of specific recommendations of the recommendations for each type of recommendation. In some embodiments, the processing circuit is configured to cause the display of the user device to display the recommendations interface.

In some embodiments, the processing circuit is configured to generate an alarm heat map interface including an indication of a number of alarms associated with geographic regions, where the number of alarms include a number of alarms for other buildings and a number of alarms for the building, where the building and the buildings are associated with a particular entity. In some embodiments, the processing circuit is configured to cause the display of the user device to display the alarm heat map.

In some embodiments, the processing circuit is configured to receive an interaction with one of the geographic regions of the alarm heat map interface from the user device and responsive to receiving the interaction, generate a scaled alarm map displaying a scaled view of locations of at least one of the plurality of other buildings and the building and a number of addressable alarms associated with the at least one of the plurality of other buildings and the building.

In some embodiments, the processing circuit is configured to generate a group cluster by selecting other buildings with characteristics similar to characteristics of the building, generate a performance metric for the building based on a comparison of a risk score of the other buildings of the group cluster and a risk score of the building, and cause the user interface to include an indication of the performance metric.

In some embodiments, the processing circuit is configured to generate the risk score of the plurality of other buildings of the group cluster by receiving a number of addressable false alarms and a number of total alarms for each of the plurality of other buildings of the group cluster and generate the risk score for the plurality of other buildings of the group cluster based on the number of addressable false alarms and the number of total alarms for each of the plurality of other buildings. In some embodiments, the processing circuit is configured to generate the risk score for the building by: receiving a number of total alarms for the building, determining a number of addressable false alarms for the building based on the addressable false alarms, and generating the risk score for the building based on the number of addressable false alarms for the building and the number of total alarms for the building.

Another implementation of the present disclosure is a method for determining and presenting false alarm reduction information to a user by one or more processing circuits. The method includes determining, by the one or more processing circuits, addressable false alarms by determining, based on events of building devices of a building and event sequences of one or more false alarm rules, whether the one or more false alarm rules are triggered, where the one or more false alarm rules each include at least one of the event sequences, where each of the event sequences indicates a relationship between a first non-alarm event and a second non-alarm event that is indicative of a situation at the building that causes one of the addressable false alarms. The method includes generating, by the one or more processing circuits, recommendations based on the triggered false alarm rules, where the recommendations prompt the user to rectify situations at the building that cause the addressable false alarms. The method includes generating, by the one or more processing circuits, a user interface including an indication of the addressable false alarms and the plurality of recommendations and causing, by the one or more processing circuits, a display of a user device to display the user interface.

In some embodiments, the method includes generating, by the one or more processing circuits, a number of recommendations based on the plurality of recommendations, generating, by the one or more processing circuits, a recommendation meter indicating the number of recommendations, and causing, by the one or more processing circuits, the user interface to include the recommendation meter.

In some embodiments, the method includes recording, by the one or more processing circuits, a number of the addressable false alarms over a period of time by recording the number of the addressable false alarms at a plurality of points in time over the period of time, generating, by the one or more processing circuits, an addressable false alarm trend including an indication of the number of addressable false alarms at each of the points in time, and causing, by the one or more processing circuits, the user interface to include the addressable false alarm trend.

In some embodiments, the method includes generating, by the one or more processing circuits, a recommendations interface including an indication of each type of recommendation of the recommendations and an indication of specific recommendations of the recommendations for each type of recommendation. In some embodiments, the method includes causing, by the one or more processing circuits, the display of the user device to display the recommendations interface.

In some embodiments, the method includes generating, by the one or more processing circuits, an alarm heat map interface including an indication of a number of alarms associated with a plurality of geographic regions, where the number of alarms include a number of alarms for other buildings and a number of alarms for the building, where the building and the plurality of buildings are associated with a particular entity. In some embodiments, the method includes causing, by the one or more processing circuits, the display of the user device to display the alarm heat map.

In some embodiments, the method includes receiving, by the one or more processing circuits, an interaction with one of the plurality of geographic regions of the alarm heat map interface from the user device, responsive to receiving the interaction, generating, by the one or more processing circuits, a scaled alarm map displaying a scaled view of locations of at least one of the plurality of other buildings and the building and a number of addressable alarms associated with the at least one of the plurality of other buildings and the building.

In some embodiments, the method includes generating, by the one or more processing circuits, a group cluster by selecting a plurality of other buildings with characteristics similar to characteristics of the building, generating, by the one or more processing circuits, a performance metric for the building based on a comparison of a risk score of the plurality of other buildings of the group cluster and a risk score of the building, and causing, by the one or more processing circuits, the user interface to include an indication of the performance metric.

In some embodiments, the method includes generating, by the one or more processing circuits, the risk score of the plurality of other buildings of the group cluster by receiving a number of addressable false alarms and a number of total alarms for each of the plurality of other buildings of the group cluster and generating the risk score for the plurality of other buildings of the group cluster based on the number of addressable false alarms and the number of total alarms for each of the plurality of other buildings. In some embodiments, the method includes generating, by the one or more processing circuits, the risk score for the building by receiving a number of total alarms for the building, determining a number of addressable false alarms for the building based on the addressable false alarms, and generating the risk score for the building based on the number of addressable false alarms for the building and the number of total alarms for the building.

Another implementation of the present disclosure is a non-transitory computer readable medium having machine instructions stored therein, the instructions being executable by a processor of a building management system to perform operations including determining addressable false alarms by determining, based on events of building devices of a building and event sequences of one or more false alarm rules, whether the one or more false alarm rules are triggered, where the one or more false alarm rules each include at least one of the event sequences, where each of the event sequences indicates a relationship between a first non-alarm event and a second non-alarm event that is indicative of a situation at the building that causes one of the addressable false alarms. The operations include generating a plurality of recommendations based on the triggered false alarm rules, wherein the recommendations prompt the user to rectify situations at the building that cause the addressable false alarms, generating a user interface including an indication of the addressable false alarms and the plurality of recommendations, and recording a number of the addressable false alarms over a period of time by recording the number of the addressable false alarms at a plurality of points in time over the period of time. The operations further include generating an addressable false alarm trend including an indication of the number of addressable false alarms at each of the points in time, causing the user interface to include the addressable false alarm trend, and causing a display of a user device to display the user interface.

In some embodiments, the operations further include generating a group cluster by selecting a plurality of other buildings with characteristics similar to characteristics of the building. In some embodiments, the operations include generating the risk score of the plurality of other buildings of the group cluster by receiving a number of addressable false alarms and a number of total alarms for each of the plurality of other buildings of the group cluster and generating the risk score for the plurality of other buildings of the group cluster based on the number of addressable false alarms and the number of total alarms for each of the plurality of other buildings. In some embodiments, the operations include generating the risk score for the building by receiving a number of total alarms for the building and determining a number of addressable false alarms for the building based on the addressable false alarms, generating the risk score for the building based on the number of addressable false alarms for the building and the number of total alarms for the building, and generating a performance metric for the building based on a comparison of a risk score of the plurality of other buildings of the group cluster and a risk score of the building. In some embodiments, the operations include causing the user interface to include an indication of the performance metric.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 10B is a diagram of a Bayesian model specification that can be used in the process of FIG. 10A to generate the prediction of future alarms triggering, according to an exemplary embodiment.

FIG. 16 is a diagram of a false alarm rule sequence for a low battery, according to an exemplary embodiment.

FIG. 17 is a probability distribution indicating an optimal time period to replace the battery after a power failure event, according to an exemplary embodiment.

FIG. 18 is a flow diagram of a process for detecting the false alarm rule sequence for the low battery of FIG. 16 and generating a recommendation based on the optimal time period of FIG. 17, according to an exemplary embodiment.

FIG. 19 is a false alarm rule sequence for motion sensors, according to an exemplary embodiment.

FIG. 20 is a flow diagram of a process for detecting the false alarm rule sequence for motion sensors of FIG. 19 and generating a recommendation to reduce false alarms associated with the motion sensors, according to an exemplary embodiment.

FIG. 39 is an interface displaying security information for ten of the worst performing building sites for multiple buildings associated with an entity, according to an exemplary embodiment.

FIG. 40 is an order interface for ordering maintenance based on a triggered false alarm rule, according to an exemplary embodiment.

FIG. 44 is an alarms interface displaying multiple addressable false alarms, according to an exemplary embodiment.

FIG. 46 is a recommendation interface for updating parameters of a security system of a building to avoid false alarms, according to an exemplar embodiment.

FIG. 47 is a reports interface for reporting security information for one or more building sites, according to an exemplary embodiment.

FIG. 48 is a work order interface allowing a user to review multiple work orders for one or more building sites, according to an exemplary embodiment.

DETAILED DESCRIPTION

Overview

Figure 1:
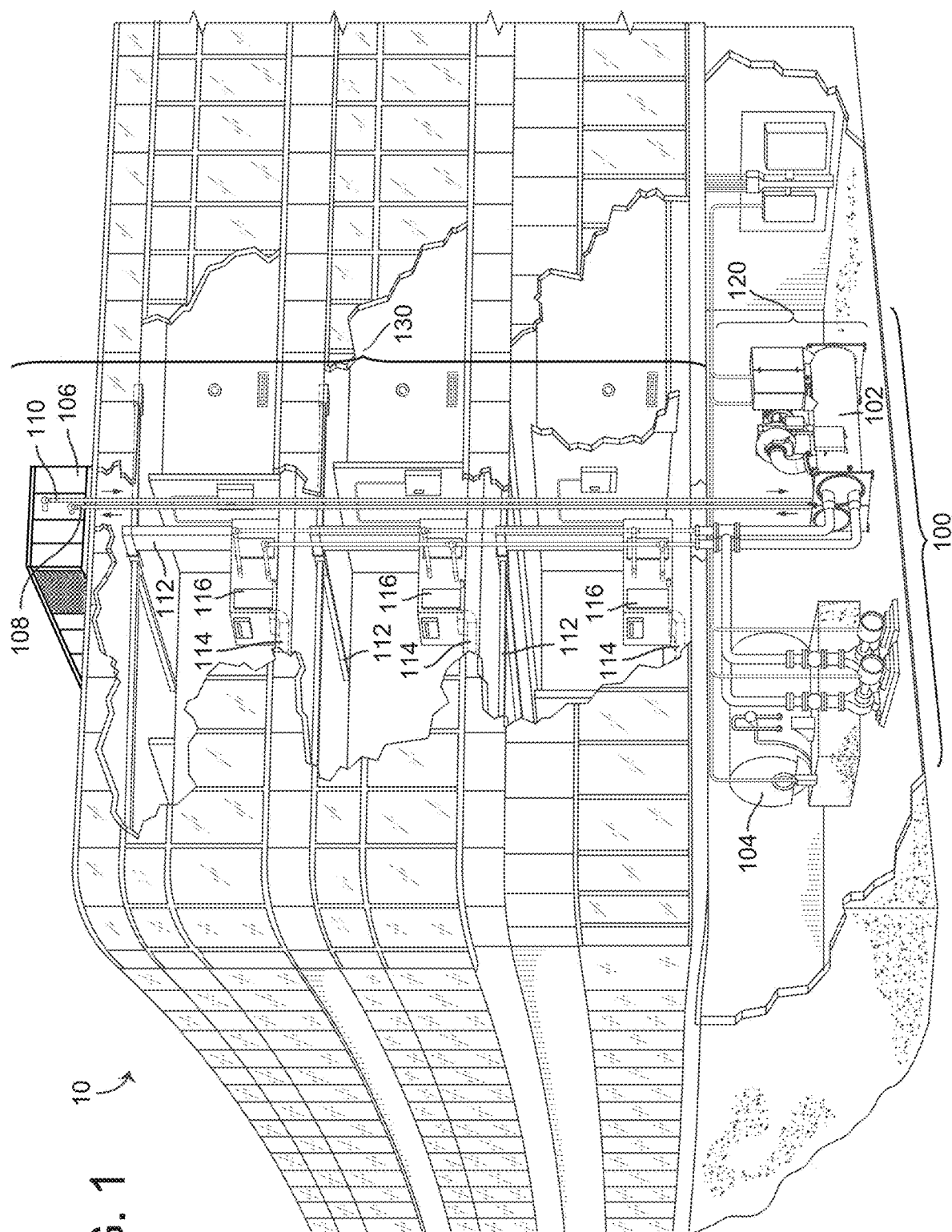
FIG. 1 is a drawing of a building equipped with a HVAC system, according to an exemplary embodiment.

Referring generally to the FIGURES, systems and methods are shown for false alarm reduction for intrusion, fire, and HVAC systems, according to various exemplary embodiments. Building site operators may be unable to distinguish between a true alarm and a false alarm even though the majority of alarms (e.g., approximately 98%) may be false alarms. Operators of a building may be required to react to all alarms as if they are true alarms. However, in reacting to all alarms as if they are true (e.g., calling police, fire, ambulance, etc.), resources may be wasted since the vast majority of the alarms are false.

Various factors can cause false alarms. Some of these factors are system configuration related factors, zone change related factors, users being added or removed to a security system, personal identification codes (PIC) changing, call trees changing, passive infrared (PIR) sensor sensitivity levels, equipment settings or user interactions with equipment, smoke alarms locations (e.g., being located to close to a vent), thermostat locations (e.g., a thermostat being located in a poor location), etc. Furthermore, the particular environment of the building may have active remodeling, floor plan and/or marketing updates, variations in weather, new employees being trained, employee seasonality churn (e.g., temporary and/or seasonal employees) all of which may influence the number of false alarms in a building site. Furthermore, security systems themselves can fail, tolerances be set incorrect, configurations may be incorrect, and security sensors and devices may be at an end of life state.

Data insights provided by the systems and methods discussed herein can help security teams prepare building policies and/or perform maintenance that reduces the number of false alarms at the building. The false alarm reduction as discussed herein, can prevent staff from worrying about false alarms and helps staff respond to alarms with the knowledge that they are true alarms. The systems and methods can provide equipment maintenance and/or replacement recommendations to pre-empt system failures and reduce false alarms that may occur from faulty equipment. Furthermore, the systems and methods can generate recommendations to improve employee training. For example, the systems and methods can determine that employees do not have a PIC for system disarming or are using an incorrect PIC and can generate a recommendation to train employees to use correct PICs. By generating insights into the contributors of false alarms, security teams can optimize their resources, policies, training, and metrics to reduce the number of false alarms that may occur at a building.

The systems and methods discussed herein can aggregate system data in a server to perform false alarm reduction analysis on an aggregate set of system data. The systems and methods discussed herein can be applied to a single site or multiple sites so that data can be collected and analyzed for one or multiple sites. Furthermore, the systems and methods can be implemented either on-premises or off-premises. Since the analysis can be performed off-premises in a cloud server, no additional site level equipment may be required to implement the systems and methods described herein.

Data intelligence e.g., data mining, machine learning, statistics, signal and network theories, can be used to derive actionable insights from raw data of a building to prevent false alarms. The data intelligence systems and methods described herein may start with the signal data, events, emanating from the sensors of intrusion, fire, or HVAC systems. The systems and methods can build upon the events by adding contextual information. The context can include spatial, time based, and/or neighbor based context that can be used to arrive at improved data representations that are robust and amenable for further processing by machine learning/data mining methods. Based on the enhanced data, the systems and methods described herein can employ an ensemble of techniques to derive actionable insights for reducing the number of false alarms that occur at a building.

The systems and methods disclosed herein can assess and reduce false alarms by analyzing event patterns in data collected from a building to identify and resolve situations at a building that are causing false alarms. The systems and methods described herein can continuously monitor and detect event patterns indicative of situations that cause false alarms and help to prevent false alarms by generating recommendations based on the event patterns that indicate various building changes to make to prevent the false alarms from occurring in the future.

In some test implementations of the systems and methods discussed herein, the systems and methods determined updated door entry and/or exit delay times. At some buildings, false alarms were reduced by 2,000 false alarms a week due to reprogramming entry and/or exit delay times. Other buildings experienced a reduction of approximately 850 false alarms per week due to reprogramming entry and/or exit delay times. At some sites, scheduling issues were corrected which resulted in 512 false alarms reduced per week.

Building Management System and HVAC System

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
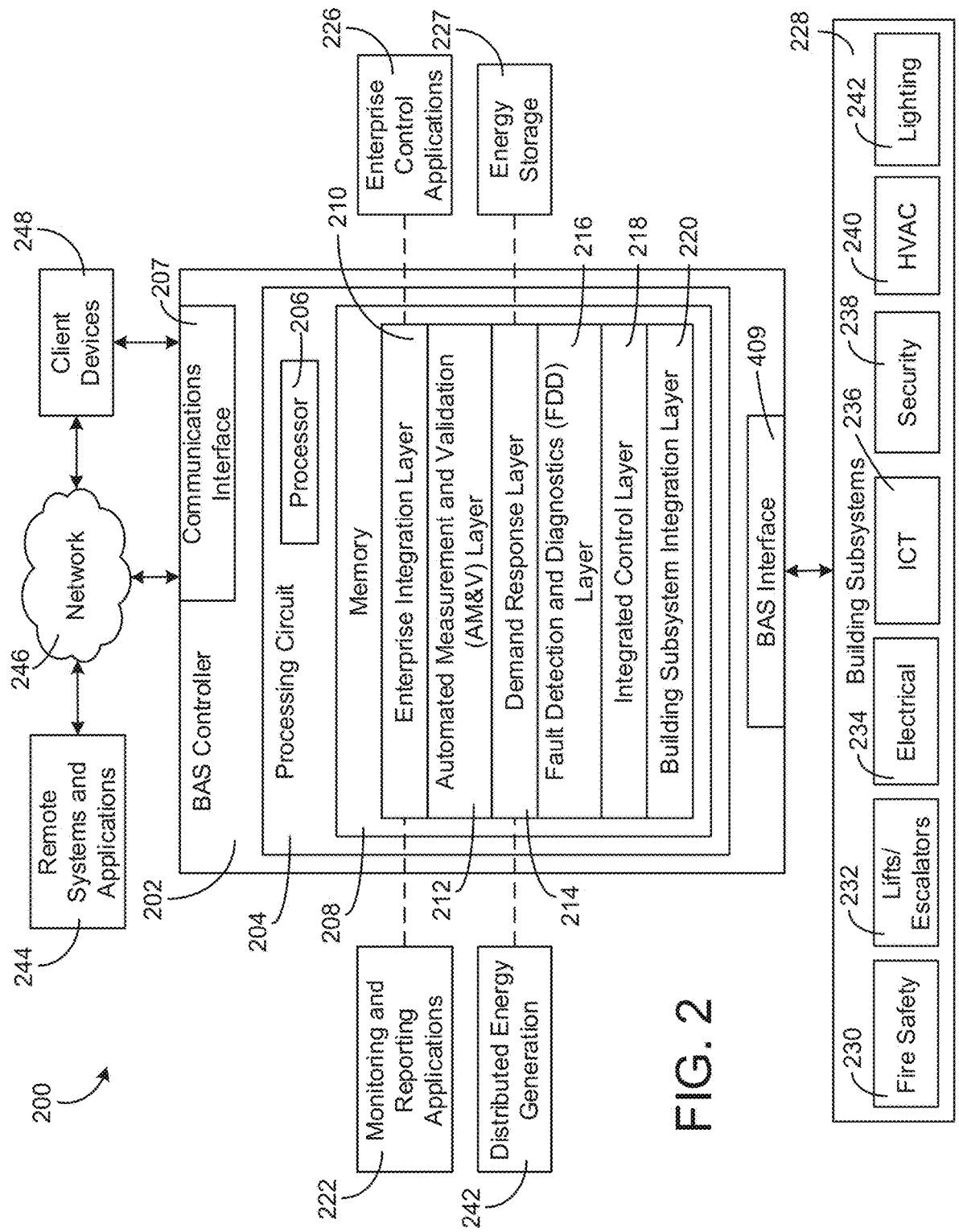
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 266 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 266 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 402 and includes computer code for executing (e.g., by processing circuit 204 and/or processor 206) one or more processes described herein.

Figure 4:
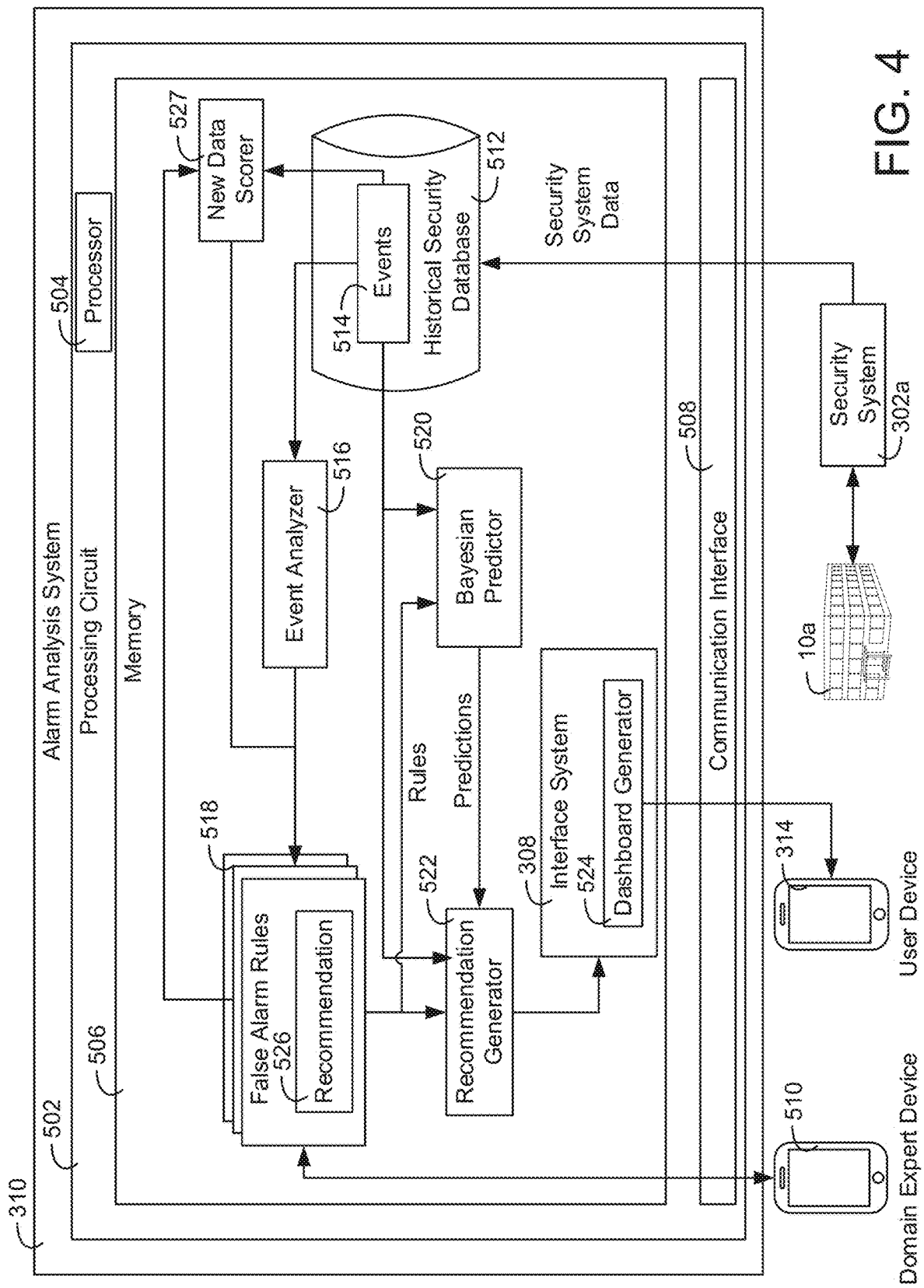
FIG. 4 is a block diagram of a cloud implemented alarm analysis system for analyzing event data to determine false alarm rules, according to an exemplary embodiment.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 4 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration layer 220. Layers 210-220 can be configured to receive inputs from building subsystems 228 and other data sources, determine optimal control actions for building subsystems 228 based on the inputs, generate control signals based on the optimal control actions, and provide the generated control signals to building subsystems 228. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translates communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

False Alarm Reduction Based on Security Data Pattern Analysis

Figure 3:
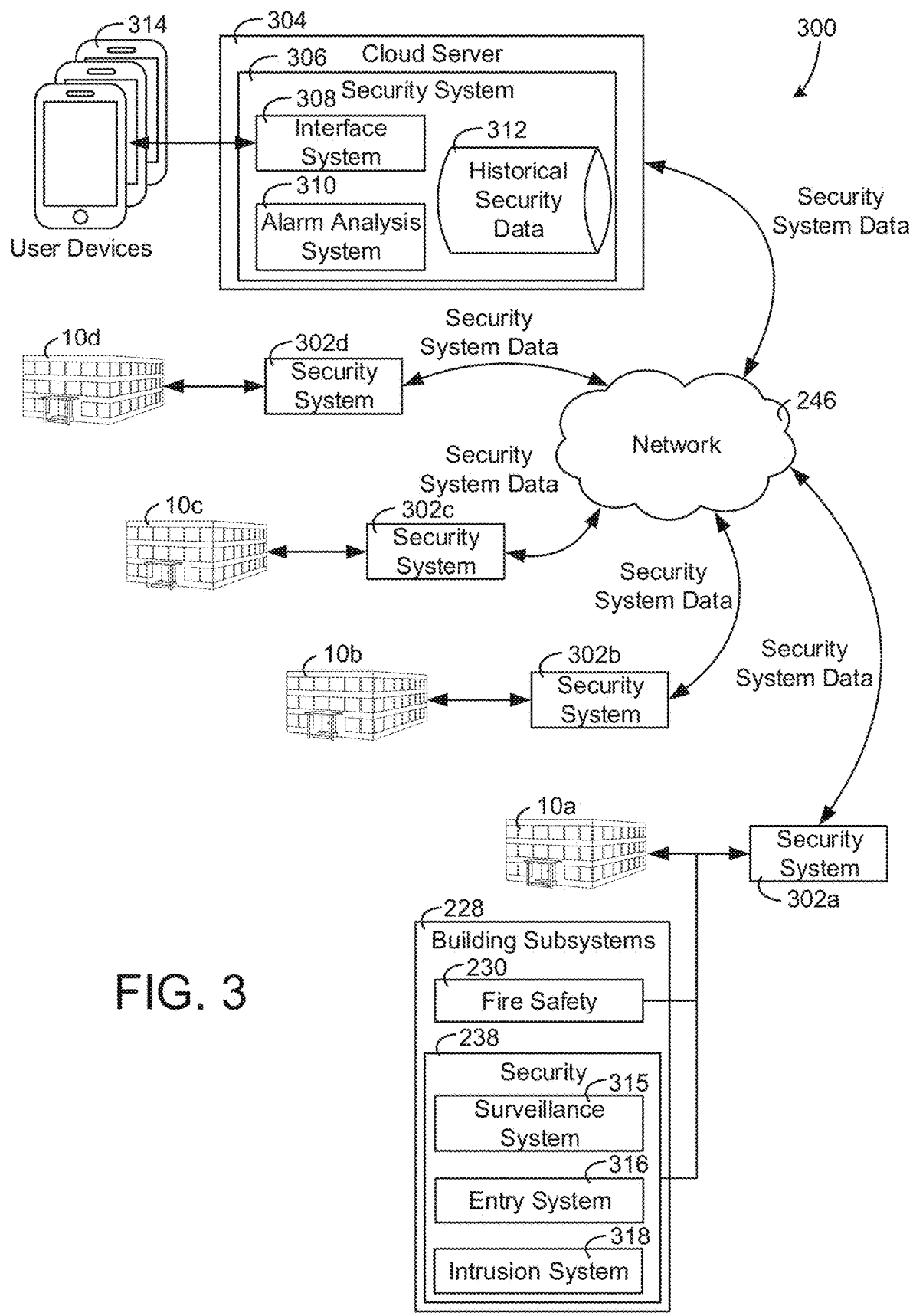
FIG. 3 is a block diagram of building security systems for multiple buildings communicating with a cloud based security system, according to an exemplary embodiment.

Referring now to FIG. 3, a security system 300 is shown for multiple buildings, according to an exemplary embodiment. The security system 300 is shown to include buildings 10a-10d. Each of buildings 10a-10d is shown to be associated with a security system 302a-302d. The buildings 10a-10d may be the same as and/or similar to building 10 as described with reference to FIG. 1. The security systems 302a-302d may be one or more controllers, servers, and/or computers located in a security panel or part of a central computing system for a building.

The security systems 302a-302d may communicate with various security sensors that are part of the building subsystems 228. For example, fire safety subsystems 230 may include various smoke sensors and alarm devices, carbon monoxide sensors and alarm devices, etc. The security subsystems 238 are shown to include a surveillance system 315, an entry system 316, and an intrusion system 318. The surveillance system 315 may include various video cameras, still image cameras, and image and video processing systems for monitoring various rooms, hallways, parking lots, the exterior of a building, the roof of the building, etc. The entry system 316 can include one or more systems configured to allow users to enter and exit the building (e.g., door sensors, turnstiles, gated entries, badge systems, etc.) The intrusion system 318 may include one or more sensors configured to identify whether a window or door has been forced open. The intrusion system 318 can include a keypad module for arming and/or disarming a security system and various motion sensors (e.g., IR, PIR, etc.) configured to detect motion in various zones of the building 10a.

Each of buildings 10a-10d may be located in various cities, states, and/or countries across the world. There may be any number of buildings 10a-10b. The buildings 10a-10b may be owned and operated by one or more entities. For example, a grocery store entity may own and operate buildings 10a-10d in a particular geographic state. The security systems 302a-302d may record data from the building subsystems 228 and communicate collected security system data to the cloud server 304.

The cloud server 304 is shown to include a security system 306 that receives the security system data from the security systems 302a-302d of the buildings 10a-10d. The cloud server 304 may include one or more processing circuits (e.g., memory devices, processors, databases) configured to perform the various functionalities described herein. The processing circuits may be the same and/or similar to the processing circuit 204, the processor 206, and/or the memory 208 as described with reference to FIG. 2. The cloud server 304 may be a private server. In some embodiments, the cloud server 304 is implemented by a cloud system, examples of which include AMAZON WEB SERVICES® (AWS) and MICROSOFT AZURE®.

In some embodiments, the cloud server 304 can be located on premises within one of the buildings 10a-10d. For example, a user may wish that their security, fire, or HVAC data remain confidential and have a lower risk of being compromised. In such an instance, the cloud server 304 may be located on-premises instead of within an off-premises cloud platform.

The security system 306 may implement an interface system 308, an alarm analysis system 310, and a database storing historical security data 312, security system data collected from the security systems 302a-302d. The interface system 308 may provide various interfaces of user devices 314 for monitoring and/or controlling the security systems 302a-302d of the buildings 10a-10d. The interfaces may include various maps, alarm information, maintenance ordering systems, etc. Examples of the interfaces that the interface system 308 can generate are shown in FIGS. 37-51.

Security systems e.g., the security system 302a, can protect residential or commercial premises by implementing functionality e.g., intrusion detection, access control, video surveillance, and fire detection. In each case, sensors deployed at various locations in and around the building transmit data back to a central system for analysis, e.g., the security systems 302a-302d. In some instances, such data is further transmitted to an offsite location that serves as a monitoring center, e.g., the alarm analysis system 310. In either case, the sensor data can be analyzed to determine if a condition exists at the premises that requires attention by a security professional. For example, if a motion sensor detects that someone has entered a building at a time that the intrusion system is armed or if an access control system detects that a door is being forced open, that information is transmitted to the local or remote monitoring center which can deploy security guards or call the police.

Unfortunately, such security systems for detecting alarms (e.g., a fire, an intrusion, etc.) may not be foolproof. If a sensor is going bad or requires maintenance, it may produce spurious data falsely indicating that there has been a security breach. For example, a smoke detector may indicate the presence of smoke in the building when it is simply an accumulation of dust on the device. Likewise, a contact switch on a warehouse door may indicate that the door has been opened when, in fact, the magnetic switch has simply stopped working correctly. Such false alarm situations can be numerous and can cost building owners a substantial amount of money each year in business down-time, security agency response fees, and maintenance personnel truck rolls. In many instances, the purported cause of a false alarm is repaired but other related problems exist with the systems that are not detected until further false alarms events occur.

In some embodiments, the alarm analysis system 310 is configured to predict conditions that are precursors to a false alarm condition and fix the errors before they occur. In some embodiments, sensor data from commercial security products (e.g., the building subsystems 228 and/or the security system 302a) is monitored by the alarm analysis system 310 and used to predict false alarms. Based on the predicted false alarms, the alarm analysis system 310 can be configured to generate preventative maintenance or training recommendations.

The alarm analysis system 310 can predict and/or identify anomalous behavior by tracking normal security product behavior at the protected premises. This past behavior can set a standard by which the security system can be measured against. When a deviation from that norm is detected in the operation of the security system, the alarm analysis system 310 can be configured to analyze the type of deviation that occurred, determine whether the behavior is of a type that is a precursor to a false alarm condition, and determine a response that is necessary for preventing the false alarm from occurring.

Moreover, the alarm analysis system 310 can be configured to predict other related aspects of the security product that may need attention. For example, if a magnetic door sensor is exhibiting aberrant behavior, the alarm analysis system 310 can be configured to generate a prediction that the magnetic door sensor will fail. Furthermore, the alarm analysis system 310 can be configured to determine the age of that sensor as well as all similar sensors in the building that are the same type and age as the failing one. The data intelligence system can notify building operators that the magnetic door sensor is failing and can indicate similar door sensors that may require attention.

The alarm analysis system 310 can be a "self-healing" system configured to automatically pushing parameter updates to the building subsystems 228 and/or configured to automatically schedule time for maintenance to be conducted. Using such a self-healing system, a building owner does not need to be notified that there was a problem with their security product since the building system can be configured to automatically fix itself. Therefore, when a security issue arises, the building owner can have a high level of confidence that it is an actual security event rather than a false alarm.

The alarm analysis system 310 can be configured to analyze the historical security data 312 and determine false alarm rules. The false alarm rules may indicate that particular patterns of events (e.g., alarms occurring, detected motion, etc.) at the security systems 302a-302d are indicative of an event or situation at the buildings 10a-10d that causes false events. Furthermore, the false alarm rules may include recommendations and provide a solution to reducing false alarms. For example, a false alarm rule may be indicative of particular event patterns that indicate that building employees are not being properly trained to utilize a security system. The false alarm may include a recommendation indicating that building employees do not understand how to properly perform a particular job duty or operate particular security system devices.

The signals generated by building systems (e.g., from sensors the building subsystems 228 e.g., intrusion, fire, or HVAC systems) may be discrete events or continuous signals generated in response to certain actions performed either by human beings or based on based on sensor data (e.g., detecting an intrusion event, detecting motion in a zone, etc.). In some embodiments, the events are marked by site, system, date, event type, zone, alarm, and/or can include a comment. An example is Table 1 below,

TABLE 1

| | | | Event Data Format | | | |
|---|---|---|---|---|---|---|
| Site | System | Date And Time | Event | Zone | Alarm | Comment |
| Site A | Security System | Feb. 1$^{st}$, 2015 | Motion Detected | Zone A | N/A | N/A |

Based on the event data e.g., the data shown in Table 1, the systems and methods discussed herein can predict if a building site needs attention and alert building users to actionable insights to prevent false alarms. The events can be analyzed to detect patterns that are indicative of a situation that causes false alarms. The "patterns" or "sequences" may be indicative of inherent causality relationships indicative of a situation that causes a false alarm. The alarm analysis system 310 can be configured to generate the event sequences by performing a parameter search, a general sequential pattern (GSP) algorithm, first and/or second order Markov chains, neural networks, decision trees, Bayesian analysis, and/or any other method that derives patterns of events and identifies potential issues, e.g., false alarm rules. Based on the detection of the presence of a particular false alarm sequence at a building, a situation that causes false alarms can be identified and a recommendation for alleviating the situation can be generated.

Based on the analysis, the alarm analysis system 310 can provide interfaces to an end user with the results of the analysis. The interfaces may inform a user about the current status of their system, whether maintenance is or will be required, and/or suggested parameter changes for the security system that will result in a reduction in false alarms. The alarm analysis system 310 can, based on the event data received for the building site and the identified false alarm rules, prepare a recommendation informing an end user of parameter adjustments or maintenance that may be necessary to prevent false alarms from occurring. The insight may be to adjust or update a door delay, to train employees to better understand access systems, replace a battery for a sensor with a low battery, repair electrical equipment where there is a ground fault, etc. The recommendation can be transmitted to the end user via an interface and the user can access the insight via one or more of the user devices 314. A subscription server, mobile application, website, or other medium can be used to deliver the insights to the end user via the user devices 314. Based on the event data and/or the actions which a user may take to reduce risk, the alarm analysis system 310 can be configured to generate a risk profile indicating the ranking of a particular building site in terms of safety and comparing the particular building site against other building sites. Risk scores are described with further reference to FIGS. 31-33.

The alarm analysis system 310 can identify recommendations to use in reducing the number of false alarms reported by the security system 302a. In some embodiments, the false alarm rules that the alarm analysis system 310 can be configured to determine can be surfaced to a domain expert that can review the false alarm rules and the event sequences associated with the false alarm rules and provide recommendations for the false alarm rules. The domain expert may be a Certified Software Asset Manager (CSAM). The CSAM may provide input to the alarm analysis system 310 for determining the alarms and can further provide contextual information for the rules. For example, the domain expert may provide a title or maintenance directions for each rule determine by the alarm analysis system 310. Based on identified false alarm rules, the alarm analysis system 310 can receive data regarding what is causing false alarms, along with a recommendation for addressing that group or an identifier tag, e.g., a title for the rule.

The alarm analysis system 310 can further be configured to gather additional event data and apply a second round of analytics on the rules relative to the additional data. This may allow the false alarm rules to be updated or modified based on data that was not considered when the rule was generated. The false alarm rules, and the data used to generate the false alarm rules, may span multiple sites or one particular site. Furthermore, the false alarm rules and the data used to generate the false alarm rules may be associated with particular sites in a vertical. For example, a certain square footage may define a vertical so that similarly sized building sites can be analyzed together. By analyzing data for a particular group of building sites, recommendations can be generated for the building sites of the group based on a large data set. Another example of a vertical may be a market vertical (e.g., law firm buildings may form one vertical, grocery stores may form a vertical, schools may form another vertical, etc.)

Referring now to FIG. 4, a block diagram of the alarm analysis system 310 as described with reference to FIG. 3 is shown, according to an exemplary embodiment. The alarm analysis system 310 can be configured to identify patterns leading to false alarms based on event data reported by the security system 302a. The alarm analysis system 310 is shown to include a processing circuit 502 that includes a processor 504 and a memory 506. The memory 506 can include instructions which, when executed by the processor 504, cause the processor 504 to perform the one or more functions described herein. The processor 504 may be the same and/or similar to the processor 206 as described with reference to FIG. 2 and the memory 506 may be the same as and/or similar to the memory 208 as described with reference to FIG. 2.

In addition to a traditional processor and memory, the processing circuit 502 may include integrated circuitry for processing and/or control, e.g., one or more processors and/or processor cores (e.g., microprocessor and/or microcontroller) and/or FPGAs (Field Programmable Gate Array) and/or ASICs (Application Specific Integrated Circuitry). The processing circuit 502 can include and/or be connected to and/or be configured for accessing (e.g., writing to and/or reading from) the memory 506, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory).

The memory 506 can be configured to store code executable by control circuitry and/or other data, e.g., data pertaining to communication, e.g., configuration and/or address data of nodes, etc. The processing circuit 502 can be configured to implement any of the methods described herein and/or to cause such methods to be performed, e.g., by the processor 504. Corresponding instructions may be stored in the memory 506, which may be readable and/or readably connected to the processing circuit 502. It may be considered that the processing circuit 502 includes or may be connected or connectable to the memory 506, which may be configured to be accessible for reading and/or writing by the controller and/or the processing circuit 502.

The security system 302a is shown to include a communication interface 508. The communication interface 508 can be configured to facilitate communicate with a domain expert device 510 and/or the security system 302a. Furthermore, the communication interface 508 can be configured to communicate with all of the devices and systems described with reference to FIG. 3.

Via the communication interface 508, the historical security database 512 can be configured to receive (collect) and store security system data from the security system 302a. The security system data may be events such as an occurrence detected by a sensor of the security system 302a. For example, an intrusion sensor may identify that an individual is trying to force a window open. Another event may be a door being opened or closed. The detection of an occupant walking through the door may also be an event. The events 514 can further include signals. For example, a signal may be a continuously signal of a door being open and door being closed.

The memory 506 is shown to include an event analyzer 516. The event analyzer 516 can be configured to generate false alarm rules 518 that are shown to be stored by the memory 506. The event analyzer 516 can be configured to generate particular sequences of events 514 and generate rules based on the sequences of events 514. Certain sequences of events 514 can be identified as important by the event analyzer 516, these sequences can be used by the event analyzer 516 to generate the false alarm rules 518. The false alarm rules 518 can be rules identifying that particular sequences of events are and/or lead to false alarms. The false alarm rules 518 may include a recommendation 526 which may instruct an end user to perform an action which reduces false alarms (e.g., adjusting a building equipment parameter, training building personal, replacing a piece of building equipment, reducing false alarms related to churn, etc.). For example, an alarm rule 518 may indicate that a particular sequence of events indicates a poorly positioned door sensor. For this sequence of events, the recommendation 526 may be to have a technician reposition the door sensor.

The event analyzer 516 can be configured to perform Markov Chain analysis to determine important sequences of events 514. The event analyzer 516 can be configured to generate a Markov Chain transition matrix which identifies the relationships between events and probabilities of each transition between events. For example, a first order transition matrix may be defined by A, where $a_{i,j}$ is a probability for a particular transition from a state i to a state j.

$$A = a_{ij} \quad \text{(Equation 6)}$$

$$A = \begin{bmatrix} a_{0,0} & \cdots & a_{0,j} \\ \vdots & \ddots & \vdots \\ a_{i,0} & \cdots & a_{i,j} \end{bmatrix} \quad \text{(Equation 7)}$$

Furthermore, the event analyzer 516 can be configured to use a first order Markov Chain to determine important transitions between events. A first order Markov Chain may be a Markov Chain where the probability of a second event occurring after a single first event. The first order Markov Chain may identify important transitions between events 514, important sequences.

Furthermore, the event analyzer 516 can be configured to implement a second order Markov Chain to analyze the events 514. A second order transition may be a transition where the probability of a third event occurring after two prior events. The event analyzer 516 can be configured to analyze the events 514 with a second order transition to check for accuracy of the first order Markov Chain, e.g., verify that the identified events are important, and further identify additional sequences of events. The event analyzer 516 can be configured to implement any order of Markov Chain analysis and can be configured to determine an optimal order for the Markov Chain analysis. For example, a user may identify a predefined number of false alarm rules 518 and the event analyzer 516 can perform Markov Chain analysis to determine a particular Markov Chain order that results in the predefined number of false alarm rules 518.

The transitions between events 514 may be time based. The transition matrices can be built by the event analyzer 516 for different time intervals between events. Every event sequence or transition of events determined by the event analyzer 516 can be considered an issue and can be assigned as a false alarm rule 518. An appropriate fix or response can be assigned to the false alarm rule 518 by the domain expert, e.g., the recommendation 526.

The memory 506 can be configured to store events 514 and/or sequences of events in a historical security database 512. The processing circuit 502 can be configured to analyze a sequence of events 514 with Generalized Sequential Pattern (GSP) analysis to generate pattern information for alarm rules 518. More specifically, the event analyzer 516 can be configured to analyze the events 514 with GSP analysis. This is further described with reference to FIG. 8. The recommendation generator 522 can be configured to classify events 514 as triggering a false alarm rule 518 based on the pattern information of the false alarm rules 518. In some embodiments, the Bayesian predictor 520 can be configured to perform a Bayesian analysis to predict alarms occurring in the future, according to the process described with reference to FIGS. 9A-10C.

The event analyzer 516 can be configured to perform GSP mining to determine sequences from the events 514. By using GSP, the event analyzer 516 can be configured to empirically determine inherent causality relationships between events. The alarm rules 518 can be determined from the various sequences of events 514 determined by the event analyzer 516. The false alarm rules 518 may indicate that a particular sequences of events is indicative of a situation for issue that causes false alarms. For example, a rule may be "Communication Issue" and may be associated with a maintenance activity "Wiring replacement needed." A particular sequence for this false alarm rule 518 may be:

$$CF\_COMM\_Trouble \rightarrow BA\_Overhead\_Door(s)$$

This false alarm rule 518 can indicate that a burglar alarm sensor for a door triggers after a communication issue is sensed for the burglar alarm sensor. A recommendation to prevent false alarms occurring for the burglar alarm sensor may be to perform maintenance on the burglar alarm and/or replace the communication wiring for the burglar alarm sensor.

The event analyzer 516 can be configured to perform a parameter search. The parameter search may be on a time dimension parameter search. A particular time interval may be used for the parameter search such that transitions between events occur within the time interval. The parameter search can group events by time such that a sequential pattern analysis of events looks at a particular group of events that occur within a predefined amount of time or a within predefined amount of time from each other. Another dimension for the parameter search may be a spatial parameter that groups events that occur in a predefined area and/or within a predefined distance from each other. The GSP mining can be applied by the event analyzer 516 to identify particular event sequences and use these event sequences against or in generating the alarm rules 518.

The domain expert device 510 may be a device that a domain expert uses to access the false alarm rules 518. The domain expert device 510 may be the same and/or similar to the user devices 314. A domain expert associated with the domain expert device 510 can provide the recommendations 526 for each of the false alarm rules 518. For example, the domain expert, via the domain expert device 510, can review the false alarm rules 518 and provide the recommendation 526 for each false alarm rule 518. The domain expert device 510 can provide recommendation 526 that indicates a particular cause of a false alarm. For example, for a communication issue, the recommendation 526 may indicate that communication wires should be replaced or inspected by a technician.

The recommendation generator 522 can be configured to identify whether an event 514 and/or sequence of events 514 are indicative of a situation causing a false alarm or indicating that a false alarm could occur. The recommendation generator 522 can determine whether an event or sequence of events meet a false alarm rule 518. Based on the recommendation 526, the recommendation generator 522 can provide suggestions or insights to a user device 314. The suggestion may be to perform maintenance, e.g., inspecting or replacing communication wires. Furthermore, the recommendation may be to change a parameter of a sensor device. For example, a door delay parameter might be increased to prevent a false alarm pertaining to a door.

Table 2 below indicates recommendations that can be provided to an end user to reduce situations or events that cause false alarms. The recommendations may be the same as and/or similar to the recommendations 526. In Table 2, each recommendation indicates a title and a recommendation description. In some embodiments, the recommendation names and/or recommendation descriptions are provided by the domain expert of the domain expert device 510 for particular events and/or event sequences, i.e., for a false alarm rule 518. In various embodiments, the alarm analysis system 310 can classify various events and/or event sequences into one of the recommendations shown in Table 2 below, i.e., the domain expert of the domain expert device 510 can define the recommendations of Table 2 and then the alarm analysis system 310 can train a classifier to assign particular event sequences a recommendation name and/or recommendation description from Table 2.

TABLE 2

| Recommendations | |
| --- | --- |
| Recommendation Name | Recommendation Description |
| Instant Burglar Alarm (BA) Door Alarm | Fire exit door or a perimeter door that has been programmed for instant alarm. |

TABLE 2-continued

Recommendations

| Recommendation Name | Recommendation Description |
| --- | --- |
| Entry/Exit Delay | The amount of time has exceeded the entry/exit parameter programed |
| Employee Access | Employee is incorrectly entering or exiting building. Customer education. |
| Bypass Violation | Arming event that causes security vulnerability. |
| Interior Burglar Alarm | It appears a motion sensor is causing alarms through a window, before customer enters perimeter door and cancels. Consider moving sensor or trying to adjust sensitivity. |
| Aborted Burglar Alarm | An alarm with police dispatch was cancelled due to an authorized employee cancelling the alarm. |
| No Close | Multiple alarms are caused by the site closing off-schedule. Check or adjust schedule. |
| Irregular Early Open | Multiple alarms are caused by the site opening off-schedule or wrong authority level. Check or adjust schedule or authority level. |
| Low Battery | Battery needs to be replaced since building device has been operating for a long time after an AC power failure. Low battery is leading to multiple problems. Check or replace battery. |
| Video Verification Fail | We see a connection issue with the camera. |
| User Error | We have identified that employees needs training on working with the intrusion system. |
| Expansion Module | Hardware failure issue with accessory expansion module that causes a false alarm. |
| Non Aborted Burglar Alarm | We have not been able to reach one of the authorized people from the call tree. |
| Ground Fault | A hardware electrical issue. |
| Glass Break or Vibration Sensor | A sensor that is causing an alarm from the glass break via internal and/or external conditions. |
| No Contact-Voice Mail Full | Key holder not contactable - voicemail full. |
| No Contact-No Voice Mail | Key holder not contactable - voicemail not set-up |
| No Contact-Invalid number | Key holder not contactable - number not valid. |
| No Contact-Other | Key holder not contactable - number not contactable. |

The Bayesian predictor 520 can be configured to predict whether a false alarm rule 518 will trigger in the future. The Bayesian predictor 520 can be configured to implement a Bayesian model and/or a hierarchical Bayesian model. Based on a framework for the Bayesian model and the events 514, the Bayesian predictor 520 can be configured to generate a prediction of what rules will fire in the future (what issues will occur in the future). For example, the Bayesian predictor 520 can be configured to implement a Bayesian model to determine how many door delay alarms will occur one week into the future. The predictions can be provided to the interface system 308.

The interface system 308 can be configured provide a dashboard to the user device 314. The interface system 308 is shown to include a dashboard generator 524. The dashboard generator 524 can be configured to receive the indications of actions to take to reduce or suppress false alarms from the recommendation generator 522 and predictions from the Bayesian predictor. Examples of the interfaces that can be generated by the dashboard generator 524 are the interfaces shown in FIGS. 37-51.

The new data scorer 527 can be the same as and/or similar to the event analyzer 516. The new data scorer 527 can be configured to implement GSP mining or Markov transition analysis. The new data scorer 527 can be configured to update the false alarm rules 518 based on new events 514 received form the security system 302a. This second round of analytics may identify new alarm rules 518 or improve or remove past alarm rules 518.

Figure 5:
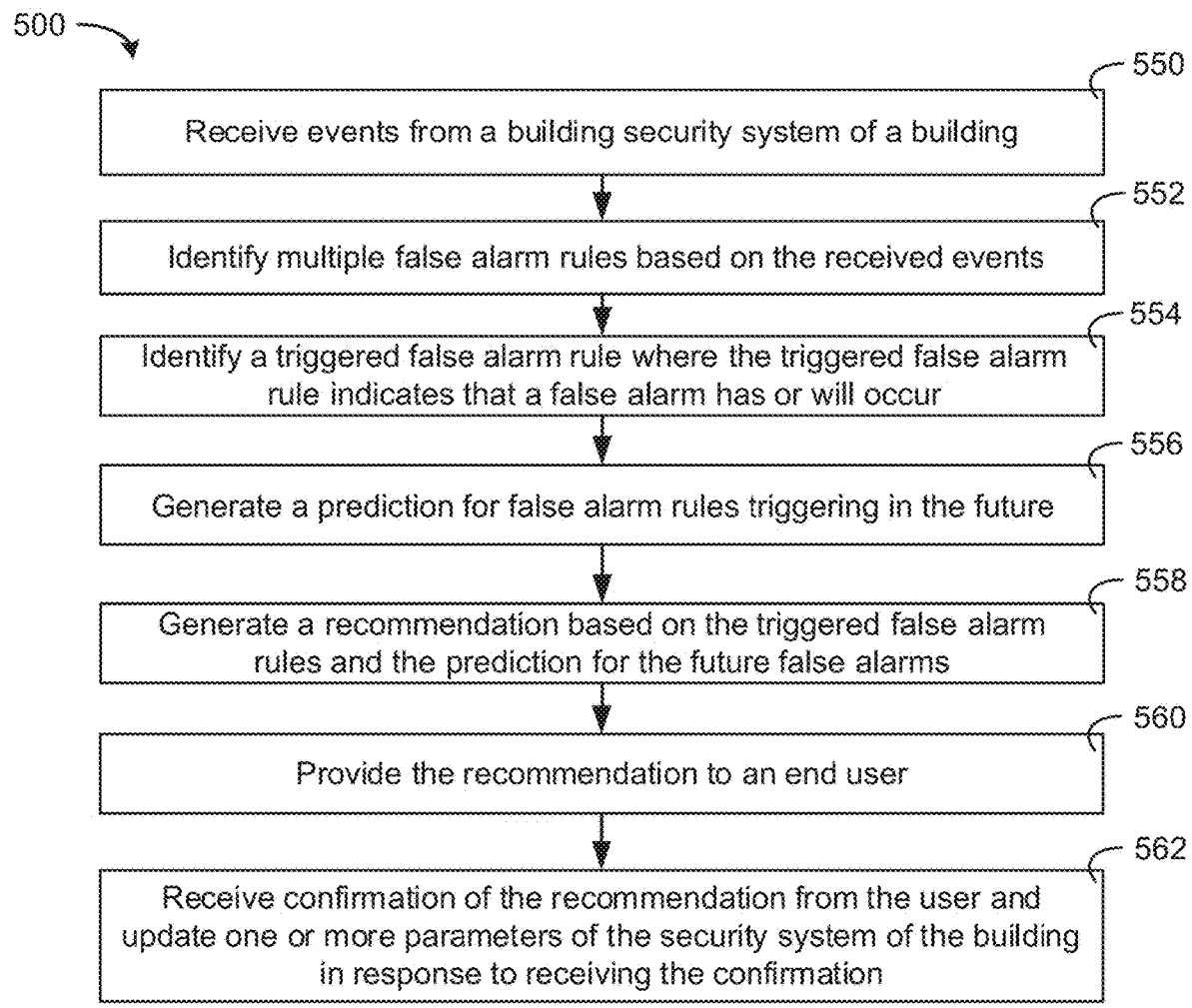
FIG. 5 is a flow diagram of a process for determining false alarm rules based on event data and generating a recommendations by the alarm analysis system of FIG. 4, according to an exemplary embodiment.

Referring now to FIG. 5, a flow diagram of a process 500 that can be performed by the alarm analysis system 310 for generating alarm rules 518 is shown, according to an exemplary embodiment. The alarm analysis system 310 can be configured to perform the process 500. Furthermore, any one or combination of the computing devices described herein can be configured to perform the process 500.

In step 550, the alarm analysis system 310 can receive events 514 from the security system 302a. The events may be doors opening or closing, a window being forced open, movement detected in a particular zone, etc. In step 552, the event analyzer 516 can be configured to analyze the events 514 to identify various alarm rules 518. In some embodiments, analyzing the events 514 may include performing a first order Markov transition analysis, a second order Markov transition analysis, and/or any order Markov transition analysis. Furthermore, the analysis may include performing a GSP analysis of the events 514 in addition to various other pattern mining algorithms e.g., Sequential PAttern Discovery Using Equivalence Classes (SPADE), FreeSpan, PrefixSpan, MAPres, etc. Identifying the false alarm rules 518 is described with further reference to FIGS. 6A and 6B.

In step 554, the recommendation generator 522 can determine whether a false alarm rule has triggered (e.g., determining whether a false alarm has occurred or will occur) based on the events 514 and the alarm rules 518. An indication that a false alarm has or will occur may be indicative of a situation in the building 10a that is causing false alarms. Examples of such a situation may be an improperly installed or operated piece of building equipment of the building 10a. In some embodiments, certain events 514 may occur within the building 10a when a false alarm occurs. In some embodiments, the certain events 514 may occur within the building 10a although no alarm has yet occurred. Based on the alarm rules 518, the recommendation generator 522 may determine, that based on particular patterns of the events 514, that a false alarm has occurred or may occur in the future.

In step 556, the Bayesian predictor 520 can determine a prediction for alarm rules 518 occurring in the future. The Bayesian predictor 520 can implement Bayesian modeling to identify whether a false alarm will occur in the future based on the events 514 and the alarm rules 518. More specifically, based on historical data of past alarm rules 518 triggering, the Bayesian predictor 520 can predict how many alarm rules will trigger in the future. In step 558, based on the identified false alarms and the predictions of future alarms as determined in steps 554 and 558, a recommendation can be generated by the interface system 308. The recommendation may be to adjust the installation of sensors, adjust the parameters of the sensors, or order technician service. The maintenance recommendation can help prevent false alarms from occurring in the future. This insight may be based on the recommendation 526 associated with a triggered alarm rule 518.

In step 560, the interface system 308 can provide the recommendation to a user via user device 314. In this regard, various dashboards and interfaces can be generated by the dashboard generator 524 to display the recommendations to the user. The user can review the recommendations via the user device 314 and take appropriate action. In some embodiments, the user may approve a particular setting change which the alarm analysis system 310 can implement.

In step 562, in response to receiving a confirmation to update various sensor or system parameters to avoid false alarms, the alarm analysis system 310 can implement the various changes.

Figure 6A:
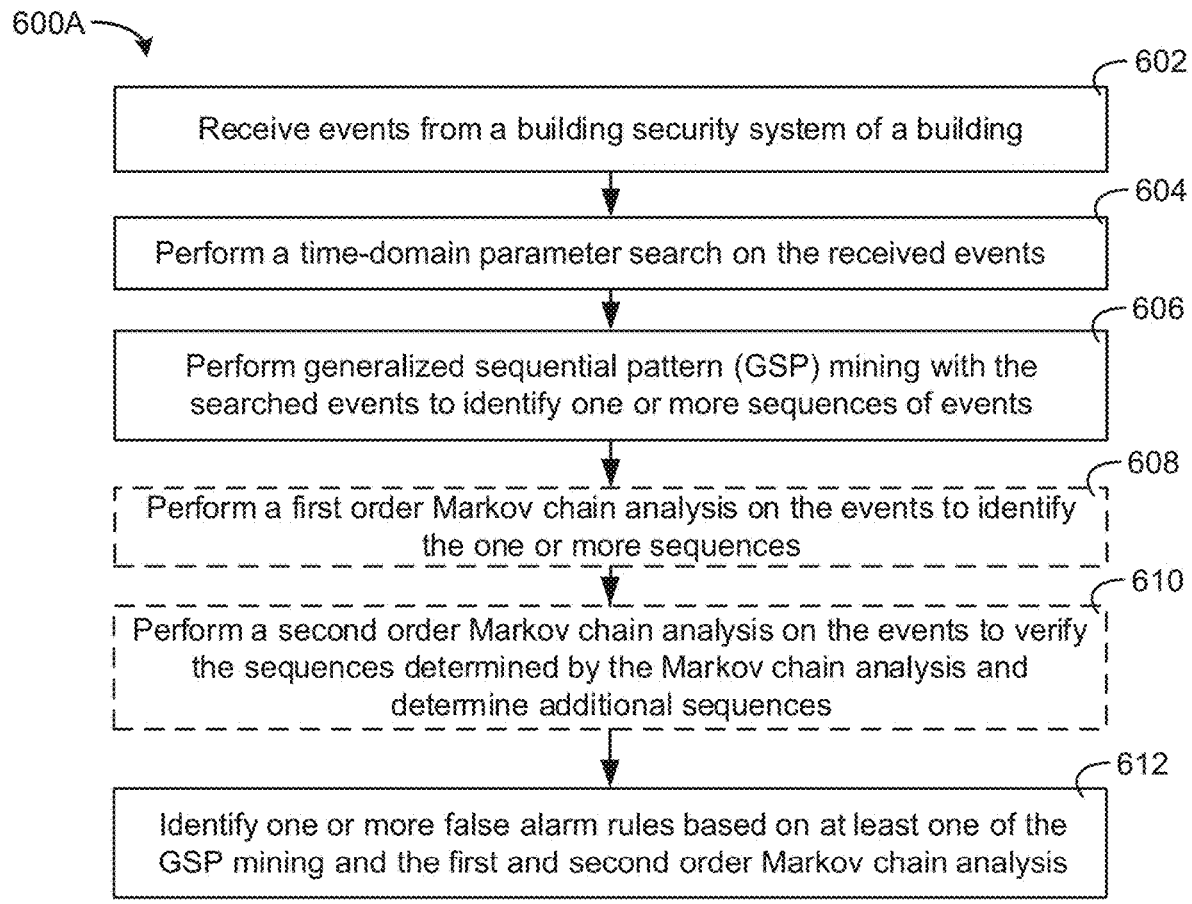
FIG. 6A is a flow diagram of a process that can be performed by the alarm analysis system of FIG. 4 for performing a generalized sequential pattern (GSP) method and/or a Markov chain analysis to identify false alarm rules, according to an exemplary embodiment.
Figure 6B:
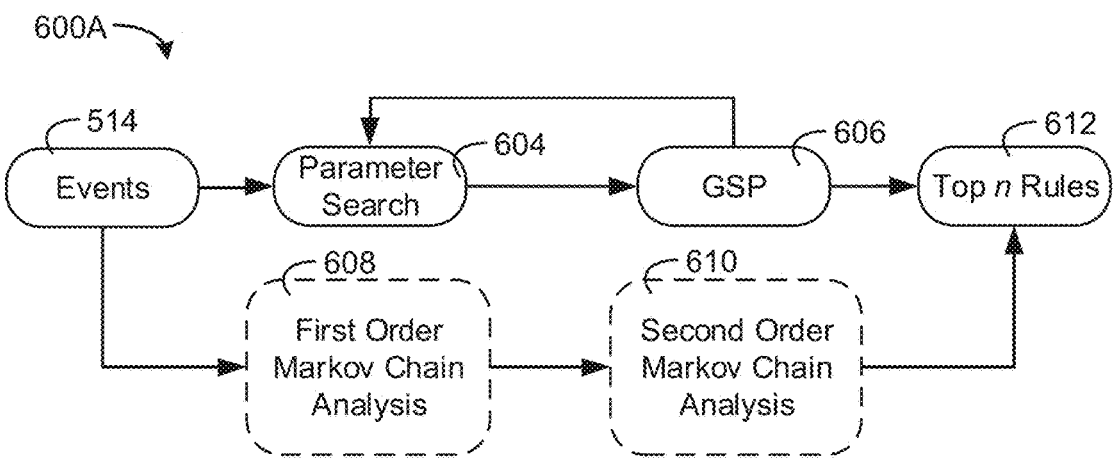
FIG. 6B is another flow diagram illustrating the process of FIG. 6A in detail, according to an exemplary embodiment.

Referring now to FIGS. 6A and 6B, a process 600A is shown to generating alarm rules 518 with a GSP method and/or Markov Chain analysis with the alarm analysis system 310, according to an exemplary embodiment. The alarm analysis system 310 can be configured to perform the process 600A. Furthermore, any one or combination of computing devices described herein can be configured to perform the process 600A. By formulating the problem as a GSP mining problem, patterns emanating from signal interactions can be analyzed.

FIG. 6B is a flow diagram of the process 600A. FIG. 6B illustrates the events 514 and the parameters search of step 604 and the GSP analysis of step 606 being performed on the events 514 to generate the alarm rules 518 (the top n rules). Furthermore, optional steps 608 and 610 are shown for performing first order Markov chain analysis step 608 and second order Markov chain analysis step 610.

Referring more particularly to FIG. 6A, in step 602, the alarm analysis system 310 can receive events from the security system 302a of the building 10a. Step 602 may be the same as and/or similar to step 550 of FIG. 5B. The alarm analysis system 310 can receive historical event data from a system, a single building site, or multiple building sites. In step 604, the event analyzer 516 can perform a time-domain parameter search on the received events 514.

In step 606, the event analyzer 516 can perform a generalized sequential patterning mining (GSP) method to identify one or more sequences, i.e., causality relationships between events. The GSP method can identify important sequences of events, i.e., sequences which occur frequently.

Steps 608 and 610 can be optional steps performed by the event analyzer 516 to generate the alarm rules 518. This can be performed in addition to, or in place of, the GSP analysis. In step 608, the event analyzer 516 can determine sequences, e.g., transitions between events and can determine the importance of the transitions e.g., how often the transition occurs with a first order Markov chain analysis. A first order Markov chain analysis may identify the probability of a future event based on a single previous event.

In step 610, the event analyzer 516 can confirm whether the sequences identified as significant in step 608 are still significant and can further identify additional sequences with a second order Markov chain analysis. The second order Markov chain analysis may identify sequences of events that occur frequency. The second order Markov chain analysis may identify the probability of a future event based on two past events. The sequences determined by the first order Markov chain analysis can be compared to the sequences determined by the second order Markov chain analysis to verify that the sequences of the first order analysis are determined to be significant under the second order analysis. If the second order analysis determines that the first order sequences are not important, these sequences can be removed. Furthermore, additional sequences can be identified by the event analyzer 516 via the second order Markov chain analysis.

In step 612, the event analyzer 516 can determine one or more false alarm rules 518 from the sequences determined by the GSP mining of step 606 or the Markov chain analysis of steps 608 and 610. In some embodiments, the event analyzer 516 can determine a top n rules that are significant from both the GSP mining and/or the Markov chain analysis. The top n rules may be the most significant rules for a particular system, a particular building site, and/or for multiple building sites. In some embodiments, the frequency at which the sequences occur is used to select the sequences. For example, the top n most frequently occurring sequences may be selected. The top n sequences can be used to form alarm rules 518. In some embodiments, the alarm rules and/or sequences are categorized and adjusted by the domain expert associated with the domain expert device 510. For example, the domain expert device 510 may provide recommendation 526 for each of the false alarm rules 518.

Figure 7:
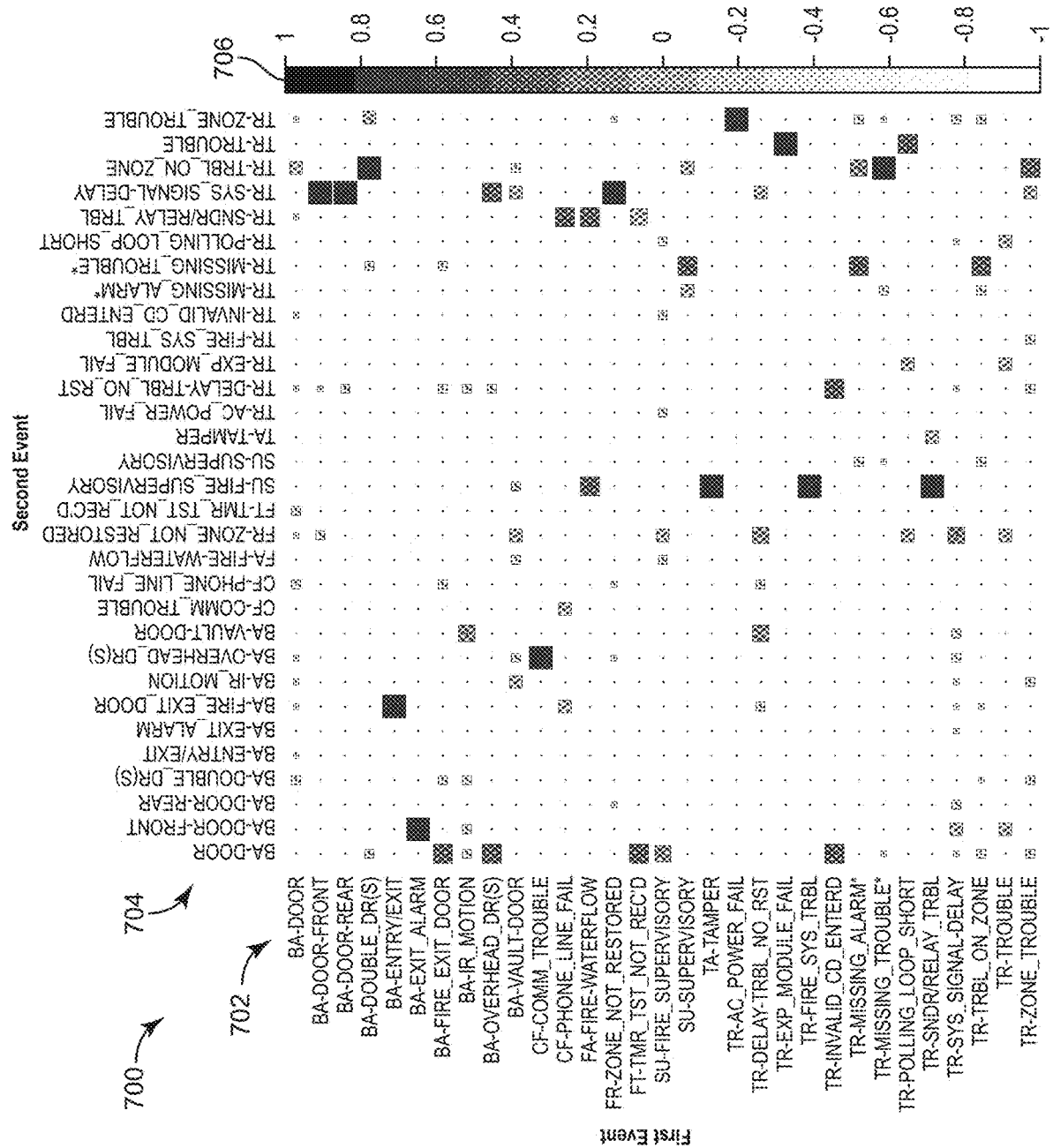
FIG. 7 is a diagram of first order Markov transitions between events, according to an exemplary embodiment.

Referring to FIG. 7, an exemplary first order Markov transition diagram 700 is shown for events 514, according to an exemplary embodiment. As can be seen, the first event rows 702 illustrates a first event while the second event columns 704 illustrate a subsequent second event. The transition diagram 700 illustrates the significance of each transition based on the scale 706 which ranges from −1 to 1. The significance may indicate the probability or rate at which one of the second events of the second event column 704 occurs after a first event of the first event rows 702 occurs. As an example, the alarm analysis system 310 may select any transition with a metric above a predefined amount to be a false alarm rule 518. For example, only the red transitions may be selected as false alarm rule 518, e.g., all transitions above 0.45.

As described elsewhere herein, the event analyzer 516 can utilize Markov properties to analyze a sequence of events 514 received from the security system 302a. By only considering the previous signal, i.e., a first order Markov chain (as shown in FIG. 7), the transitions between events 514 can be analyzed. Before this step, embodiments involve pre-processing the signal data using domain knowledge to remove redundancy in signal definition.

Some embodiments include observation of second order transitions to check for accuracy or new patterns. The transitions may be time based. These observations can be made for different time intervals at definite data granularity, built at a system number level. As an example, patterns that may emanate from first and second order transitions are Equations 8 and 9.

$$CF\_COMM\_Trouble \rightarrow BA\_Overhead\_Door(s):\text{A false alarm due to a communication issue} \quad \text{(Equation 8)}$$

$$TR\_INVALID\_CD\_ENTRD \rightarrow BA\text{-DOOR:A true alarm} \quad \text{(Equation 9)}$$

For the false alarm of Equation 8, an associated recommendation can be linked for reducing false alarms. In some embodiments, the recommendation includes one or multiple actions. For example, the actions may be "replace battery" or "wiring replacement needed."

Every transition as determined from a first and/or second order Markov analysis can be viewed as a potential issue and an appropriate fix may be assigned to these issues. As described elsewhere herein, a domain expert associated with the domain expert device 510 can help classify the transition as false alarms (e.g., the transition of Equation 8) or true alarms (e.g., the transition of Equation 9).

The transitions of FIG. 7 can be a proxy of how equipment (e.g., security panels) are operated at the building 10a. Faulty use of the building equipment and/or improper maintenance can lead to false alarms and these situations of faulty user and/or improper maintenance can be identified via the transitions. Specific recommendations for responding to each of the transitions and/or the most significant transitions can be implemented by the systems and methods discussed herein to perform preventative maintenance to reduce the number of false alarms that occur for the building.

Figure 8:
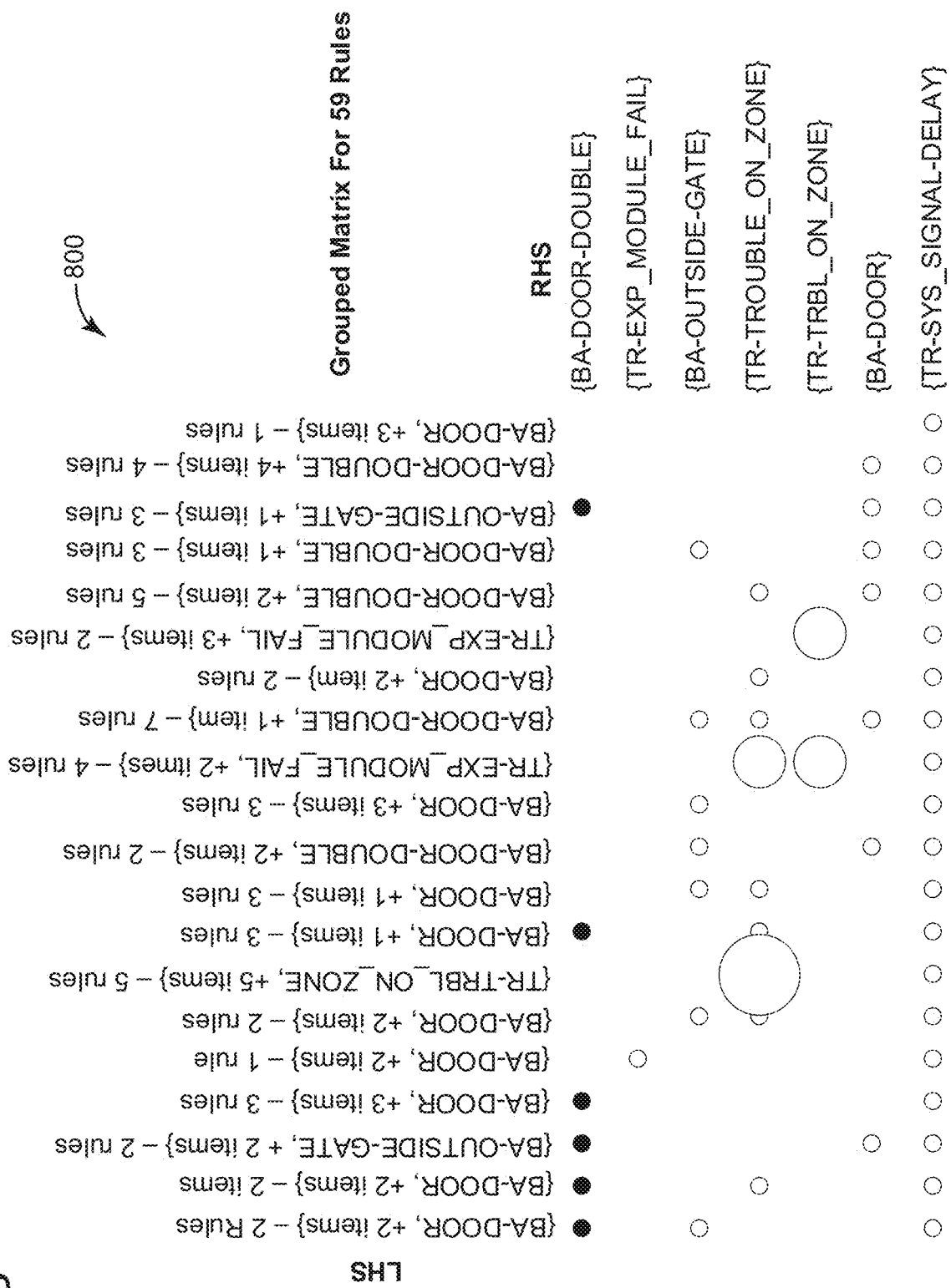
FIG. 8 is a diagram of rules that can be determined by the GSP method, according to an exemplary embodiment.

Referring to FIG. 8, a chart 800 illustrating alarm rules 518 determined by the event analyzer 516 with a GSP algorithm is shown, according to an exemplary embodiment. The chart 800 indicates sequences of events that are the most "important" or occur the most frequently based on the size of the circle indicators of the chart 800. Larger circles may indicate a sequence that occurs more frequently than a smaller circle. By using the GSP method, the event analyzer 516 can arrive at the sequences illustrated by the chart 800. With sequence modeling, inherent causality relationships may be uncovered empirically and rules (e.g., the rules shown in FIG. 8) may be developed for rectifying issues. For example, when communication trouble is followed by a burglar alarm indicating entry via overhead doors, the GSP algorithm may conclude that the alarm is a result of a communication issue and that a wiring replacement is needed.

Referring to FIGS. 7 and 8, both Markov chains and GSP mining can be employed to determine false alarm rules 618. GSP may help provide a general framework for generating patterns. For GSP mining, events 514 may be modeled as sequences and the data may be prepared in a manner suitable for sequential pattern mining algorithms, e.g., GSP. The parameter search can be a time dimension and/or may be a spatial dimension. The Markov chain method and the GSP can be combined into one pipeline where the Markov chain model and the GSP algorithm are placed into a single framework for generating rules. Every rule may be a potential signature for an issue. The signals associated the rules have a very distinct pattern. Signatures can be correlated signals. Signatures with time series events applied can develop repeatable false alarm patterns. Specific signatures and patterns can be filtered with the help of a domain expert (human being) and can be equated to a user action leading to a critical false alarm at the premise. The input of the domain expert can help form action insights, actions a user should take in response to a rule triggering.

More specifically, the Markov chain model and/or the GSP algorithm can be used to determine a cause (which may be user action, or for example, incorrect installation of equipment) of a sequence of events that leads to an alarm. These can form action insights. For example, suppose the following rule is termed as very significant by the GSP algorithm.

$$\text{OPEN/CLOSE} \rightarrow BA, BA\text{-}IR \quad \text{(Equation 10)}$$

A database can be consulted by looking at all the events that the rule of Equation 10 satisfies and identifying patterns of the signal giving rise to the alarm. As a result, suppose the following patterns of Table 4 are found, the first pattern and the second pattern, where OPEN is an open window or door event, BA is a burglary alarm event, BA-IR is a burglar alarm event based on infrared detection, BA-DOOR is a burglary alarm event based on an open door, and is a closed door event.

TABLE 3

Motion Sensor Sensitivity Rule
Rule - Motion Sensor Sensitivity
OPEN/CLOSE → BA, BA - IR

| Recommended Actions | Reduce motion sensor sensitivity<br>Reposition sensors |
|---|---|

TABLE 4

Patterns And Signatures

| Time Stamp | Event |
|---|---|
| First Pattern | |
| 1 | Open |
| 2 | BA-BURG |
| 3 | BA-IR |
| 4 | BA-IR |
| Second Pattern | |
| 1 | BA-IR |
| 2 | BA-IR |
| 3 | BA-DOOR |
| 4 | CLOSE |

With the help of a domain expert, a rule of Table 3 may be classified and all the patterns under this rule (e.g., the First Pattern and the Second Pattern of Table 4) can be labeled as Motion Sensor Sensitivity. These patterns may be the result of motion sensors being activated before or after the door of interest is either closed or opened. This may lead to numerous of false alarms. A recommended fix may be to reduce the sensitivity of the motion sensors or to move the motion sensors to a different place.

Figure 9A:
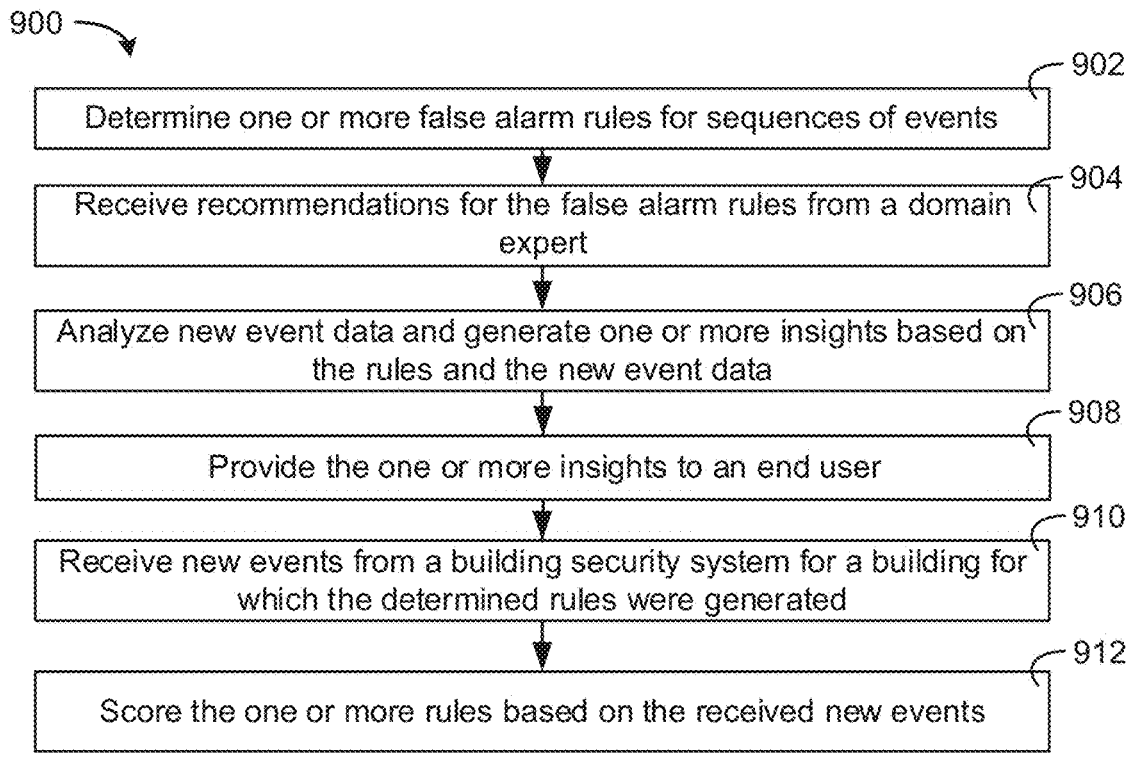
FIG. 9A is a flow diagram of a process that can be performed by the alarm analysis system of FIG. 4 for determining recommendations for false alarm rules and providing insights to an end user based on the false alarm rules and the recommendations for the false alarm rules, according to an exemplary embodiment.
Figure 9B:
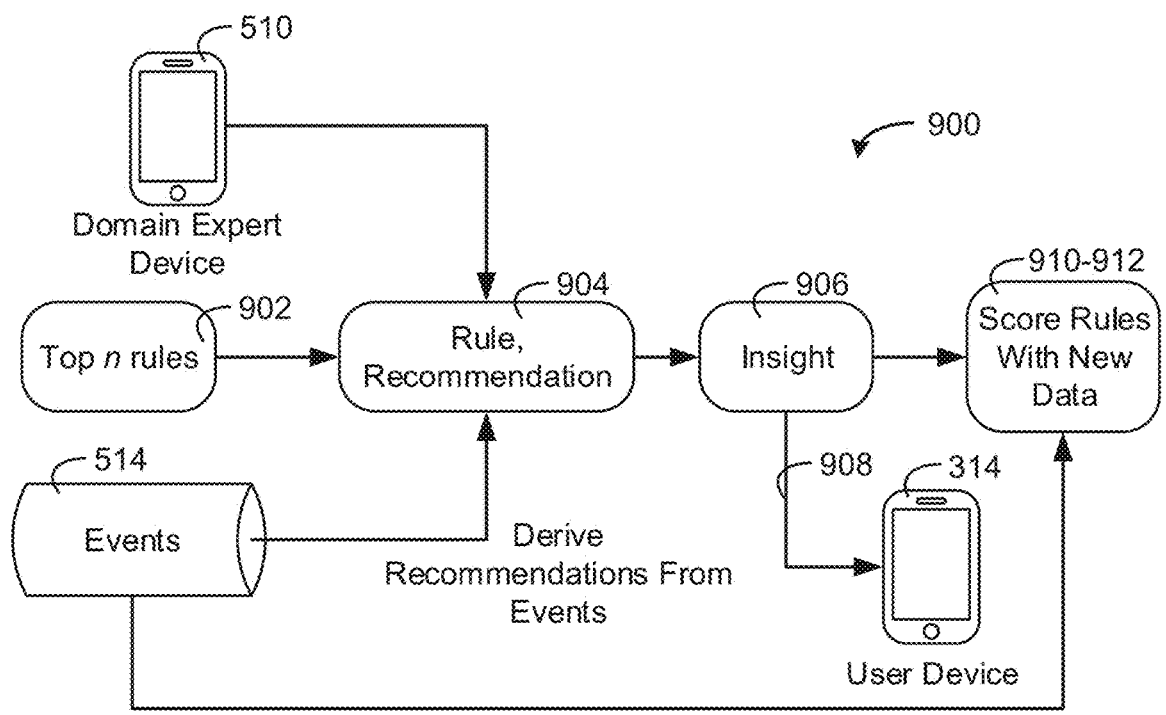
FIG. 9B is another flow diagram illustrating the process of FIG. 9A in detail, according to an exemplary embodiment.

Referring now to FIGS. 9A and 9B, process 900 is shown for generating a recommendation based on the false alarm rules 518 and the events 514, according to an exemplary embodiment. The alarm analysis system 310 can be configured to perform the process 900. Furthermore, any one or combination of computing devices described herein can be configured to perform the process 900. FIG. 9B illustrates a flow diagram of the process 900 and identifies the steps of the process 900 and the domain expert devices 510 and the user device 314.

Referring more particularly to FIG. 9A, in step 902, the event analyzer 516 can determine the alarm rules 518. The event analyzer 516 can use Markov chain analysis or GSP mining. These methods are described with further reference to FIGS. 6A-8.

In step 904, the alarm analysis system 310 can receive recommendations 526 for the determined false alarm rules 518. The recommendation 526 may be a recommended activity that should be performed, e.g., adjusting a parameter value, performing maintenance, adjusting or reinstalling a sensor, etc. The domain expert can also provide a title for the alarm rule 518. In some embodiments, the alarm analysis system 310 provides the recommendations 526 to the domain expert device 510. The domain expert, via the domain expert device 510, may remove rules, update rules, filter rules, combine rules, etc. The domain expert may classify some rules as indicative of a false alarm and other rules as indicative of a true alarm.

The recommendation 526 may be "send a remote tech to the site" and can be provided by the domain expert device 510. Furthermore, the recommendation 526 can be derived from the event data of the alarm rule 518. An example of a derived title may be "usage of wrong door."

In step 906, the rules can be applied to new event data received from the security system 302a. The new event data may satisfy one of the alarm rules 518 that is a rule for a false alarm, the recommendation generator 522 may determine that a false alarm has occurred or may occur in the future based on the event pattern. The recommendation 526 (e.g., resolution for those causes) associated with the rule that has triggered can be used to generate insights which can be passed to an end user associated with the user device 314 or to the domain expert associated with the domain expert device 510 (step 908). Some of these recommendations are to remotely program the remote programming the security system 302*a*. In this regard, the alarm analysis system 310 may automatically adjust one or more operating parameters of the security system 302*a*. In some embodiments, the insight provided to the user prompts the user to approve an automatic adjustment.

In step 910, the historical security database 512 may be updated with new events. The new data scorer 527 can be configured to perform a second round of analytics to score the alarm rules 518 (step 912). The new data scorer 527 can determine whether the alarm rules 518 are accurate and if any changes or updates need to be made to the alarm rules 518. Furthermore, the new data may occur in response to parameter changes remotely made for the security system 302*a*. Therefore, new data scorer 527 can be configured to add new alarm rules 518 or remove old alarm rules 518 that are no longer relevant after the remote parameter changes have been made.

The process 900 can be performed continuously and can allow the complete system to be in a steady state with reduced false alarms. By self-healing, remotely and automatically adjusting parameters for the security system 302*a*, the process 900 can keep the security system 302*a* working in the right condition.

Figure 10A:
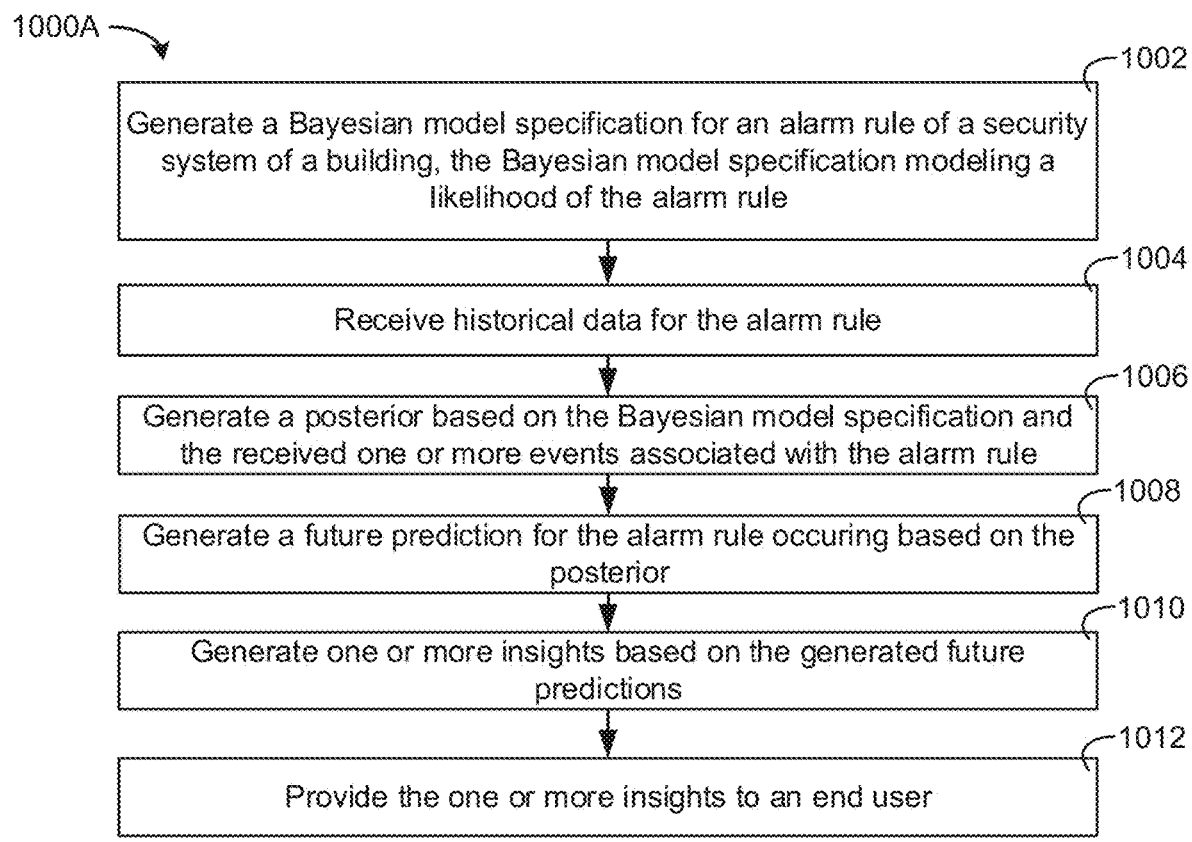
FIG. 10A is a flow diagram of a process that can be performed by the alarm analysis system of FIG. 4 for performing Bayesian analysis of historical alarm data to generate a prediction of future alarms triggering, according to an exemplary embodiment.
Figure 10C:
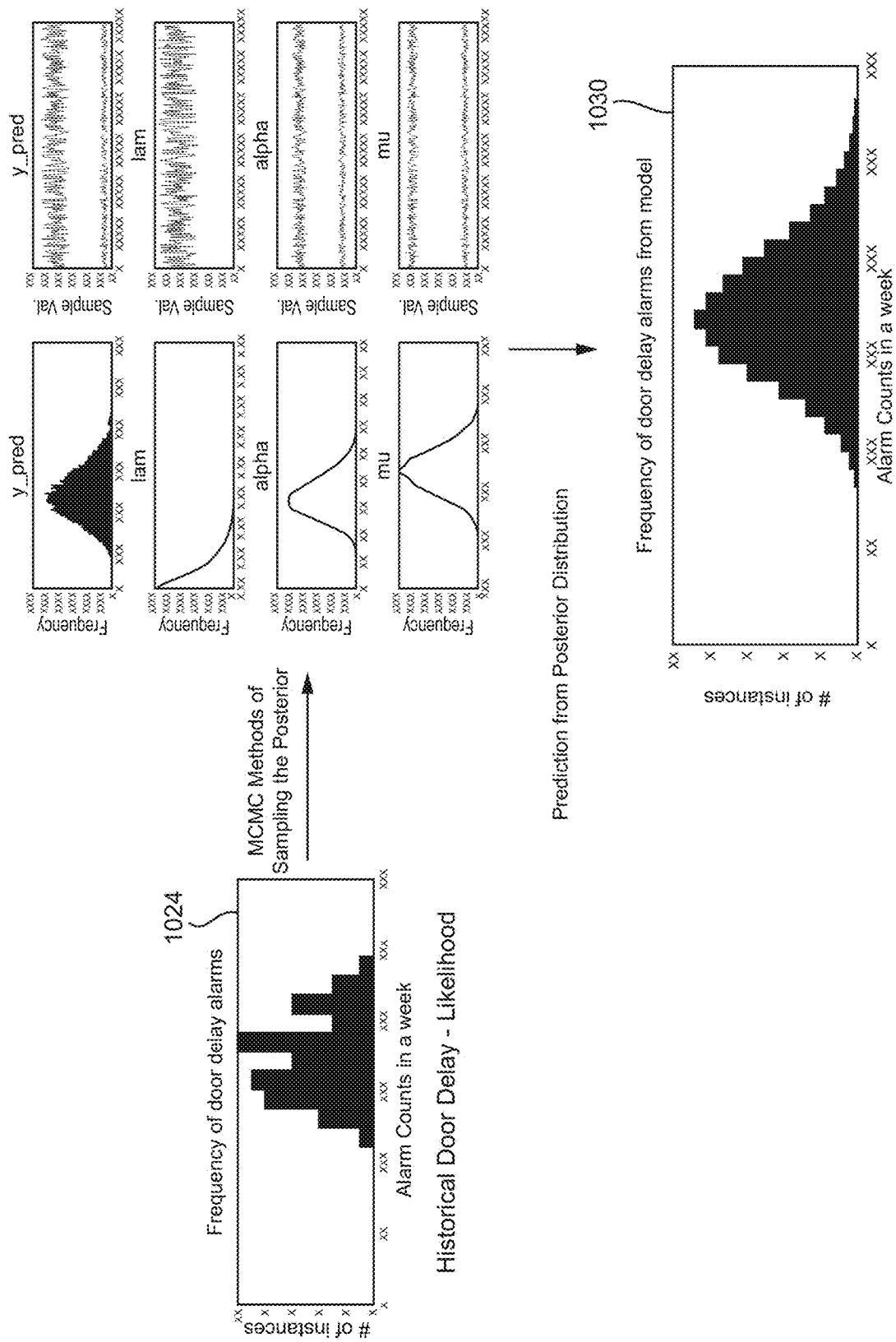
FIG. 10C is a diagram graphically illustrating the steps of the process of FIG. 10A for generating the prediction of the future alarms triggering, according to an exemplary embodiment.

Process 900 relates to what happens at the system, how much did the system drift from the normal operations and what actions we need to take to make it return to normal operating mode with reduced false alarms. FIGS. 10A-10C relate to performing predictions (e.g., with Markov Chain Monte Carlo (MCMC) methods) to predict what rules are going to trigger in the future (e.g., next week). By determining what rules are going to trigger in the future, recommendations can preemptively be made in terms of programming changes and/or on sight maintenance (e.g., truck roles) in order to suppress false alarms.

FIGS. 7 and 8 disclose a method for determining what causes an event sequence and relates different event sequences that arise from similar causes. With these actionable insights in place e.g., the false alarm rules 518, prediction of frequency of detected event sequences may be made for a particular building. Making the assumption that conditions remain the same, the prediction model predicts the number of such actionable insights expected. Each set of actionable insights may be modeled separately.

Referring now to FIG. 10A, a process 1000A for predicting alarm rules 518 that will occur in the future by the alarm analysis system 310 is shown, according to an exemplary embodiment. The process 1000A can predict which rules will occur in the future. Based on the historical pattern of the rules, the alarm analysis system 310 can perform a Bayesian inference to predict how many of the rules are going to fire the following week and subsequently how much the system is going to drift from the normal operations. The alarm analysis system 310 can be configured to perform the process 1000A. Furthermore, any one or combination of computing devices can be configured to perform the process 1000A. The process 1000A may be performed for a single rule. Therefore, the process 1000A can be performed for each of the alarm rules 518.

In step 1002, the Bayesian predictor 520 can be configured to generate a Bayesian model specification for a false alarm rule 518. The Bayesian model specification may model a likelihood function of the false alarm rule based on one or more priors (e.g., informative priors and/or non-informative priors), hyper-priors (e.g., informative hyper-priors and/or non-informative hyper-priors), parameters, and/or hyper-parameters. An example of a Bayesian model specification and probabilistic programming is shown in FIG. 10B that can be used to predict insights for individual building sites or for multiple building sites. Action insights can be predicted for a subsequent week at a site level (single building site) or at a customer level (all building sites of a customer).

In step 1004, the Bayesian predictor 520 can receive historical data for the false alarm rule 518. In some embodiments, the Bayesian predictor 520 receives data indicating when the alarm rule has been triggered and how many times the alarm rule has been triggered in a particular period of time in the past. In step 1006, based on the model specification and the historical data of the alarm rule, the Bayesian predictor 520 can generate a posterior for the alarm rule. The posterior may be a probability distribution for a parameter of the Bayesian model specification based on both prior assumptions for parameter of the Bayesian model specification and the historical data for the parameter.

In step 1008, based on the posterior distribution, predictions for the alarm rule can be made for a future period of time. For example, based on the posterior distribution, a frequency of times that the alarm will fire in the future is determined. For example, for a week into the future, the future prediction may indicate a probability distribution may indicate may many times the alarm may occur in the future week.

In step 1010, based on the future prediction, the recommendation generator 522 can generate a recommendation to perform parameter changes, order maintenance, etc. In some embodiments, recommendation generator 522 may generate an insight based on the recommendation 526 for the predicted alarm if the alarm is predicted to occur a predefined amount of times in the future. In step 1012, the interface system 308 can provide the insight to the user device 314. In some embodiments, the insight may be to adjust parameters or perform maintenance on the security system 302*a*. In some embodiments, if the recommendation for the rule is to update or adjust a parameter, the alarm analysis system 310 can automatically perform the parameter adjustment.

Referring to FIGS. 10B-10C, Bayesian inference and probabilistic programming for the prediction is shown for predicting outcomes, the outcomes being detected event sequences or, in the alternative, the causes determined from the processes of any of FIGS. 1-3 as giving rise to detected event sequences.

FIG. 10B shows a model 1000B for door delay rules that can be used to model door delay insights. In some embodiment, every false alarm rule 518 is modeled as a probability distribution. In the example of FIG. 10B, the door delay rule is modeled as a negative binomial distribution 1024. Gamma distributions of prior events (e.g., a gamma priors 1020 and 1022) may be employed for the negative binomial distribution. Uniform distributions 1026 may be employed as a hyper-priors for parameters of the gamma distributions (hyper-parameters). In one example, when the panels emit signals only during abnormal conditions and there is no insight into what is occurring during normal working hours, based on the data collected, the count of these insights can be modeled as a probability distribution. Using the door delay data 1028, arrival at the posterior distribution using Markov Chain Monte Carlo (MCMC) methods is achieved (FIG. 10C). In other words, using the door delay data 1028 generated according to the methods described herein to obtain information about what cause gives rise to a particular event sequence, one may obtain, from the process depicted in FIGS. 10B-10C, a frequency of such causes to occur in the future 1030.

In some embodiments, a Bayesian analysis, e.g., the Bayesian analysis detailed with reference to FIGS. 10A-10C, can be used to perform real-time or post event scoring of alarms. The analysis can identify, based on the false alarm rules 518, how many alarms may occur in the future if a recommendation to prevent false alarms is taken by a user and also if the recommendation to prevent false alarms is not taken by the user. In some embodiments, a recommendation can be provided with a confidence score which identifies how likely implementing the recommendation will reduce false alarms.

Figure 11:
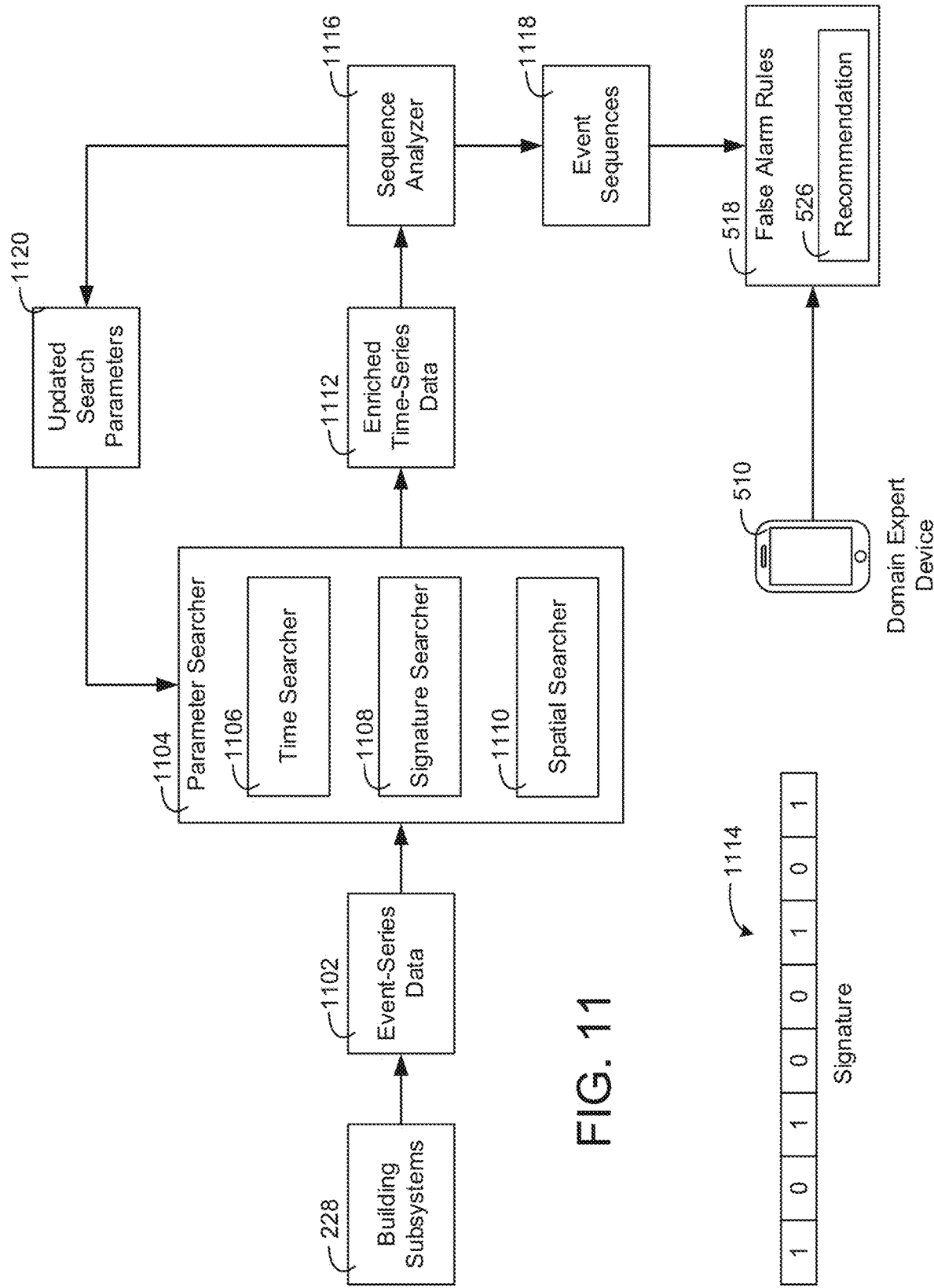
FIG. 11 is a block diagram of components of the alarm analysis system of FIG. 4 for determining false alarm rules by converting event-series data into enriched time-series data, according to an exemplary embodiment.

Referring now to FIG. 11, a block diagram of components of the alarm analysis system 310 of FIG. 4 are shown configured to determine the false alarm rules 518 by converting event-series data to enriched time-series data, according to an exemplary embodiment. In FIG. 11, event-series data 1102 is received from the building subsystems 228. The event-series data 1102 may be events that are generated within the building 10 by a device of the building subsystems, e.g., an alarm triggering, detecting occupancy in a particular zone, an abnormal temperature fluctuation, a user entering a user ID into a security keypad, a communications error message, and/or any other security, fire, or HVAC related event including those discussed elsewhere herein.

The event-series data 1102 can be analyzed by the parameter searcher 1104. The parameter searcher 1104 can be configured to generate the enriched time-series data 1112. The enriched time-series data 1112 can be generated from the event-series data 1102 based on the time searcher 1106, the signature searcher 1108, and the spatial searcher 1110 of the parameter searcher 1104. The parameter searcher 1104, via the time searcher 1106, the signature searcher 1108, and the spatial searcher 1110, can group and analyze the event-series data 1102 to generate related and grouped event data, i.e., the enriched time-series data 1112. In some embodiments, the parameter searcher 1104 can be configured to group data based on data granularity, e.g., site level, system level, based on verticals, etc.

In some embodiments, time searcher 1106 can be configured to generate the enriched time-series data 1112 based on a time parameter. The time parameter may act as a time window that filters the event-series data 1102 to generate the enriched time-series data 1112. The time searcher 1106 can generate the enriched time-series data 1112 by grouping the event-series data 1102 by determining events that occur within the time window (e.g., a fifteen minute time window). In some embodiments, the time window is arrived at by performing multiple iterations that testing various value for the time window (e.g., incrementing the time window for each iteration). An example of grouping the event-series data 1102 based on a time window may be the following. A time window is set to 10 minutes and a first event A that is associated with a time stamp 10:30 A.M. is grouped with a second event B that is associated with a time stamp of 10:35 A.M. However, a third event C associated with a time stamp of 10:57 A.M. is not grouped with the first event A.

The spatial searcher 1110 can be configured to group the events based on associations between spatial location filter. For example, occupancy detection in a Zone A may be grouped with occupancy detection in a Zone B since the spatial location filter may be configured to group events associated with Zone A and events associated with Zone B. This may be because Zone A and Zone B are located next to each other in the building 10. In some embodiments, the spatial searcher 1110 can include a spatial distance. Events that occur within the spatial distance, i.e., a predefined distance from each other or within a predefined area, can be grouped. However, the value for the spatial window can be iteratively updated until a predefined number of event sequences 1118 are determined. For example, the spatial distance could start at a low value and be iteratively increased until a predefined number of event sequences 1118 are determined. Similarly, the time searcher 1106 could start at a small time window and iteratively increase the time window by a predefined amount until a predefined amount of event sequences 1118 are determined.

The signature searcher 1108 can be configured to search the event-series data 1102 with a signature parameter. The signature parameter can identify events of the event-series data 1102 that are associated with specific binary patterns. For example, a particular binary pattern may be the signature 1114. For example, the signature 1114 may be used to group particular events together if they fit the pattern of the signature 1114.

The enriched time-series data 1112 can be fed into the sequence analyzer 1116. The sequence analyzer 1116 can be configured to analyze the enriched time-series data 1112 to generate the event sequences 1118. For example, the sequence analyzer 1116 can be configured to perform a GSP algorithm and/or a Markov Chain Analysis as discussed with further reference to FIGS. 6A and 6B. Furthermore, the sequence analyzer 1116 can be configured to generate the event sequences 1118 based on the enriched time-series data 1112 with various sequence mining algorithms such as Sequential PAttern Discovery Using Equivalence Classes (SPADE), FreeSpan, PrefixSpan, MAPres, etc.

The sequence analyzer 1116 can be configured to adjust the parameters used by the parameter searcher 1104 to perform the grouping of the event-series data 1102 to generate the enriched time-series data 1112. The sequence analyzer 1116 can generate updated search parameters 1120 and utilize the updated search parameters 1120 to recursively update the enriched time-series data 1112. In this regard, the sequence analyzer 1116 can iteratively determine the event sequences 1118 by generating and/or adjusting the updated search parameters 1120. The sequence analyzer 1116 can adjust the update search parameters 1120 until desired (e.g., optimal) updated search parameters 1120 are identified by the sequence analyzer 1116. For example, the identified search parameters may be search parameters that cause a predefined number of event sequences 1118 to be identified.

The event sequences 1118 can be used to generate the false alarm rules 518. The alarm analysis system 310 can present the event sequences 1118 to the domain expert via the domain expert device 510 so that the domain expert can accept or reject the event sequences 1118 as the false alarm rules and provide the recommendation 526 to each of the false alarm rules 518.

Figure 12:
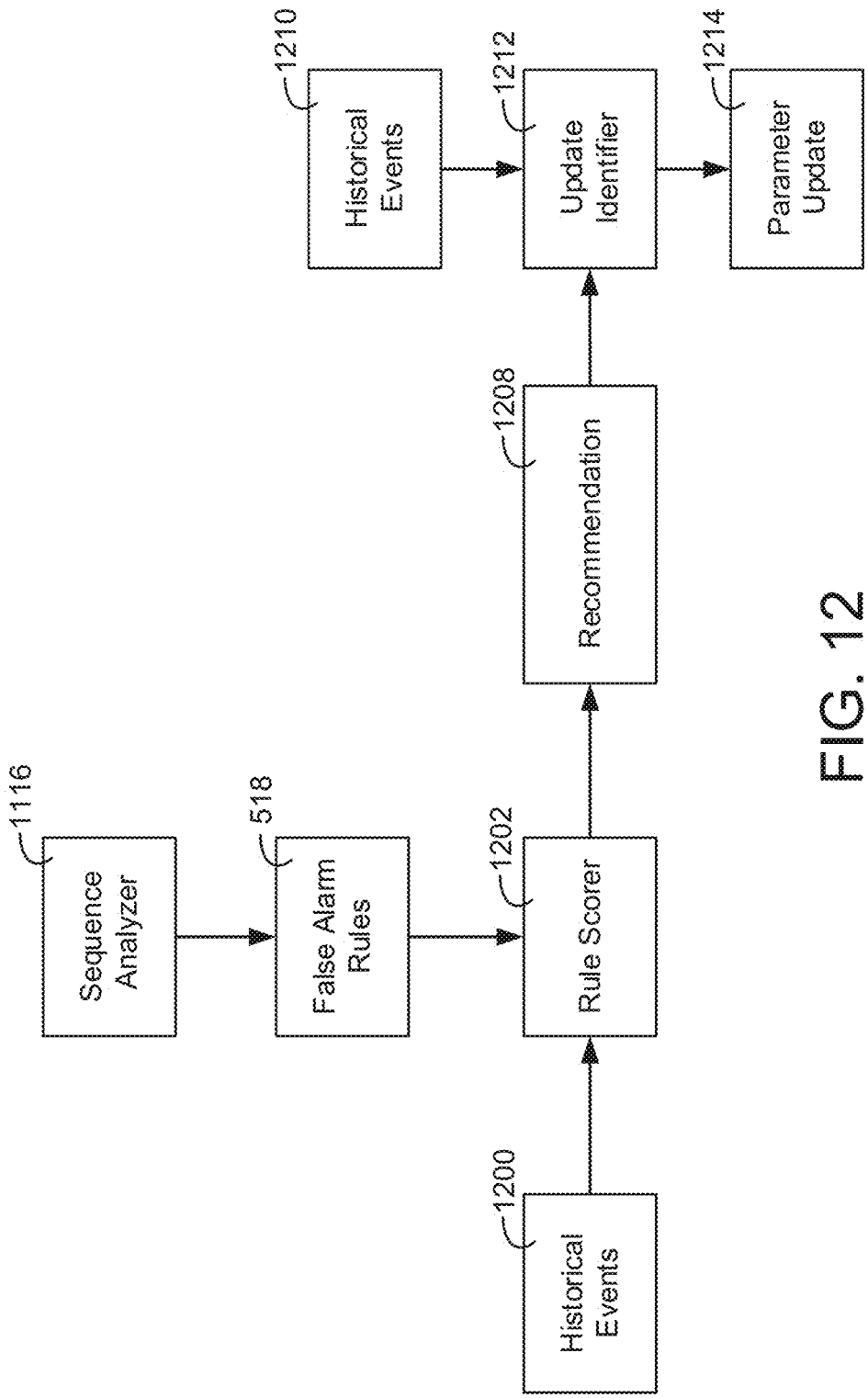
FIG. 12 is a block diagram of components of the alarm analysis system of FIG. 4 for determining a recommendation and identifying a parameter update for the recommendation, according to an exemplary embodiment.

Referring now to FIG. 12, a block diagram of components of the alarm analysis system 310 of FIG. 4 configured to generate parameter updates for building equipment to reduce false alarms is shown, according to an exemplary embodiment. In FIG. 12, historical events 1200 are shown as inputs to a rule scorer 1202. The historical events 1200 can be events of the building 10a, for example, the events may be events of the historical security database 512 as described with reference to FIG. 4. The historical events 1200 can be events collected over a day, a month, a year, and/or any other length of time. The rule scorer 1202 can determine, based on the historical events 1200 and the false alarm rules 518, a recommendation 1208. The rule scorer 1202 can be configured to classify the historical events 1200 and determine whether a particular false alarm rule of the false alarm rules 518 applies to the historical events 1200. The rule scorer 1202 can generate the recommendation 1208 based on the classification.

The recommendation 1208 may be a recommendation to replace a battery, reposition a sensor, adjust a door delay time, etc. The recommendation 1208 may be paired with the particular false alarm rule that applies to the historical event 1200. An update identifier 1212, based on the recommendation 1208 and the historical events 1200, can generate a parameter update 1214 for the building subsystems of the building 10*a*. The parameter update 1214 can be an update to a door delay time for an intrusion system, can be an update to a sensitivity level for a vibration sensor which detects intrusions, and/or any other parameter of the building subsystems. The parameter update 1214 can be pushed to the building equipment for automatic self-healing. In some embodiments, the update identifier 1212 presents the parameter update 1214 to an end user for review and approval. In some embodiments, the update identifier 1212 automatically (e.g., with user pre-approval) pushes the parameter update 1214 to the building subsystems.

The update identifier 1212 can be configured to determine an optimal parameter update 1214 based on the historical events 1210 and the recommendation 1208. The update identifier 1212 can be configured to perform various statistical and/or machine learning techniques to determine the optimal parameter update 214 value. Examples of such learning mechanisms may be the metropolitan hasting algorithm, a neural network, a deep neural network, a decision tree, or a Bayesian analysis (e.g., for example the Bayesian analysis described in FIGS. 10A-10C). The recommendation 1208 may be a recommendation to reprogram a door delay for a particular door. In this regard, the update identifier 1212 can be configured to generate an updated door delay (the parameter update 1214) based on historical events 1210 associated with the particular door. An example of determining the parameter update 1214 is shown in further detail with regard to FIGS. 13-14.

Figure 13:
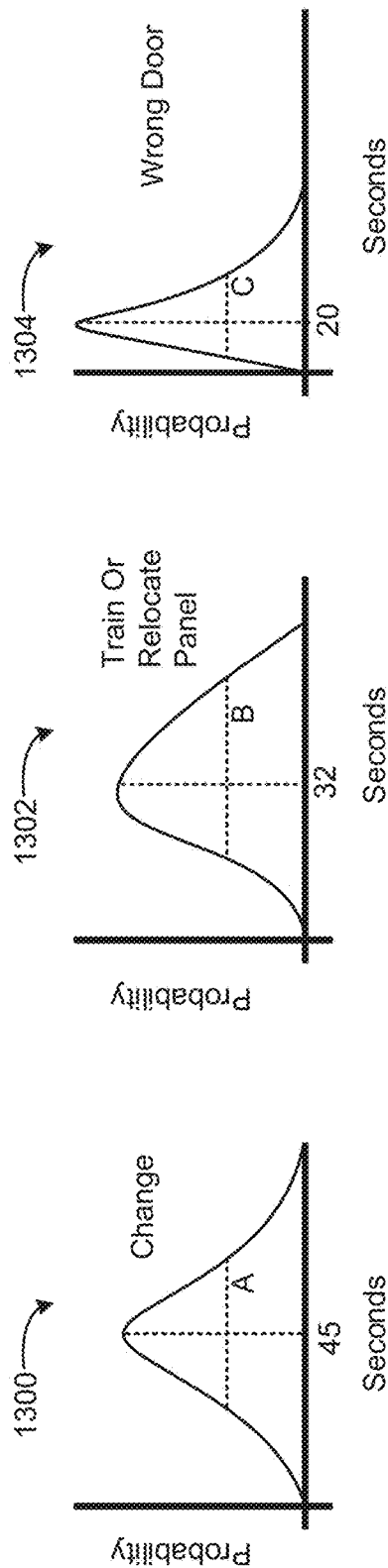
FIG. 13 is a set of drawings illustrating door delay alarm probability distributions determined from historical door delay data for use by the alarm analysis system of FIG. 4 in determining a recommendation to reduce false alarms, according to an exemplary embodiment.

Referring now to FIG. 13, three exemplary probability distributions for door delay amounts for a particular door are shown, according to an exemplary embodiment. The probability distributions can be determined by the update identifier 1212 based on the historical events 1200. For example, the probability distributions 1300, 1302, and 1304 can be determined as the probability of a user taking a particular amount of time from opening a door to entering in a user identifier (e.g., a personal identifier code (PIC) to cancel an alarm) into a security keypad. As shown in FIG. 13, three different distribution spreads are shown, A, B, and C and medians for each probability distribution 1300-1304 are shown to be 45 seconds, 32 seconds, and 20 seconds. The update identifier 1212 can analyze the distribution spread and the median values to identify what value to set the parameter update 1214 to.

If the distribution spread is less than a predefined amount, the median value of the distribution can be used as the door delay. In distribution 1300, the spread A is less than the predefined amount. Therefore, if the update identifier 1212 determines a distribution such as the distribution 1300, the parameter update 1214 would be the median of the distribution, e.g., 45 seconds as shown the distribution 1300.

If the distribution spread is greater than the predefined amount, rather than generating the parameter update 1214, the update identifier 1212 may determine that a parameter update is unnecessary and that user error is responsible for false alarms that may be occurring. For example, users may not be attentive to promptly entering their user ID at the security keypad. Furthermore, this may be indicative of the security access system being poorly located, i.e., it may be too far away from the door or positioned in a location where some users are having a difficult time finding the security keypad when entering the building.

If the distribution is skewed as in the distribution 1304, rather than generating the parameter update 1214, the update identifier 1212 may determine that a parameter update is unnecessary and that users are using the wrong door of the building 10*a*. In this regard, the update identifier 1212 can be configured to generate a recommendation to improve user training. For example, users may not understand which doors they should be entering through.

Figure 14:
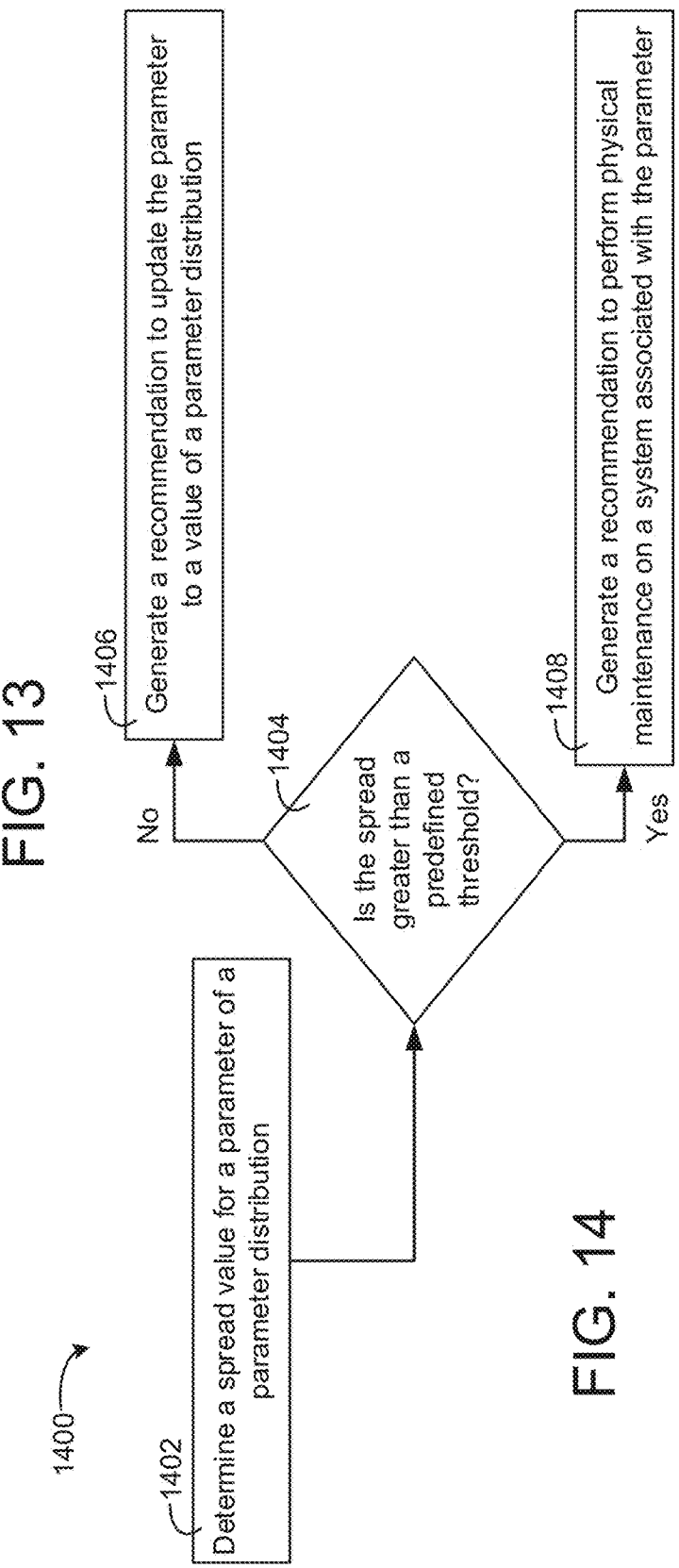
FIG. 14 is a flow diagram of a process for analyzing the door delay alarm probability distributions for FIG. 13 by the alarm analysis system of FIG. 4 to determine a recommendation to reduce false alarms related to door delay, according to an exemplary embodiment.

Referring now to FIG. 14, a process 1400 for determining the parameter update 1214 for a door delay is shown, according to an exemplary embodiment. The process 1400 can be performed by the alarm analysis system 310 and/or the systems described in FIG. 12 (e.g., the update identifier 1212). The process 1400 can be performed after a door delay event sequence has triggered, e.g., a specific false alarm rule 518 for door delays. Performing the process 1400 after detecting the false alarm rule 518 may provide a specific recommendation for reducing false alarms associated with door delays. For example, a sequence of events for a door delay may be a user opening a door at a particular time in the morning motion being detected in a particular zone, an alarm being generated due to a door delay, and a user entering a PIC in a security keypad could be a door delay event sequence.

In step 1402, the update identifier 1212 can be configured to generate a probability distribution for a door delay based on historical event data. Based on the probability distribution, the update identifier 1212 can generate a spread for the probability distribution. The spread value used to analyze the probability distribution may be a variance or standard deviation.

In step 1404, the update identifier 1212 can compare the spread to a predefined threshold. If the spread is not greater than the predefined threshold, the update identifier 1212 can perform the step 1406. If the spread is greater than the predefined amount, then the update identifier 1212 can perform the step 1408. In step 1406, the update identifier 1212 can generate the parameter update 1214 to be the median value for the door delay distribution generated at the step 1402.

If the spread is greater than the predefined threshold, the process 1400 can move to step 1408. In the step 1408, the update identifier 1212 can generate a recommendation to change a door delay system associated with the door delay distribution. The recommendation may be to relocate the key in pad to be closer to the door or in a more visible location. Furthermore, the recommendation may be to improve the training of users who are punching into the key in pad.

Figure 15A:
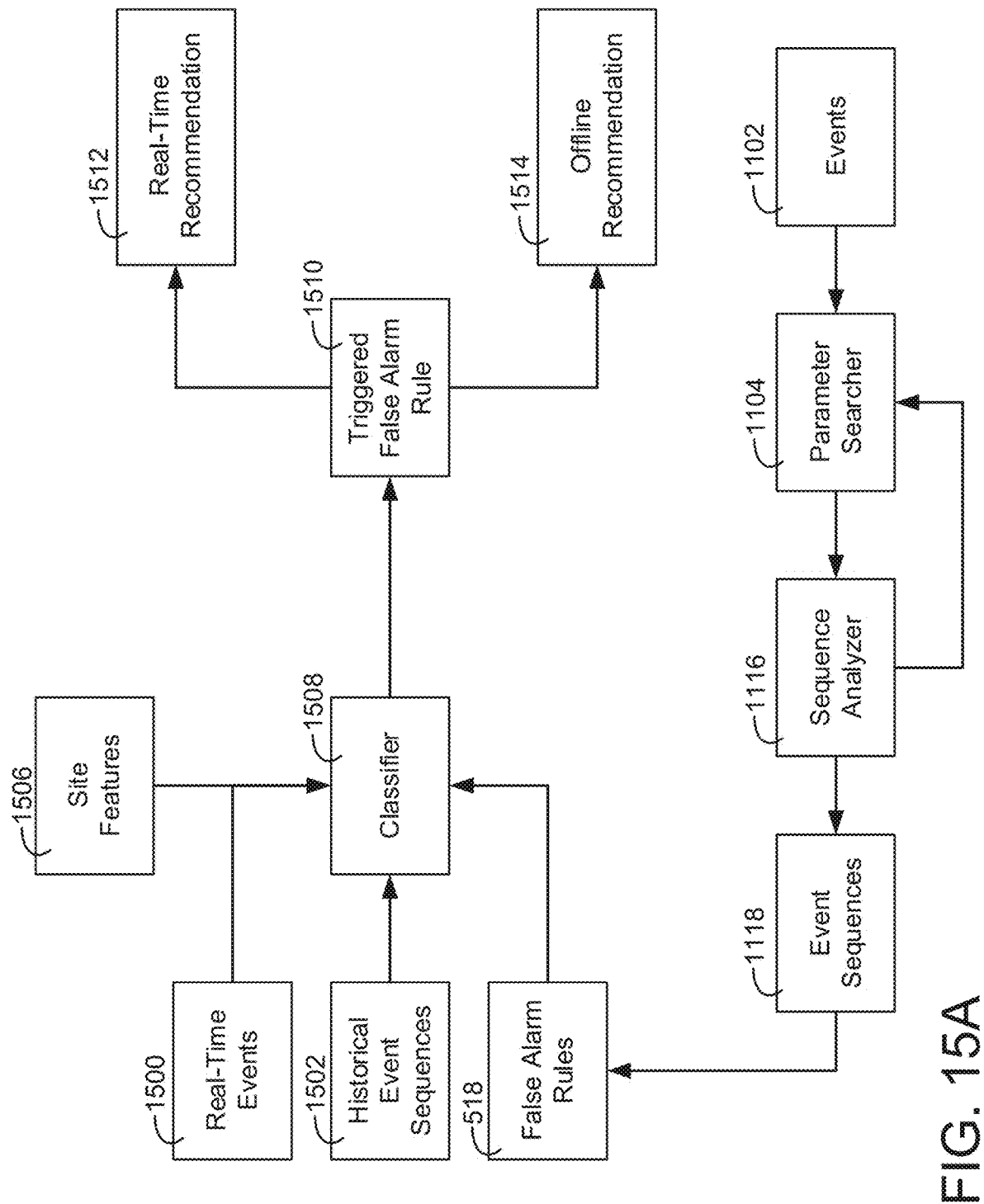
FIG. 15A is a block diagram of components of the alarm analysis system of FIG. 4 for using a classifier to determine a recommendation, according to an exemplary embodiment.

Referring now to FIG. 15A, a block diagram of components of the alarm analysis system 310 of FIG. 4 configured to generate recommendations for false alarm reduction based on a classifier 1508, according to an exemplary embodiment. With the false alarm rules 518, a model can be used to determine which alarm rules 518 have been triggered. The model can be implemented with a classifier 1508 which can be a neural network, a deep neural network, a decision tree, etc. The model can be formalized as the following equation, $$Y = F(x)$$ (Equation 11)

where Y is an identified false alarm rule of the false alarm rules 518, x represents historical events or other data (e.g., the site features 1506), and F(•) is an n classifier configured to identify the false alarm rule Y.

In FIG. 15A, the classifier 1508 is shown to take site features 1506, real-time events 1500, historical events 1502, and false alarm rules 518 as inputs and generate the triggered false alarm rule 1510 as an output. The triggered false alarm rule 1510 can be a particular false alarm rule of the false alarm rules 518 selected by the classifier 1508 based on the inputs. The triggered false alarm rule 1510 that can be identified by the classifier 1508 may be dependent on the false alarm rules 518.

The classifier 1508 can be a trained model configured to take multiple inputs to generate the triggered false alarm rule 1510. In some embodiments, the classifier 1508 is a neural network classifier (e.g., a deep neural network), a Naïve Bayes model, a Logistic Regression, a Decision Tree, a Support Vector Machine (SVM), a Random Forest, and/or any other model or machine learning technique that can be used in classification. The triggered false alarm rule 1510 can be an identification of one of the false alarm rules 518. Based on the identified false alarm rule 518, the alarm analysis system 310 can generate a real-time recommendation 1512 and/or an offline recommendation 1514.

The real-time recommendation may be a recommendation generated based on real-time event data, i.e., the real-time events 1500. In this regard, as data is collected for the building 10a, the classifier 1508 can be operated to identify whether false alarm rules 518 are triggered. This can allow an end user to quickly respond to perform actions that will prevent false alarms before they ever occur. In some embodiments, the classifier 1508 can determine that three sequential events are indicative of a false alarm occurring. In this regard, if the first event and then the second event occur, or the first event, then the second event, and then the third event occur, the classifier can identify the triggered false alarm rule 1510 to generate the real-time recommendation 1512. Furthermore, instead of analyzing the real-time events 1500 (or in addition to analyzing the real-time events 1500) the classifier 1508 can analyze historical event sequences 1502. The historical event sequences 1510 can be a database of events that has occurred in a previous predefined amount of time. Based on these historical event sequences 1502, one or multiple triggered false alarm rules 1510 can be determined by the classifier 1508 for determining the offline recommendation 1514.

Figure 15B:
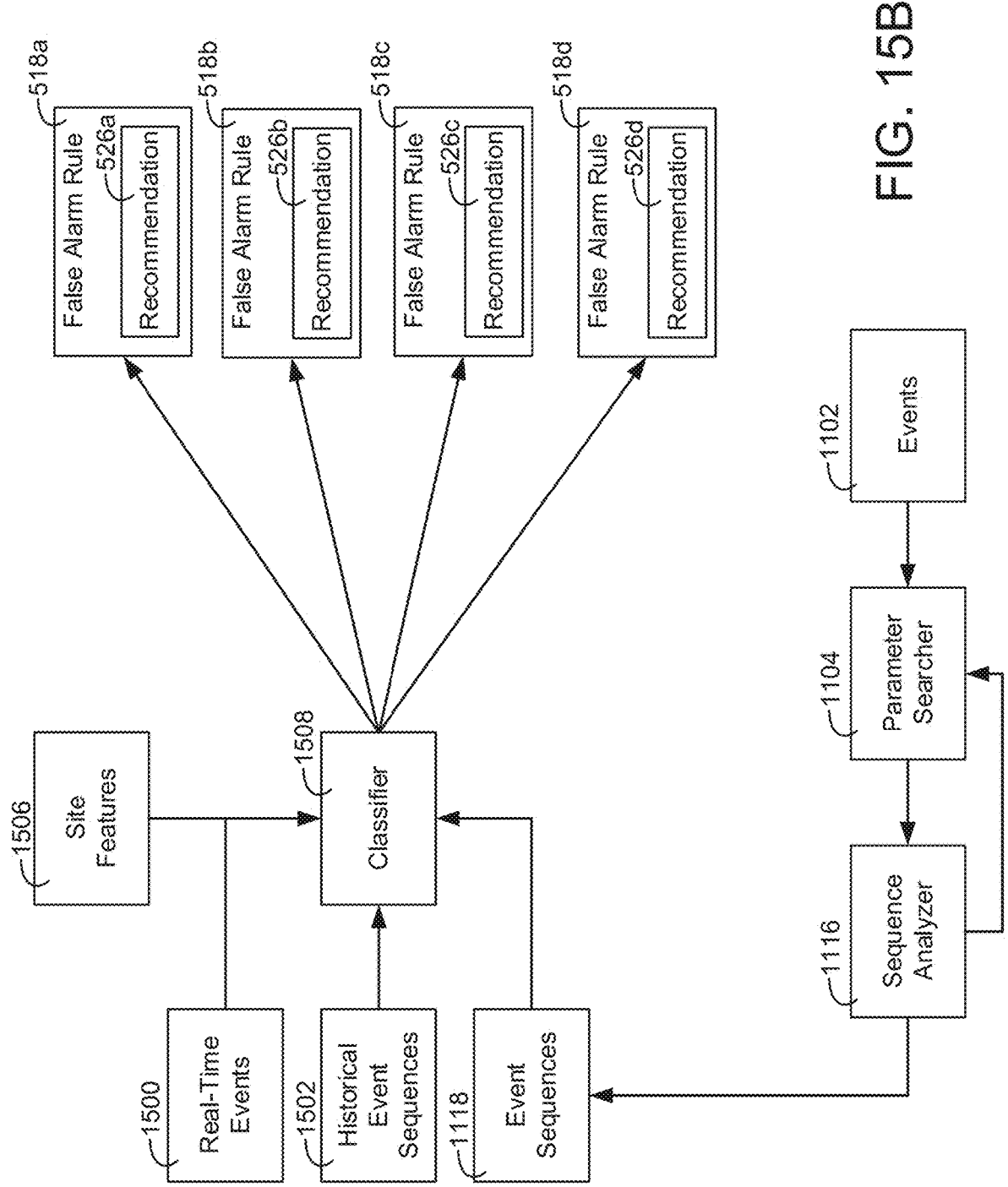
FIG. 15B is a block diagram of components of the alarm analysis system of FIG. 4 for using a classifier to classify an event sequence as a false alarm rule, according to an exemplary embodiment.

Referring now to FIG. 15B, a block diagram of components of the alarm analysis system 310 of FIG. 4 configured to classify event sequences 1118 as false alarms is shown, according to an exemplary embodiment. In FIG. 11, FIG. 9A, and FIG. 9B, rules are surfaced for a domain expert to classify and provide insight for the particular rule. However, rather than relying on a domain expert to provide contextual information (e.g., a false alarm reduction recommendation) for an identified event sequence 1118, the alarm analysis system 310 can utilize the classifier 1508 to classify the event sequences 1118 into particular predefined false alarm rule categories associated with predefined false alarm reduction recommendations.

As shown in FIG. 15B, rather than the classifier 1508 receiving the false alarm rules 518 to classify for generating a recommendation, the classifier 1508 of FIG. 15B receives the event sequences 1118 generated by the sequence analyzer 1116. The classifier 1508 can be a categorical classifier configured to classify the event sequence 1118 as a particular type of false alarm rule, e.g., one of the false alarm rule 518a, 518b, 518c, and/or 518d. Each of the false alarm rules 518a-518d may be a particular false alarm rule that a domain expert may generate and add contextual information for (e.g., the recommendations 526a-526d). The false alarm rules 518a-518d can be false alarm rules generated by the process 900 of FIGS. 9A-9B where the domain expert device 510 provides contextual information. However, once these categorical false alarm rules are established, subsequent event sequences 1118 can be classified under one of the already generated false alarm rules.

In some embodiments, the classifier 1508 analyzes the particular sequence of events of the event sequences 1118 to identify which false alarm rule 518a-518d the event sequence 1118 should be classified as. However, in some embodiments, additional information can be used to perform the classification such as site features 1506, real-time events 1500, and/or historical event sequences 1502.

Referring now to FIG. 16, a false alarm rule sequence for low battery detection rule 1600 is shown, according to an exemplary embodiment. The false alarm rule 1600 may be one of the false alarm rules 518. The false alarm rule 1600 can be a sequence of events that describes a false alarm that results from a low battery. The false alarm rule 1600 includes three specific events for a particular piece of building equipment, an Alternating Current (AC) power failure event, a Low Battery (LB) event, and a Replace Low Battery Event (RELB). The building equipment can include a main AC power source with a supplemental battery backup. The building equipment can be powered via the AC power source when the AC power source is available and via the supplemental battery backup when the AC power source is unavailable.

The first event of the false alarm rule sequence 1600 is the AC power failure event for the piece of building equipment. After the AC power failure event, the building equipment begins to operate based on the supplemental battery backup. Then, a first predefined amount of time after the AC power failure event, a second event, the LB event, occurs. This event may be the building equipment generating a low battery notification. After a second period of time, the RELB event may occur indicating that a low battery needs to be replaced.

After the AC power failure event, the building equipment may be at an increased risk of creating a false alarm event. The battery may be discharged before a user can replace the battery or before a user is aware that the battery needs to be replaced. However, the systems and methods discussed herein can generate a recommendation that notifies an end user that a battery needs to be replaced within a particular time window. Every type of building device and battery may be unique, therefore, there may not be one single time window. Therefore, the systems and methods discussed herein can identify an optimal window for replacing the battery of the building equipment and generate and push a work order to a technician to replace the battery within the optimal window.

Referring now to FIG. 17, a battery replacement window probability distribution 1700 is shown, according to an exemplary embodiment. The distribution 1700 can be a distribution which identifies the optimal time from when an AC power failure event occurs that the battery should be replaced. In some embodiments, the probability distribution is generated based on historical data that indicates a time period between the AC power failure event and the LB event. It may be optimal practice to change the battery of the building equipment before the LB event occurs. In some embodiments, the distribution 1700 is further based on a particular type or characteristics of the battery that needs replacing and/or the install date of the battery.

In some embodiments, the median of the distribution may be the optimal time window to use in replacing the battery. However, since every battery has its own charge amount, discharge rate, and the equipment which the battery powers can cause the battery to discharge at varying amounts, the distribution 1700, since generated from historical data specific to the building equipment.

Referring now to FIG. 18, a process 1800 for detecting a false alarm rule sequence and generating a recommendation to replace the battery is shown, according to an exemplary embodiment. The process 1800 can be performed by the alarm analysis system 310 of FIG. 5A. Furthermore, any computing device described herein can be configured to perform the process 1800.

In step 1802, the alarm analysis system 310 can detect a false alarm sequence for battery replacement, e.g., the false alarm rule 1600 of FIG. 16 based on historical and/or real-time data. In some embodiments, detecting the false alarm rule 1600 triggering includes identifying that the AC power failure event has occurred for a piece of building equipment.

In step 1804, the alarm analysis system 310 can generate a battery life probability distribution identifying the probability of times between the AC power failure event and the LB event. It may be desirable that the battery be replaced before the LB event following the AC power failure event. In some embodiments, the distribution is a prediction performed with a machine learning technique e.g., Bayesian modeling, Metropolis Hastings Algorithm, etc. In some embodiments, step 1804 is performed in response to the step 1802 being performed. In some embodiments, the step 1804 is performed prior to the step 1802 occurring such that machine learning can be performed prior to the AC power failure event occurring since the machine learning used to generate the distribution 1700 may require a predefined amount of time to occur.

In step 1806, the alarm analysis system 310 can select an optimal time window for replacing the battery. In some embodiments, the time window is determined from the distribution 1700. For example, the median value of the distribution 1700 may be used as the time window for replacing the battery. In some embodiments, the time window, A is modified via an offset. For example, the time window A can be offset by a value B, e.g., A±B. In some embodiments, B is a predefined offset. In other embodiments, B is a standard deviation or variance of the distribution 1700. In some embodiments, the offset may be applied as A–B to provide an overhead amount of time to account for error and reduce the likelihood that the LB event occurs before the time A expires. In step 1808, the alarm analysis system 310 can generate a recommendation to replace the battery within the identified time window as determined in the step 1806.

In some embodiments, the time window is based on parameters of the battery. For example, the alarm analysis system 310 may consider battery life. Based on an installation date and/or time (or battery replacement date and/or time) and a current date and/or time, the alarm analysis system 310 can determine the time window. Furthermore, the alarm analysis system 310 can be configured to utilize characteristics of the equipment to identify the time window. For example, based on a model number, the alarm analysis system 310 can identify characteristics of the equipment that relate to how quickly the battery of the equipment discharges. For example, power requirements of the equipment can be used to identify the time window that the alarm analysis system 310 can identify based on the model number of the equipment. In this regard, the time window determined based on historical data can be adjusted based on the age of the battery and/or characteristics of the equipment.

Furthermore, the time window can be based on historical data of similar equipment and/or similar battery age. For example, the alarm analysis system 310 can select relevant historical equipment battery life data (e.g., data that pertains to batteries of similar capacities as the battery in question, similar equipment characteristics of the equipment in question, etc.) and then identify the time window based on the relevant historical data. The alarm analysis system can be configured to generate a probability distribution for relevant historical data and analyze the probability distribution to generate the time window.

Referring now to FIG. 19, a false alarm rule sequence for motion sensors 1900 is shown, according to an exemplary embodiment. The false alarm rule 1900 may be one of the false alarm rules 518. The false alarm rule 1900 can be a sequence of events that describe a false alarm that occurs during the opening and/or closing of a building. The false alarm rule 1900 includes three specific events, a burglar alarm (BA), followed by motion detected in a first zone (IR1) and motion detected in a second zone (IR2). Such a false alarm rule 1900 may be indicative of a burglar alarm, e.g., a door being opened, followed by motion being sensed in neighboring zones, i.e., Zone 1 may lead into, or be connected to, Zone 2. This may be an example third order sequence that can be determined by a GSP analysis and/or a third order Markov Chain analysis. If the false alarm rule 1900 triggers at a particular time of day, e.g., at an opening time of the building, the BA may be a false alarm event since a user may simply be opening up the building and walking through the building to an alarm panel or clock in station. In this regard, the alarm analysis system 310 can detect the alarm rule sequence 1900 and generate an appropriate recommendation to reduce false alarms from occurring at an opening or closing time.

Referring now to FIG. 20, a process 2000 for detecting the false alarm rule sequence 1900 and generating a recommendation to reposition a BA sensor is shown, according to an exemplary embodiment. The process 2000 can be performed by the alarm analysis system 310 of FIG. 5A. Furthermore, any computing device described herein can be configured to perform the process 2000. In step 2002, the alarm analysis system 310 can determine whether the false alarm rule 1900 has triggered in the past or has occurred in real-time. The alarm analysis system 310 can analyze historical events to determine whether the events trigger the false alarm rule sequence 1900. In some embodiments, the alarm analysis system 310 stores the opening and/or closing times of the building 10a. Therefore, the alarm analysis system 310 may look for the false alarm sequence 1900 to occur at the opening and/or closing time. For the opening time, the sequence may be BA Event, IR1, followed by IR2. However, for the closing time, the sequence may be IR2, IR1, followed by the BA Event.

In step 2004, alarm analysis system 310 can generate a recommendation to reposition the building sensor associated with the BA event. The BA event may be an event that occurs when an occupant opens a building in the morning and, thus, should not have triggered. This may be indicative of the building sensor being improperly installed. Therefore, the recommendation may be to send a technician to reposition the sensor to prevent the false alarm from occurring in the future. In step 2006, the generate recommendation of the step 2002 can be provided to an end user for review. In some embodiments, the alarm analysis system 310 can automatically generate a work order to cause a technician to reposition the improperly installed sensor.

Figure 21:
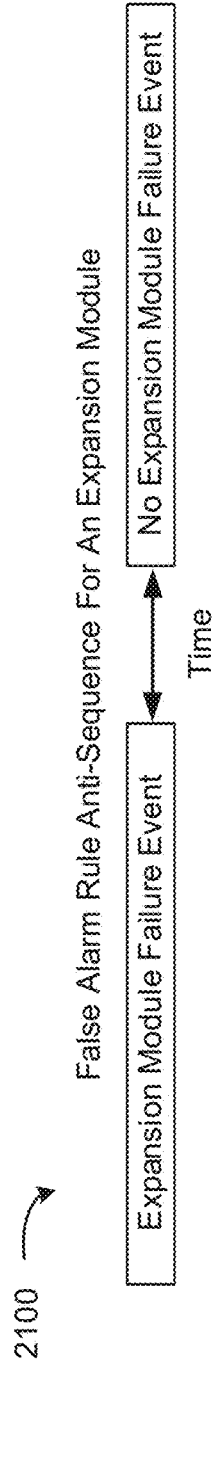
FIG. 21 is a false alarm event anti-sequence for an expansion module, according to an exemplary embodiment.

Referring now to FIG. 21, a false alarm rule anti-sequence for an expansion module 2100 is shown, according to an exemplary embodiments. The false alarm rule 2100 illustrates a sequence of two events that indicates an expansion module failing followed by the expansion module recovering within a time window. Therefore, the rule sequence 2100 is a sequence of events that indicates a time window, that, if the expansion module recovers within, no technician dispatch is required. However, if the expansion module does not recover within the time window, a technician dispatch may be required since the error which the expansion module is experiencing may not be temporary but rather may be that the expansion module is broken. The false alarm rule 2100 can be considered an "anti-sequence," i.e., if the expansion module fails and the expansion module does not restore itself within the time window (e.g., 12 hours), a technician needs to perform maintenance on the expansion module. The alarm analysis system 310 can be configured to determine the time window based on historical data for one or multiple expansion modules. The historical data may be data that forms the pattern of events shown in FIG. 21.

In FIG. 21, a first event, an expansion module failure event, occurs. This event is followed by a no expansion module failure event, i.e., the expansion module 2202 coming back online automatically. Based on historical data, if the false alarm rule 2100 is detected, a threshold time window can be determined. If the expansion module does not come back online within the threshold time window, the alarm analysis system 310 can generate a recommendation to replace or perform maintenance on the expansion module 2202.

Figure 22:
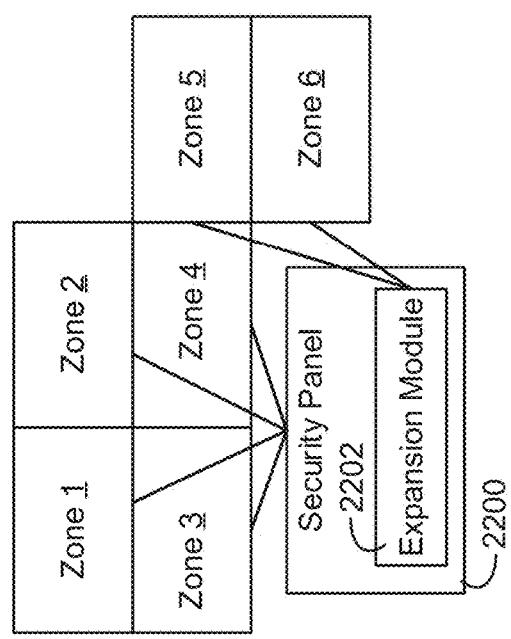
FIG. 22 is a block diagram of zones of the building of FIG. 1 and the expansion module for servicing additional zones, according to an exemplary embodiment.

Referring now to FIG. 22, zones of the building 10*a* and an expansion module 2202 for servicing zones of the building 10*a* that a security panel 2200 cannot service, according to an exemplary embodiment. In FIG. 22, the zones 1-6 are shown for the building 10*a*. Each of the zones 1-6 can have various security devices, e.g., motion sensors, alarms, etc. The devices for the zones 1-4 can communicate to the security panel 2200. The security panel 2200 may analyze data received from the devices of the zones 1-4 and further send the data to the alarm analysis system 310. The security panel 2200 may only be able to service a particular number of zones. Therefore, the expansion module 2202 can be used with the security panel 2200 to service the systems of additional zones, e.g., zone 5 and zone 6.

Figure 23:
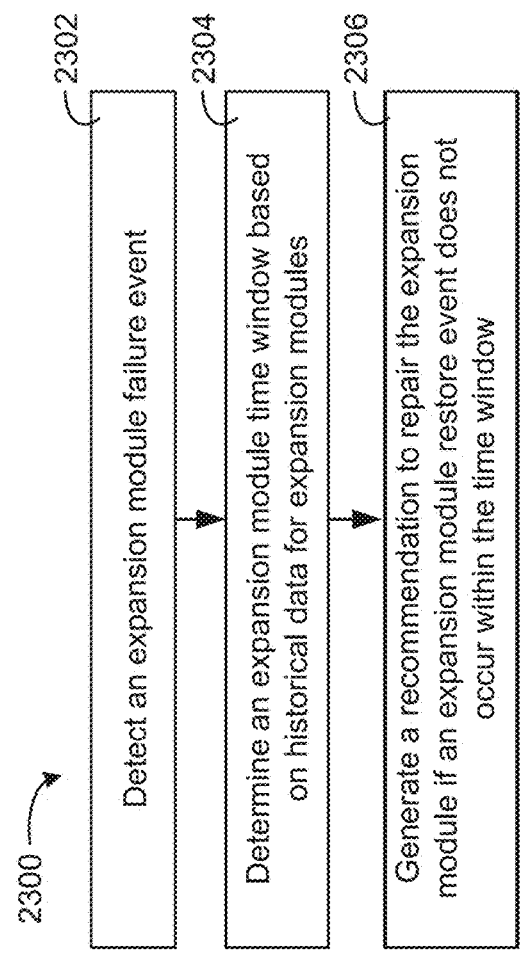
FIG. 23 is a flow diagram of a process for generating a recommendation to repair an expansion module if the expansion module does not automatically restore itself within a time window, according to an exemplary embodiment.

Referring now to FIG. 23, a process 2300 is shown for generating a recommendation to perform maintenance on an expansion module if the expansion module fails to automatically restore itself within a time window is shown, according to an exemplary embodiment. The process 2300 can be performed by the alarm analysis system 310 of FIG. 5A. Furthermore, any computing device described herein can be configured to perform the process 2300. In step 2302, the alarm analysis system 310 can detect an expansion module failure event for an expansion module, e.g., the expansion module 2202.

In step 2304, the alarm analysis system 310 can determine a time window based on historical data which indicates a period of time that, if the expansion module 2202 does not automatically restore itself within, requires a technician to perform maintenance on the expansion module 2202. In some embodiments, the time window can be provided to the CSAM so that the CSAM can adjusted or override the time window. The historical event data can be used by the alarm analysis system 310 to identify the time window. The historical data may indicate how long it takes in various instances for the expansion module 2202 for the expansion module 2202 to automatically come back online. The historical data may meet the pattern of the false alarm rule anti-sequence 2100. In some embodiments, the alarm analysis system 310 determines a probability distribution of times between which the no expansion module failure event occurs and the expansion module 2202 automatically recovers. In this regard, the alarm analysis system 310 can select a median value of the distribution and use the median value (e.g., the median value plus or minus an offset), as the time window within which the expansion module 2202 must automatically recover or otherwise a recommendation should be generated for a technician to replace or repair the expansion module 2202.

In the step 2306, the alarm analysis system 310 can generate a recommendation to repair the expansion module 2202 (or replace the expansion module 2202) if the expansion module 2202 does not automatically recover within the time window determined in the step 2304. In some embodiments, a work order is automatically generated with the recommendation and provided to a service technician who can respond to the recommendation.

Figure 24:
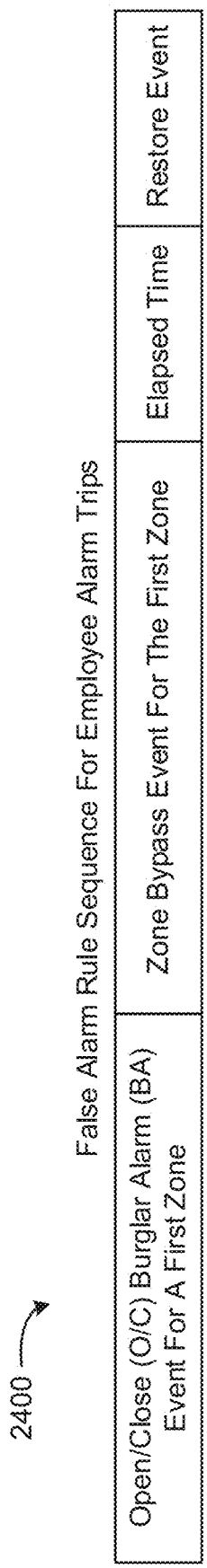
FIG. 24 is a false alarm rule sequence for an employee alarm trip, according to an exemplary embodiment.

Referring now to FIG. 24, a false alarm rule sequence for employee alarm trips 2400 is shown, according to an exemplary embodiment. The false alarm rule sequence 2400 may indicate that an Open/Close (O/C) Burglar Alarm (BA) event occurs for a first zone of the building 10*a*. This event may be followed by a zone bypass event for the same first zone. After a predefined amount of time elapses, e.g., 120 seconds, a restore event occurs.

Figure 25:
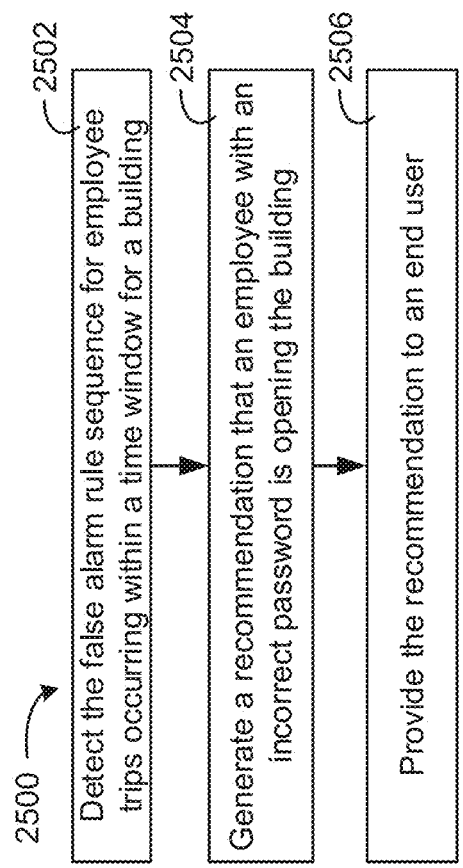
FIG. 25 is a flow diagram of a process for detecting the false alarm rule sequence for the employee alarm trip of FIG. 24 and generating a recommendation to reduce employee caused false alarms, according to an exemplary embodiment.

Referring now to FIG. 25, a process 2500 is shown for detecting the false alarm rule sequence for employee alarm trips sequence 2400, according to an exemplary embodiment. The process 2500 can be performed by the alarm analysis system 310 of FIG. 5A. Furthermore, any computing device described herein can be configured to perform the process 2500. In step 2502, the alarm analysis system 310 can determine whether the false alarm rule sequence 2400 has occurred. In some embodiments, the alarm analysis system 310 determines whether the alarm rule sequence 2400 occurs within a particular time, e.g., an opening time of the building 10*a*. If the sequence 2400 occurs during the opening time (e.g., a time window between 8:50 A.M. and 9:10 A.M. on a weekday), this may be indicative of a sequence of events that can cause a false alarm. However, if the sequence of events occurs outside the opening time, the alarm analysis system 310 may determine that the sequence relates to a true alarm.

In step 2504, the alarm analysis system 310 can generate a recommendation that an employee with an incorrect password is opening the building 10*a* and that better employee training or scheduling needs to be implemented. In step 2506, the alarm analysis system 310 can provide the recommendation to an end user. In some embodiments, the recommendation is provided to a shift manager or other supervisor who can better inform employees or adjust employee opening schedules so that an employee with a correct password is opening the building 10*a*. In some embodiments, the employee schedule may be automatically generated by a computing device, therefore, the alarm analysis system can cause the employee schedule to be generated such that the employee with the incorrect password is not scheduled to open the building. Furthermore, the alarm analysis system 310 can generate a correct password for the employee and provide the new correct password to the employee.

Figure 26:
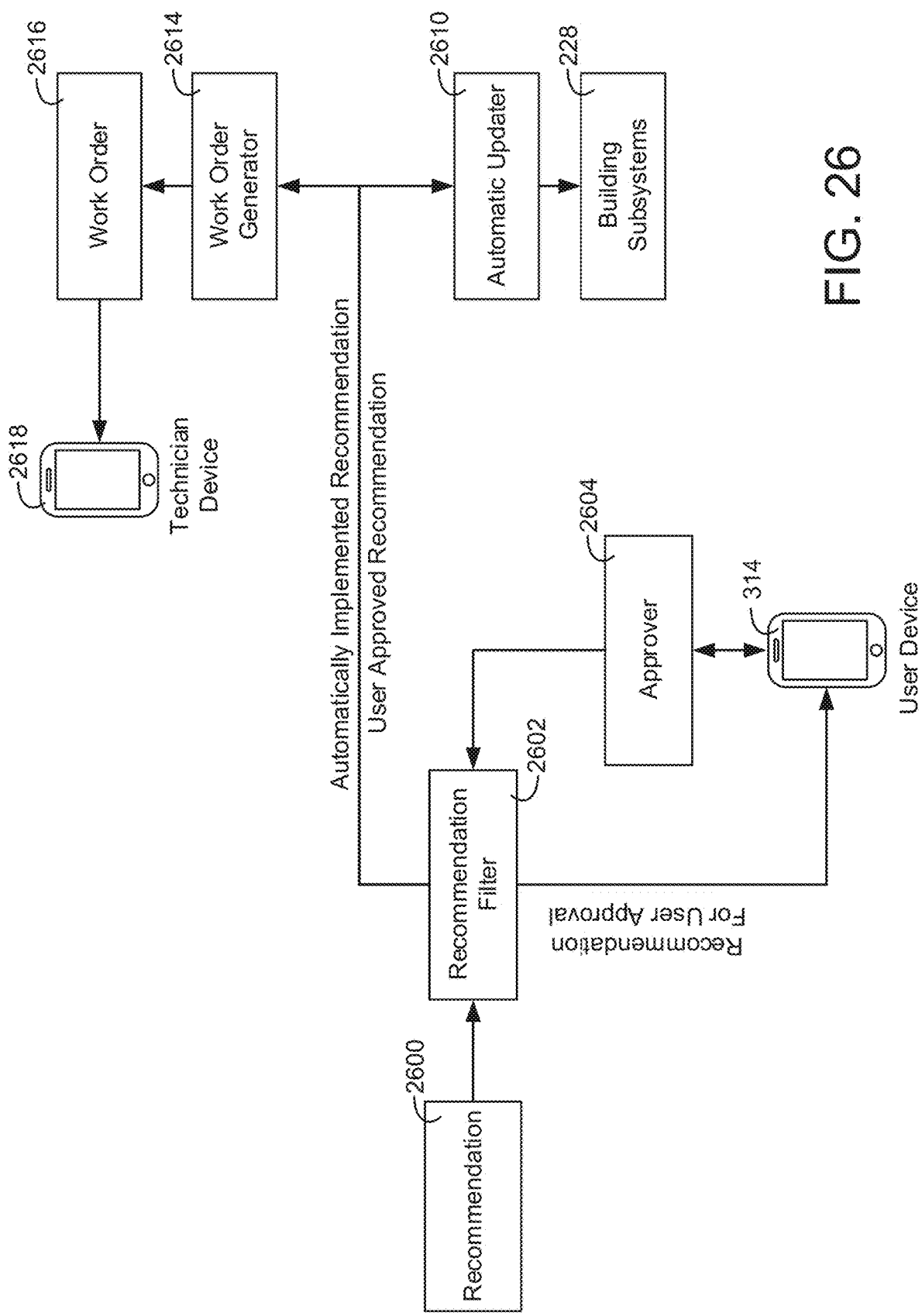
FIG. 26 is a block diagram of components of the alarm analysis system of FIG. 4 for implementing a recommendation filter to automate the implementation of some recommendations and receive approval for implementing other recommendations, according to an exemplary embodiment.

Referring now to FIG. 26, a block diagram of components of the alarm analysis system 310 of FIG. 4 configured to generate recommendations for suppressing false alarms is shown, according to an exemplary embodiment. In FIG. 26, a recommendation 2600 is provided to the recommendation filter 2602 and/or the approver 2604. The recommendation 2600 can be a recommendation generated by the systems and methods discussed with further reference to FIG. 4 and FIG. 11.

The recommendation filter 2602 can apply one or multiple rules to the recommendation 2600 to determine whether to implement the recommendation 2600 automatically, or require user approval for the recommendation. For example, the recommendation filter 2602 can include a list of recommendations that do not require user approval. For example, a door delay update recommendation 2600, a recommendation 2600 to perform a system self-test may not require user approval (although a warning of the self-test may alert a user of the self-test in advance of the self-test occurring (e.g., a twenty four hour warning)), generating a work order to reposition a system sensor may not require user approval. In some embodiments, the list of allowed user recommendations for automatic implementation is customizable. Therefore, a user can set and update the list so that the rules they would like automatically implemented are automatically implemented but the rule they would like to review before implementing they are able to review. If the recommendation filter 2602 determines that the recommendation 2600 does not require user approval, the recommendation filter 2602 can provide the filtered recommendation, an automatically implemented recommendation, to the work order generator 2614 and/or the automatic updater 2610.

In some embodiments, the recommendation filter 2602 only allows recommendations to make parameter changes within a predefined range. For example, the recommendation filter 2602 may cause a door delay to remain within an upper and lower bound. The upper and lower bound may be defined by a regulatory requirement. Furthermore, the recommendation filter 2602 may have a user approved range. If the recommendation is to make a parameter change outside the user approved range, the recommendation, even though automatically allowed by the user, may require the end user to review the recommendation if the parameter change is outside the user approved range.

The recommendation filter 2602 can be configured to provide the recommendation 2600 to the user device 314 in response to determining that the recommendation 2600 requires user approval. The approver 2604 can generate an interface prompting the user of the user device 314 to either accept or reject the recommendation 2600. For example, the interface may be the same and/or similar to the interface shown and described in FIG. 27. The user can accept the recommendation 2600 and in response to the user accepting the recommendation 2600, the approver 2604 can cause the recommendation filter 2602 to provide the recommendation 2600, a user approved recommendation, to the work order generator 2614 and/or the automatic updater 2610.

Some types of recommendations 2600 the recommendation filter 2602 can provide to the automatic updater 2610. These type of recommendations may include a recommendation to make a parameter or programming change to the building subsystems 228. However, other recommendations may require a maintenance technician to implement the recommended change. These types of recommendations the recommendation filter 2602 can provide to the work order generator 2614 so that a work order 2616 can be generated and provided to the technician device 2618.

The work order 2616 may be a work order to service the building subsystems 228. The work order 2616 can identify the change that should be made to the building subsystems 228, what parts should be brought along to the site etc. The parts that need to be brought along to the site may be based on the recommendation 2600. For example, if the recommendation 2600 is to change batteries for a sensor, the work order 2616 may indicate the type of batteries that the sensor takes. If the recommendation 2600 is a recommendation to reposition a ceiling mounted sensor, the work order 2616 can include a reminder to bring a ladder to the building 10*a*. In this regard, the work order generator 2614 can be configured to analyze the recommendation 600 and identify any required material that is required for performing the maintenance on the building subsystems 228.

In some embodiments, the work order generator 2614 is configured to assign the work order 2616 to a technician group based on the recommendation 2600. The work order generator 2614 can be configured to assign the work order based on technology specialty. For example, the work order generator 2614 can be configured to classify the recommendation 2600 as a recommendation to perform maintenance on HVAC devices, security devices, or building network services. In this regard, based on the classification of the recommendation 2600, the work order generator 2614 can automatically assign the work order 2616 to the appropriate technician group and push the work order 2616 to a technician device 2618 associated with the technician group.

In some embodiments, the work order generator 2614 receives a truck location signal from one or more technician trucks identifying the location of each of the technicians. The work order generator 2614 can determine, based on the recommendation 2600, whether special skill is required for performing the maintenance. For example, special skill may not be required to replace a battery on a security sensor. Therefore, a technician who specializes in HVAC might be assigned the work order 2616 instead of a technician who specializes in security systems if the HVAC technician is determined, by the work order generator 2614, to be located a predefined amount closer to the building 10*a* than the security technician.

The automatic updater 2610 is shown to receive the recommendation 2600 from the recommendation filter 2602. The recommendation filter 2602 can be configured to determine whether the recommendation 2600 can be implemented automatically, i.e., by the building subsystems 228 themselves, and provide the recommendation 2600 to the automatic updater 2610 instead of (or in addition to), the work order generator 2614. The automatic updater 2610 can be configured to interface with the building subsystems 228 and communicate implementation details of the recommendation 2600 to the building subsystems 228. For example, if the recommendation 2600 is to perform a system restart on a piece of equipment of the building subsystems 228, the automatic updater 2610 can be configured to communicate to the specific piece of building equipment (or to the devices that control the specific piece of building equipment), and cause the specific piece of building equipment to perform the restart. Furthermore, for a parameter change, the automatic updater 2610 can be configured to determine that the recommendation 2600 is a recommendation to change a parameter and includes the new parameter value. The automatic updater 2610 can push the new parameter value to the building subsystems 228 and cause the building subsystems 228 to operate with the new parameter value.

Figure 27:
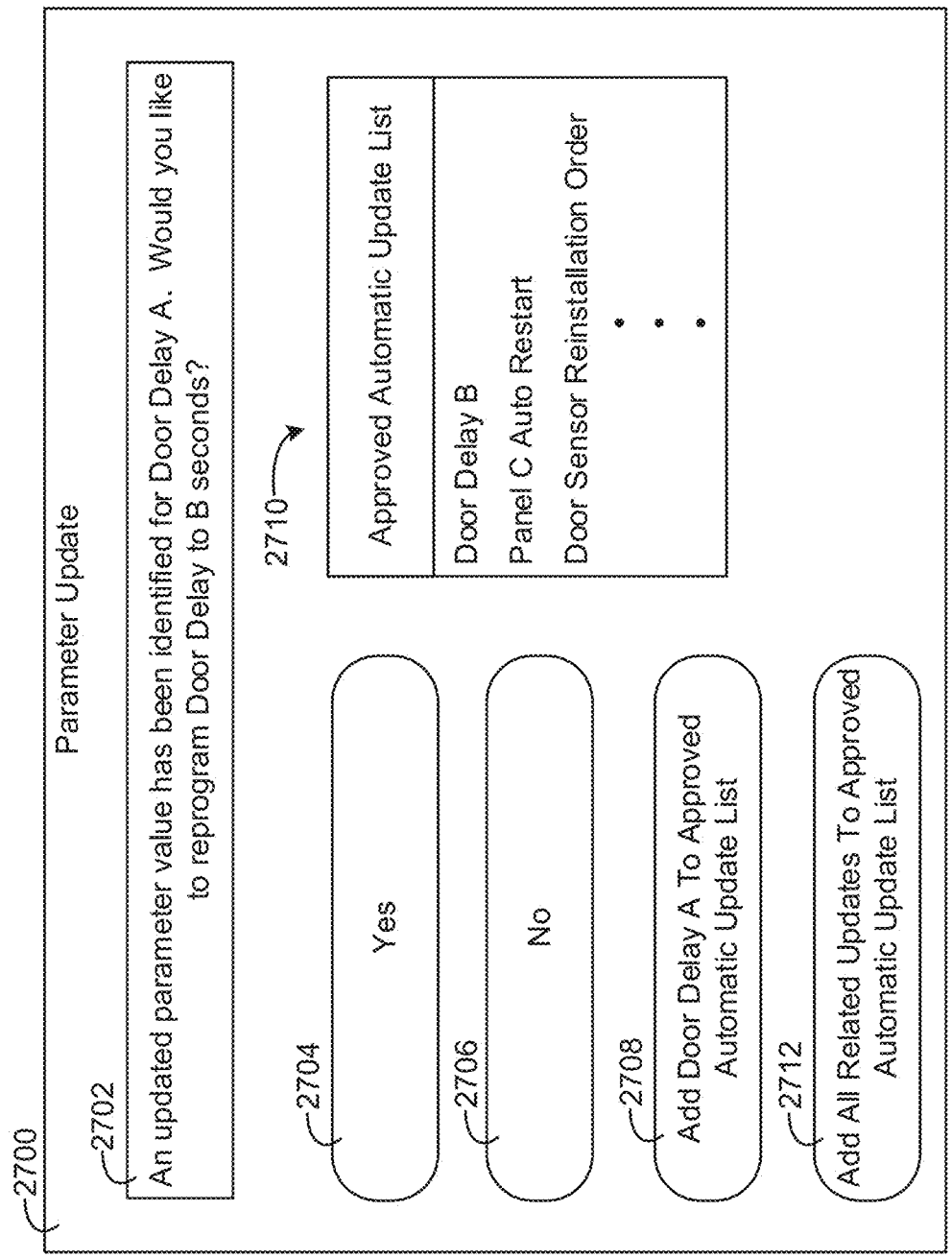
FIG. 27 is a block diagram of a parameter update interface requesting user approval to implement a parameter update to reduce false alarms, according to an exemplary embodiment.

Referring now to FIG. 27, a parameter update interface 2700 is shown for allowing a user to approve or reject a parameter change in addition to change the filter parameters of the recommendation filter 2602 as described with further reference to FIG. 26, according to an exemplary embodiment. The recommendation filter 2602 and/or the approver 2604 can be configured to generate the parameter update interface 2700. Furthermore, any component of the alarm analysis system 310, specifically the interface system 308, can be configured to generate and operate the parameter update interface 2700. The approver 2604 can be configured to cause the user device 314 to display the parameter update interface 2700 and can further be configured to receive commands or selections of the user device 314 via the parameter update interface 2700.

The parameter update interface 2700 is shown to include a description window 2702 describing a particular recommendation. In the interface 2700 the recommendation is a recommendation to reprogram a door delay value for a specific door of the building 10a. The end user can review the recommendation and select the yes button 2704, the no button 2706, or a button to add the specific recommendation to an approved automatic update list. The approved automatic update list may be one of the filter parameters of the recommendation filter 2602 by which the recommendation filter 2602 determines whether user review and approval is required from the user device 314 to implement the recommendation 600. The add to automatic update list button 2708 can cause the recommendation 2600, or a brief description of the recommendation 2600 to be added the approved automatic update list 2710. The approved automatic update list 2710 can be a list including one or multiple types of recommendations that the user has granted pre-approval so that the user does not need to respond manually to each new recommendation 2600.

The button 2708 may add a specific parameter update to the approved automatic update list 2710. For example, reprogramming a specific door delay can be added to the approved automatic update list 2710. Furthermore, button 2712 can cause all similar parameter updates to be added to the approved automatic update list 2710. For example, if the user would like to add all door delay parameter adjustments to be performed automatically, the user can press the button 2712. If the user only wants the specific door delay to be updated, the button 2708 can be pressed.

Figure 28:
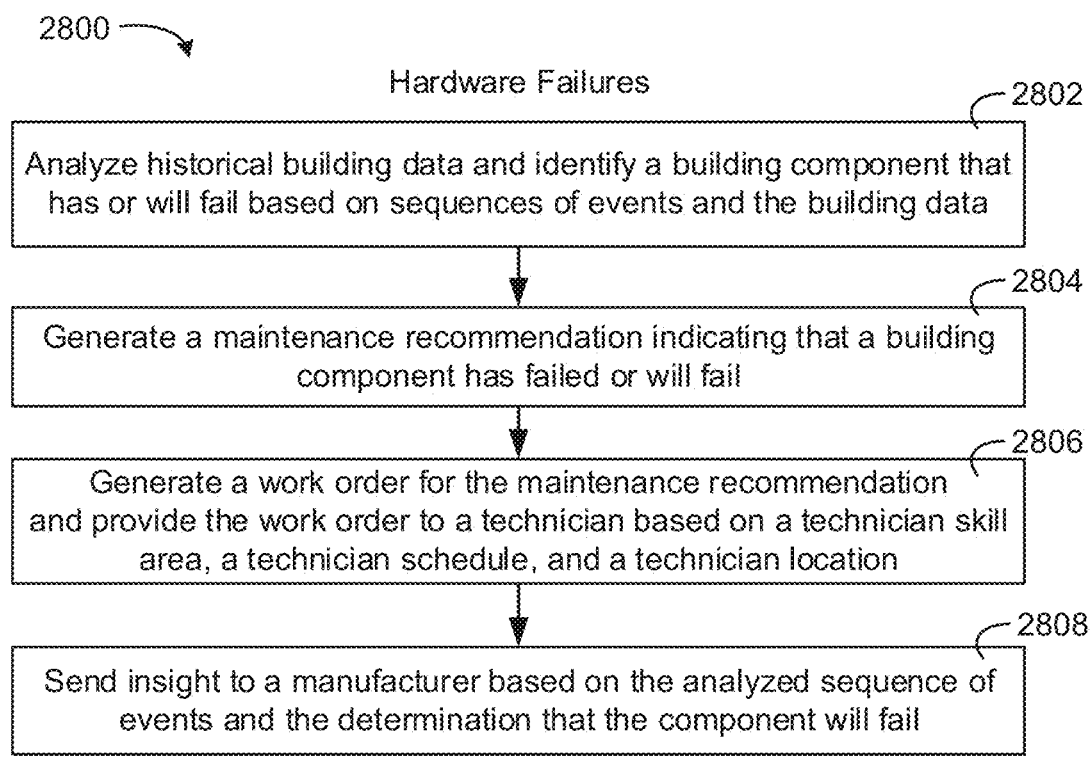
FIG. 28 is a flow diagram of a process for determining hardware failures of building components of the building of FIG. 1 and generating a recommendation to fix the hardware failures, according to an exemplary embodiment.

Referring now to FIG. 28, a process 2800 is shown for analyzing hardware failures for the building 10a, according to an exemplary embodiment. The process 2800 can be performed by the alarm analysis system 310 of FIG. 4. Furthermore, any computing device described herein can be configured to perform the process 2800. In step 2802, the alarm analysis system 310 can analyze historical data for the building 10a and determine whether there are any sequences of events within the historical data that correlate to sequences of events indicative of a piece of building equipment failing or potentially failing in the future.

In step 2804, the alarm analysis system 310 can generate a maintenance recommendation indicating that the building component has failed or will fail. The maintenance recommendation may be a recommendation indicated by a particular sequence of events. In step 2806, the alarm analysis system 310 can generate a work order for the maintenance recommendation and provide the work order to a technician based on a technician skill area, a technician schedule, and/or a technician location. In this regard, the work order can be assigned to a technician who is skilled in the technology necessary for performing the maintenance. Furthermore, the technician schedule may be taken into account. In some embodiments, a criticality level of the maintenance is analyzed with the technician schedule such that for a highly critical maintenance task, the most available technician is assigned the work order. For a low priority maintenance task, a technician who has an availability in the future, but not immediate availability, may be selected. Furthermore, location can be utilized in selecting the technician so that a technician who is nearby can be assigned the work order instead of a technician that is far away.

In some embodiments, the selection of a technician is formalized as an optimization problem by the alarm analysis system 310. For example, an objective function which describes assigning the work order to each of the technicians can be used. Various constraints, e.g., equality constraints or inequality constraints can be used to optimize the objective function. An equality constraint could be that for a particular work order, the sum of participation of each of multiple technicians is one where the participation of each technician is indicated by a one or a zero. This may cause the optimization to select only one of the technicians. An inequality constraint might be, that for a particular work order, a technician that can respond within a predefined amount of time is selected. This may verify that the most optimal technician is selected to perform the work order.

In step 2808, in some embodiments, the alarm analysis system 310 can send feedback to the building component manufacturer. The feedback may indicate that certain events cause the building components to fail or particular groups of building components to fail. In this regard an insight could be that a group of building components all fail together so that if one of the building components of the group fails, all of the components of the group should be replaced. This may aid the manufacturer is generating maintenance recommendations and instructions for performing maintenance and service on the building components that the produce.

Figure 29:
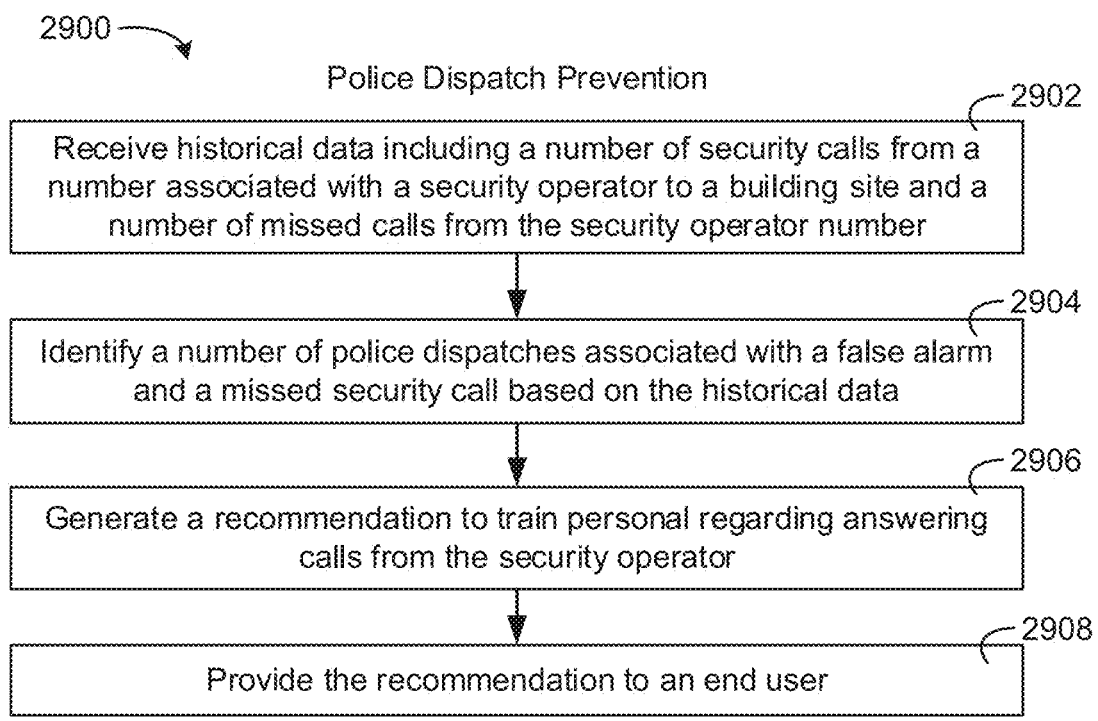
FIG. 29 is a flow diagram of a process for preventing unnecessary police dispatches to the building of FIG. 1, according to an exemplary embodiment.

Referring now to FIG. 29, a process 2900 for reducing the number of unnecessary police dispatches for the building 10a is shown, according to an exemplary embodiment. The process 2900 can be performed by the alarm analysis system 310 of FIG. 5A. Furthermore, any computing device described herein can be configured to perform the process 2900.

In step 2902, the alarm analysis system 310 can receive historical data indicating security calls from a security operator to the building 10. The historical data may indicate which calls were missed calls and which missed calls resulted in a police dispatch. When a building alarm occurs, a security operator may place a call to a building site to determine whether to send a police dispatch to the building. If no building occupants pick up the phone of the building 10a and speak with the security operator to indicate that there is no emergency, the security operator may initiate a police dispatch of a police officer to the building 10a.

In step 2904, the alarm analysis system 310 can determine how many police dispatches occurred in response to a false alarm and no occupant of the building 10a answering a call from the security operator. If the number is greater than a predefined amount, in step 2906, the alarm analysis system 310 can generate a recommendation to train building personal to properly answer calls from a security operator and, in step 2908, can provide the recommendation to an end user for review. In some embodiments, the recommendation may include statistics e.g., the rate at which security calls are being missed, a trend of the number of security calls missed over time, etc.

In some embodiments, the alarm analysis system 310 can perform a historical data analysis to identify call tree changes. A call tree may be a sequence of calls that are placed between various security personal, building managers, police departments, etc. that occur in response to an alarm being detected. In some embodiments, alarm analysis system 310 can generate a recommendation to adjust a call tree. For example, the alarm analysis system 310 can analyze historical data for various call trees of various buildings (e.g., the buildings 10*a-d*) and identify how the performance of the particular building and its particular call tree compares to buildings with different call trees or buildings with similar call trees.

For example, if the performance of the particular call tree of the particular building is poor but for other buildings using the same call tree, the performance is good (e.g., not resulting in a predefined amount of police dispatches for a false alarm), the alarm analysis system 310 may generate a recommendation to train personal since there may not be a problem with a call tree structure but rather with the training of particular personnel of the call tree. However, in some embodiments, the comparison may indicate that that other call trees of other buildings may work better than the call tree for the particular building. In this regard, the alarm analysis system 310 can generate a recommendation to adjust the call tree structure to be similar to the other buildings.

For example, the call tree structure of the particular building may be that remote security personnel calls on-premises security personnel in response to an alarm occurring at the building. This call tree structure may perform poorly for the building. However, another call tree structure for a different building may be that remote security personnel calls a building manager in response to the alarm occurring at the different building. This call tree may perform well for the other building. The alarm analysis system 310 can recommend that the particular building adopt the call tree structure of the other building.

Figure 30:
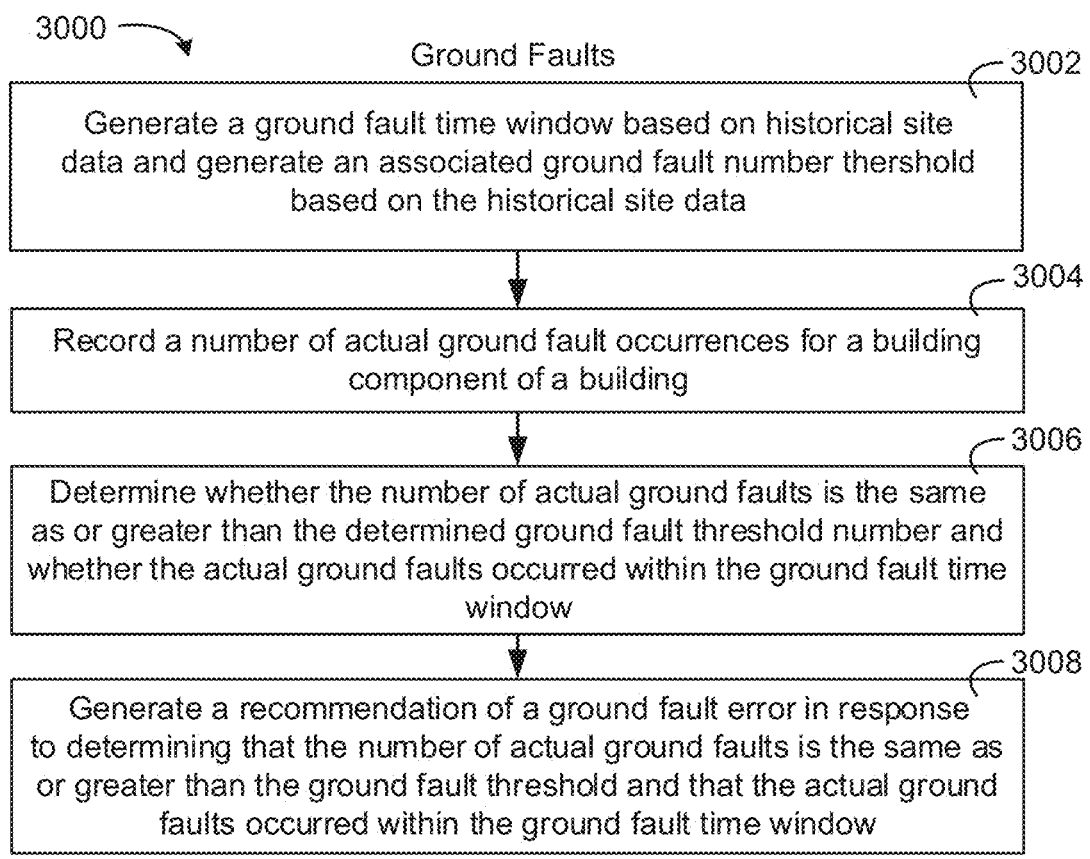
FIG. 30 is a flow diagram of a process for detecting ground faults for building equipment of the building of FIG. 1 and generating a recommendation to perform maintenance on the building equipment associated with the ground faults, according to an exemplary embodiment.

Referring now to FIG. 30, a process 3000 for detecting ground faults for building components of the building 10*a* and generating a recommendation to perform maintenance on the building components based on the detected ground faults is shown, according to an exemplary embodiment. The process 3000 can be performed by the alarm analysis system 310 of FIG. 4. Furthermore, any computing device described herein can be configured to perform the process 3000.

In step 3002, the alarm analysis system 310 can generate a ground fault time window based on historical data for the building 10. In some embodiments, the alarm analysis system 310 can analyze historical data to identify that a predefined number of ground faults occurring within a predefined period of time indicates that a particular piece of building equipment associated with the ground fault has failed and requires maintenance. The predefined number of ground faults may be used by the alarm analysis system 310 as a ground fault threshold.

In step 3004, the alarm analysis system 310 can analyze data, e.g., either historical data or real-time data, to determine a number of actual ground faults occurring for a building component of the building 10. In step 3006, the alarm analysis system can determine whether the number of actual ground faults is the same as or greater than the ground fault threshold and whether the actual ground faults occurred within the ground fault time window. In response to determining that the actual ground faults is greater than or equal to the ground fault threshold and have occurred within the time window, the alarm analysis system 310 can generate a recommendation to perform maintenance on the building component (step 3008). In some embodiments, the recommendation can be used to generate a work order and automatically dispatch the work order to a technician to perform maintenance on the building component (step 3008).

Figure 31:
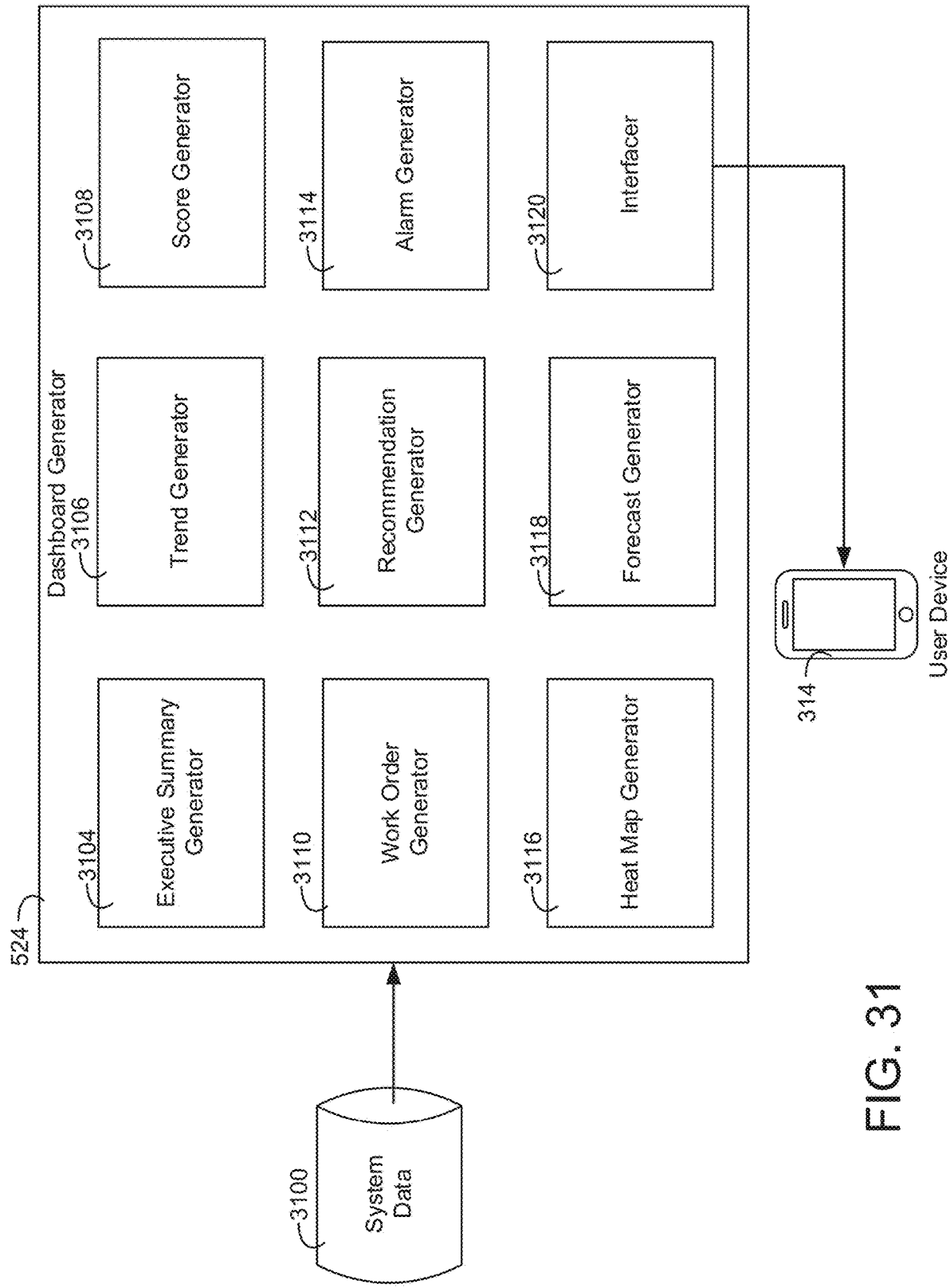
FIG. 31 is a block diagram of a dashboard interface generator of the alarm analysis system of FIG. 4 for generating the interfaces of FIGS. 37-51, according to an exemplary embodiment.

Referring now to FIG. 31, the dashboard generator 524 of FIG. 4 is shown in greater detail, according to an exemplary embodiment. The dashboard generator 524 can be configured to generate the interfaces of FIGS. 37-51 and the various components shown within the interfaces of FIGS. 37-51. The dashboard generator 524 is shown to include an executive summary generator 3104, a forecast generator 3118, a recommendation generator 3112, a work order generator 3110, a profile score generator 3108, an alarm generator 3114, a heat map generator 3116, a trend generator 3106, and an interfacer 3120.

The executive summary generator 3104 can be configured to generate an executive summary interface. The executive summary interface may be an interface e.g., the interface 3700 of FIG. 37 and/or the interface 4200 of FIGS. 42-43. The executive summary generator 3104 can generate a "todo" meter indicative of the current number of false alarm reduction recommendations for the building 10*a*. Furthermore, the executive summary generator 3104 can be configured to generate the executive summary interface to include an alarm trend indicating the alarms (e.g., alarms addressable by the false alarm rules 518) for the building 10*a* or other buildings over time. The trend can be generated by the trend generator 3106.

In some embodiments, the alarm trend indicates a number of addressable false alarms or a number of false alarms. For example, the trend may indicate a number of addressable false alarms that the trend generator 3106 can be configured to determine the number of addressable false by determining a number of triggered false alarm rules 518 and indicating the number and type of the triggered false alarm rules 518. In this regard, if five false alarms were determined that could be prevented based on door delay updates as can be determined via the false alarm rules 518, the trend could indicate the five false alarms that can be prevented via door delay updates.

In some embodiments, an addressable false alarm is a triggered false alarm rule 518. In some embodiments, an addressable false alarm is an alarm attributable to a triggered false alarm rule 518. For some types of false alarm rules 518, the false alarm rule 518 triggering indicates an addressable false alarm. For other types of false alarm rules 518, the false alarm rule 518 triggering may indicate that there is a group of false alarms that have occurred that are associated with the triggered false alarm rule 518 and are addressable.

The work order generator 3110 can be configured to generate and present work orders to an end user and/or technician. The work order generator 3110 can be configured to maintain a list of work orders and provide work order details to a user upon user request. The work order generator can be configured to generate the work orders window 4302 and/or the work order interface 4800. In some embodiments, the work order generator 3110 can be configured to generate a work order for each of the addressable false alarms. For example, for every false alarm rule 518 that triggers, a false alarm may be addressable. Based on a recommendation 526 for the false alarm rule 518, the work order generator 3110 can be configured to generate a corresponding recommendation. In some embodiments, the work order generator 3110 only generates for orders for recommendations 526 that cannot be automatically implemented, i.e., for recommendations that require manual maintenance or repair of building equipment.

The recommendation generator 3112 can be configured to generate interfaces presenting a user with false alarm reduction recommendations for reducing false alarms in the building 10*a*. The recommendation generator 3112 can be configured to generate the parameter update interface 2700 and/or the recommendation interface 4600 of FIG. 46. The alarm generator 3114 can be configured to generate an alarm interface e.g., the alarm interface 4400 of FIG. 44. The alarm generator can be configured to record alarms and generate a list of alarms and a potential recommendation for preventing the alarm from occurring in the future if the alarm is a false alarm.

The heat map generator 3116 can be configured to generate a heat map indicating where alarms for a particular building of an entity are occurring. For example, the heat map generator 3116 can generate the interface 4900 of FIG. 49 where particular geographic areas are colored different colors based on the number and severity of alarms that are occurring at particular building sites of the entity. The map generator 3116 can be configured to allow a user to view zoomed in map view, e.g., the interfaces 2400 and 2500 of FIGS. 24-25, where a user can view the alarms occurring at particular building sites.

The forecast generator 3118 can be configured to generate a forecast of the number and type of alarms that will occur in the future. The forecast generator 3118 can be configured to generate a predicted number of false alarm events that will occur in the future if a particular recommendation for preventing false alarms is implemented. Furthermore, a predicted number of false alarm events that will occur in the future if the particular recommendation is not implemented can be generated. The forecast generator 3118 can be configured to generate the forecast 4304 indicating predicted work orders, alarms, and/or police dispatches that may occur a predefined amount of time into the future (e.g., a week, a month, a year, etc.).

The interfacer 3120 can be configured to communicate the interfaces generated by the dashboard generator 524 to the user device 314. In some embodiments, the interfacer 3120 is a backend system for a mobile application installed and run on the user device 314. In some embodiments, the interfacer 3120 can generate a web based interface for a user of the user device 314 to log into via a web browser application of the user device 314. The interfacer 3120 can generate the interfaces for display on mobile devices, e.g., cell phones and/or tablets, in addition to desktop computers and laptops.

The profile score generator 3108 can be configured to generate a profile score for the building 10*a* and surrounding buildings, geographic regions (e.g., east coast, west coast, etc.), states (e.g., New York, Massachusetts, Ontario, Nova Scotia, Centre-Val de Loire, etc.), cities (e.g., Chicago, Las Angeles, etc.) and/or any other area or building. Profile score generator 3108 can be configured to generate a risk score for the building 10*a*. This risk score can allow an owner or operator of the building 10*a* to determine how well false alarms are being managed in the building 10*a*.

For a particular building 10*a* or for a group of buildings 10*a*-10*d* owned and operated by a particular entity, a risk score can be generated. The risk score may be that for a particular period of time, the total number of addressable alarms divided by the total number of alarms in the particular period is the risk score. For example, for a building 10*a* or a particular entity, the addressable alarms that can be addressed via the recommendations generated by the alarm analysis system 310, if the addressable alarms during a particular period is 30% of the total alarms, then the building 10*a* or the entity is managing 30% of their risk.

$$\text{Risk Score} = 1 - \frac{\text{Addressable Alarms}}{\text{Total Alarms}} \qquad \text{(Equation 11)}$$

For a particular building that is not addressing alarms via the alarm analysis system 310, the risk score for that building would be 1. The profile score generator 3108 can be configured to generate risk scores for individual sites, can develop a risk index for countries, states, and/or geographic regions (e.g., eastern, central, mid-west, pacific), can compare a risk score for a particular site (e.g., the building 10*a*) with the risk index, identifying neighboring building sites and compare the risk scores of the building sites, and/or compare risk scores for any and all building sites and/or entities.

The profile score generator 3108 can receive system data from the system data 3100 database and use the system data to determine the risk scores and risk profiles. The system data can include a number of alarms raised of the particular building state during a particular time period, a number of addressable alarms during the particular time period. The risk score generated by the profile score generator 3108 can be based singularly on the system data 3100, e.g., based on the addressable alarms and the total alarms but can, in some embodiments, be based on area of crime statistics associated with the area of operation of a system. The number of addressable alarms that occur within a particular period of time can be broken can be broken into various categories as defined by the alarm rules 518.

The profile score generator 3108 can compare a score for the building 10*a* against neighboring buildings and/or further against risk indices for countries, states, and/or regions. However, the profile score generator 3108 can be configured to determine to compare building site against each other based on their size or business category (e.g., grocery store, cell phone store, jewelry store, etc.) so that like sites are compared. To identify related sites, the profile score generator 3108 can be configured to analyze business type, site latitude, site longitude, system type, number of ones in the building (can be derived from a user_id events table), number of users in the building, number of doors in the building (e.g., can be derived from open/close events and zone_IDs from an events table), and/or the hours of operation of the building.

In some embodiments, the similarity score can analyze distance between sites to determine whether the sites are related. Based on a latitude and longitude values for the two sites, both a Euclidean distance and an arc distance can be determined (e.g., via GeoDistance function of Mathematica, R, or Python). In some embodiments, the arc distance and/or Euclidean distance are scaled (e.g., scaled by 10, 100, 1,000, etc.). For example, $$\text{Scaled Distance} = \frac{\text{Arc Distance (or Euclidean Distance)}}{\text{Scale Factor}} \qquad \text{(Equation 12)}$$

A final distance for identifying related sites can be, $$\text{Final Distance} = \text{Arc Distance} + \text{Normalized Euclidean Distance} \quad \text{(Equation 13)}$$

where the Normalized Euclidean Distance is a vector scaled to a unit norm.

System types can be compared for the systems via a system type function which takes in a categorical variable for a particular system and identifies whether it matches the relevant system type. For example, $$\text{Related Variable}(0 \text{ or } 1) = \text{System Type Function}(\text{Categorical Variable}_{System_i}) \quad \text{(Equation 14)}$$

The score generator 3108 can determine whether the systems are related based on the final distance, the arc distance, the Euclidean distance, the normalized Euclidean distance, the system types, the number of zones in each site, the number of users in each site, and the number of doors in each site, the score generator 3108 can determine whether the sites are related.

In some embodiments, the dashboard generator 524 can be configured to receive cost and fine information associated with false alarms and generate savings information indicative of the amount of money saved by performing false alarm reduction recommendations and insights. A user may input the cost of a false alarm via a user interface e.g., how much the user will be charged for a police response to a first false alarm, a second false alarm, etc. Based on this information, the dashboard generator 524 can be configured to identify how many false alarms are prevented by a user performing recommendations generated based on the false alarm rules 518. Based on this data, the dashboard generator 524 can be configured to provide various metrics to an end user indicative of how much money the user has saved by performing the recommendations. In some embodiments, the savings can be generated on an insight basis. For example, the interfaces can provide a user with a notification to perform maintenance and a metric indicating how many false alarms will be reduced by performing the maintenance and how much savings will occur from performing the maintenance.

The dashboard generator 524 can be configured to generate reports for an account and/or multiple accounts. The dashboard generator 524 can generate a report that displays information via the interfaces 3100-5100 and/or can generate an offline report, e.g., a PDF document, a MICROSOFT EXCEL® documents, etc. The report may track alarms, dispatches, site information (e.g., number of systems and/or sites), a number of police dispatches, false alarm rule related police dispatches, holdups, and/or various other metrics. Examples of data that can be included in a report are shown in Tables 5 and 6 below.

TABLE 5

National Account Report

| National Account Title | Number of Systems | Number of Sites | Number of System Alarms | Number of Police Dispatches (PDs) | Number of False Alarm Rule Related PDs | Number of Hold Ups |
|---|---|---|---|---|---|---|
| — | — | — | — | — | — | — |

TABLE 6

National Account Report

| % PD In False Alarm Rules | Number of False Alarm Rules Linked to Alarms | % Alarms Explained | Headquarters |
|---|---|---|---|
| — | — | — | — |

Furthermore, the report can include totals for the particular building sites and/or national accounts related to the number of false alarm rules 518 that have triggered. The false alarm rules, the number of related alarms that have occurred, the number of related police dispatches that have occurred, an alarm percentage, and/or a police dispatch percentage vs the number of alarms can be shown. Furthermore, a weekly report can be generated that indicates false alarm rules that have triggered for particular days of a particular week. An exemplary report is shown below in Tables 7 and 8.

TABLE 7

False Alarm Rule Report

| Action | Number of Alarms | Number of Police Dispatch | Alarm % | PD % vs Alarms |
|---|---|---|---|---|
| Site Not Closed on Schedule | — | — | — | — |
| PD after site not contactable | — | — | — | — |
| Motion Sensor | — | — | — | — |
| Early Open | — | — | — | — |
| Low Battery | — | — | — | — |
| Camera Not Connecting | — | — | — | — |
| Early Open with PD after site not contactable | — | — | — | — |
| Door Delay | — | — | — | — |
| Grand Total | — | — | — | — |

TABLE 7

False Alarm Rule Week Report

| | Monday | Tuesday | Wednesday | Thursday | Friday | Saturday | Sunday | Grand Total |
|---|---|---|---|---|---|---|---|---|
| Site Not Closed on Schedule | — | — | — | — | — | — | — | — |
| PD after site not contactable | — | — | — | — | — | — | — | — |
| Motion Sensor | — | — | — | — | — | — | — | — |
| Early Open | — | — | — | — | — | — | — | — |
| Low Battery | — | — | — | — | — | — | — | — |
| Camera Not Connecting | — | — | — | — | — | — | — | — |
| Door Delay | — | — | — | — | — | — | — | — |
| Grand Total | — | — | — | — | — | — | — | — |

Figure 32:
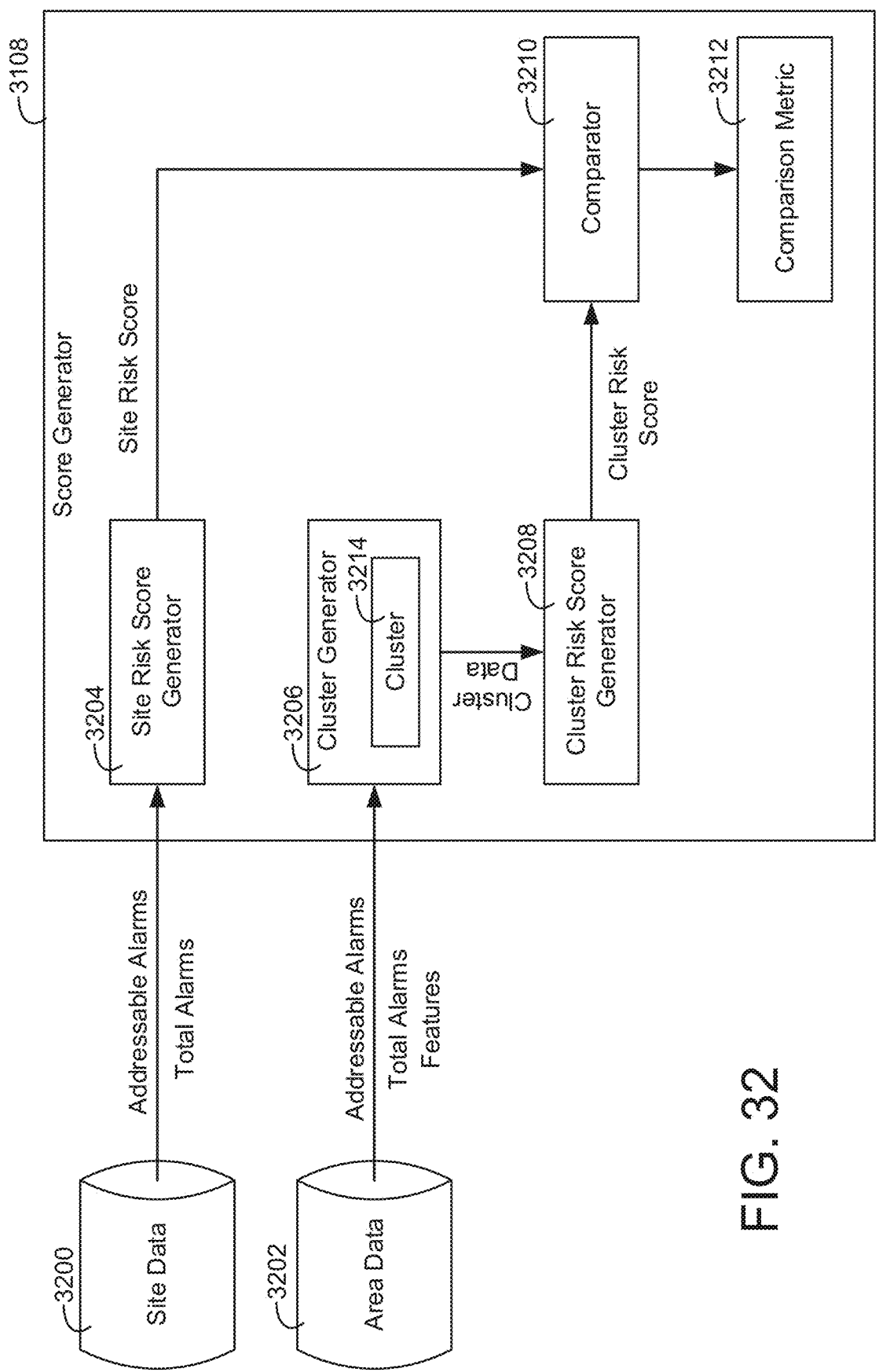
FIG. 32 is a block diagram of a score generator for comparing a risk score for the building of FIG. 1 to a risk score for a cluster of similar buildings, according to an exemplary embodiment.

Referring now to FIG. 32, a block diagram is shown illustrating the score generator 3108 in greater detail, according to an exemplary embodiment. The score generator 3108 is shown to receive site data 3200 for the building 10 and area data 3202 for a particular geographic area or geographic areas. The score generator 3108 is shown to include a site risk score generator 3204 and a cluster generator 3206.

The site risk score generator 3204 can be configured to generate a site risk score for the building 10a. In some embodiments, the site risk score generator 3204 determines a site risk score based on addressable alarms and total alarms received for the building 10a. The site risk score generator 3204 can be configured to utilize the equation, $$\text{Risk Score} = 1 - \frac{\text{Addressable Alarms}}{\text{Total Alarms}} \quad \text{(Equation 11)}$$

to determine the risk score for the building 10a. The cluster generator 3206 can be configured to receive the area data 3202 and generate a cluster 3214. The cluster 3214 may be a cluster of sites that are associated with the building 10a. In some embodiments, the distance between sites, the number of employees in the site, the types of systems that the buildings have, the number of doors and other information can be used to generate the cluster 3214. Based on the cluster data for the cluster 3214 (e.g., addressable alarms and total alarms), the cluster risk score generator 3208 can generate a cluster risk score for the cluster 3214. The cluster risk score can be generated by the Equation 11 and can be based on aggregate data for the clusters, e.g., an aggregate number of addressable alarms and an aggregate number of total alarms.

The score generator 3108 is shown to include a comparator 3210. The comparator 3210 can be configured to receive the risk score for the building 10a and the cluster risk score for the cluster 3214. The comparator 3210 can be configured to compare the site risk score and the cluster risk score to generate the comparison metric 3212. The comparison metric 3212 can be a difference between the risk scores, or a trend of the risk scores. In some embodiments, the comparator 3210 records and compares the site risk score and the cluster risk score over time so that a trend in the risk score can be determined. An example of such a trend is shown in further detail in FIG. 33.

Figure 33:
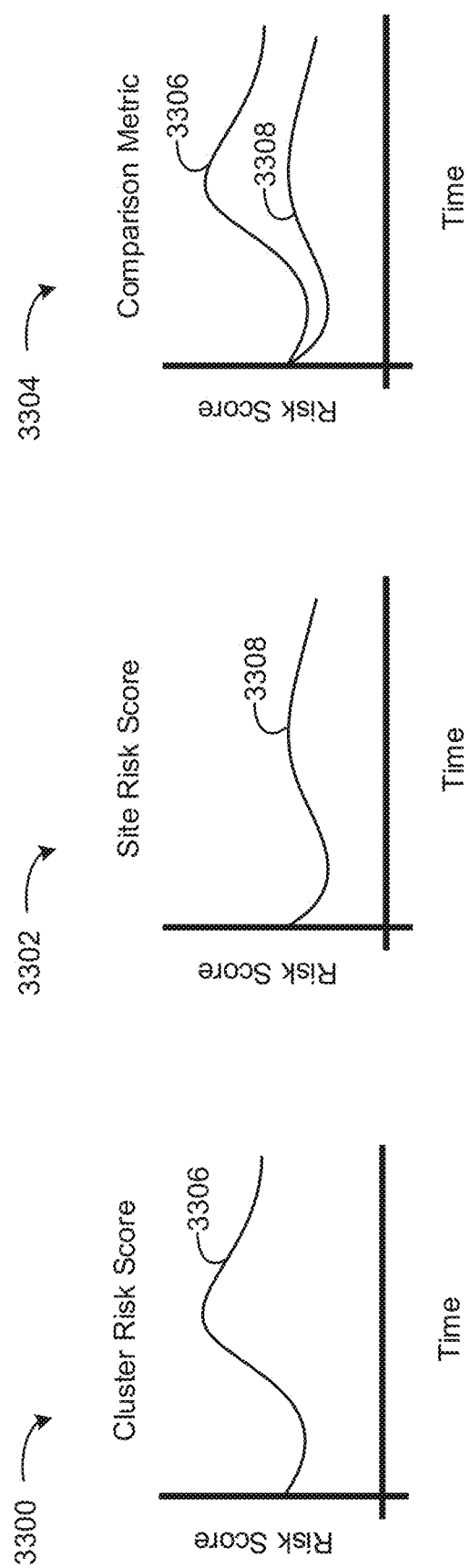
FIG. 33 is a set of graphs illustrating the risk score of the cluster of similar buildings and the risk score for the building of FIG. 1, according to an exemplary embodiment.

Referring now to FIG. 33, a cluster risk score trend 3300, a site risk score trend 3302, and a comparison metric trend 3304 are shown illustrating the determinations of the score generator 3116 of FIG. 32, according to an exemplary embodiment. The cluster risk score trend 3300 illustrates multiple risk scores generated for the cluster 3214 over time. The cluster risk score line 3306 tracks the cluster risk score over minutes, hours, days, months, and/or years. Although the line 3306 is shown to be continuous, the line 3306 can in some embodiments, be discrete samples of a risk score determined at particular times. Similarly, the site risk score trend 3302 illustrates the site risk score trended for the building 10a. The site risk score line 3308 can indicate the risk score of the building 10a over minutes, hours, days, months, and/or years. A comparison metric trend 3304 can be generated by the comparator 3210 (e.g., the comparison metric 3212). The comparison metric may be a trend of the cluster risk score and the site risk score. Therefore, the comparison metric can indicate the trends of the cluster risk scores and the site risk scores. Any one or combination of the trends 3300-3304 can be provided to an end user for review and tracking of the risk score for their site.

In some embodiments, the score generator 3108 can be used to negotiate with police departments, fire departments, or other security services based on the comparison metric 3212 and/or any of the other metrics generated by the score generator 3108. For example, the comparison metric 3212 can be used to negotiate for more frequent patrols and/or better police dispatch response times since the comparison metric 3212 can indicate that the building 10a rarely has false alarms. In some embodiments, the score generator 3108 can present an end user with a dashboard of the graphs of FIG. 33 or can provide the dashboard to a police department or other security provider. In some embodiments, a score generated by the score generator 3108 can place the building 10a in a particular tier in a tiered system which the police or fire departments utilize in determining which areas of a city require the most patrol or fastest response times. The scores can be used in various pricing oriented policies (POP) and/or for municipality credits.

Figure 34:
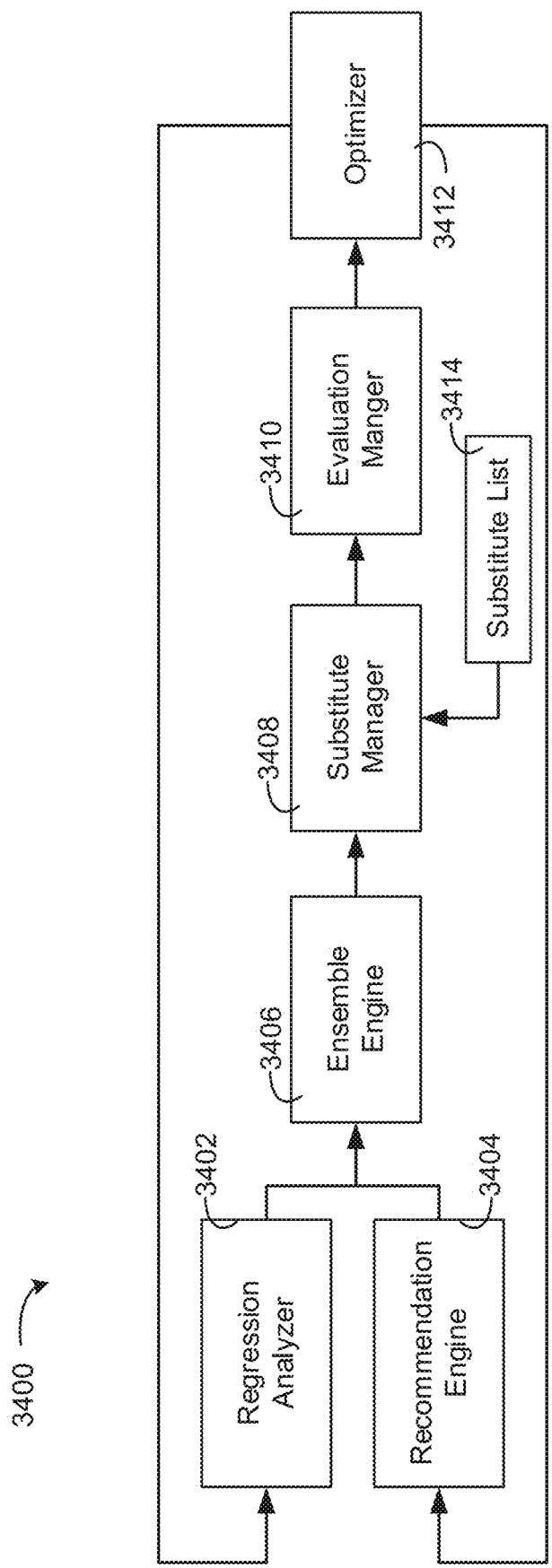
FIG. 34 is a block diagram of components of the alarm analysis system of FIG. 4 for managing service part replenishment for a truck and/or storage facility, according to an exemplary embodiment.

Referring now to FIG. 34, components 3400 of the alarm analysis system 310 of FIG. 4 for optimizing the purchasing of replacement parts is shown, according to an exemplary embodiment. In some cases, a service technician may arrive at a job site without having the correct parts to resolve a problem the first time the technician visits the site. On average, it may take approximately 2.6 site visits for a technician to complete a service job. This can reduce customer satisfaction because a fault is not resolved at the first technician visit and the customer wastes time and resources ensuing the technician is escorted to and/or from the equipment within the building and/or has access to the service area. The components 3400 can be operated to reduce inventory holding costs, prevent part shortages, and be able to apply substitute part lists to reduce excess part purchases. The components 3400 can predict the correct parts and/or quantities to purchase and/or include in a truck inventory, identify predicted parts that are not utilized, and determine optimal purchase costs for parts. Having the correct parts stored in an inventory and/or service truck can improve the rate at which a technician fixes a problem during a first site visit, increases customer satisfaction, reduces service miles driven by a technician, and overall improves service quality to a job site.

Components 3400 are shown to include a regression analyzer 3402, a recommendation engine 3404, an ensemble engine 3406, a substitute manager 3408, an evaluation manager 3410, and an optimizer 3412. The components 3400 can be configured to generate an optimal inventory for a technician vehicle and/or for a parts storage facility. Furthermore, based on a substitute list 3414, the substitute manager 3408 can further minimize the number of purchased parts by identifying building parts that can be substituted for one another. By reducing the number of parts required to be stored in a technician truck and/or warehouse, overhead costs that result from purchasing unnecessary building parts can be lowered.

Furthermore, the components 3400 can optimize the selection of what parts to buy so that although less parts are purchased, the parts purchased are the parts necessary for technician field maintenance. Reducing the number of components to be purchased and determining which components to purchase can make technician field maintenance trips more efficient since the technicians may have the necessary parts in their truck inventory or in a parts storage facility.

Three different models can be implemented by the components 3400. A base model, a quantity model, and a quantity cost model. The base model may have no restrictions on purchasing unique items or in the amount of money in part purchases is available. The quantity model can restrict the number of unique parts but not by item cost. Furthermore, the quantity cost model may restrict the number of unique parts and restrict part purchased by item cost.

Figure 35:
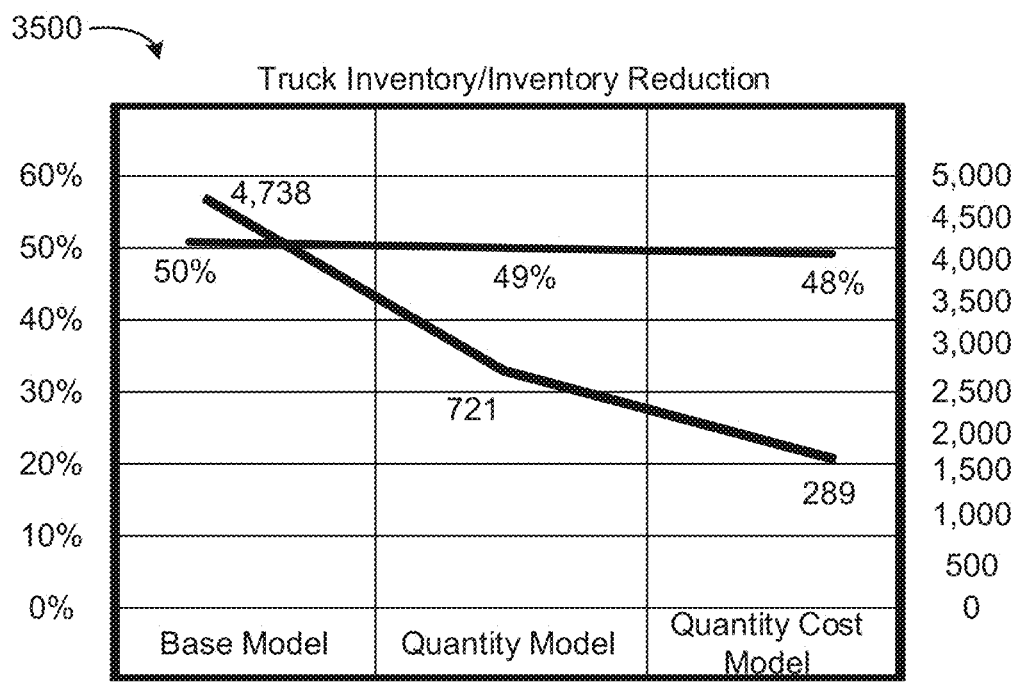
FIG. 35 is a graph illustrating the performance of the components for managing service part replenishment of FIG. 34 for truck inventory, according to an exemplary embodiment.
Figure 36:
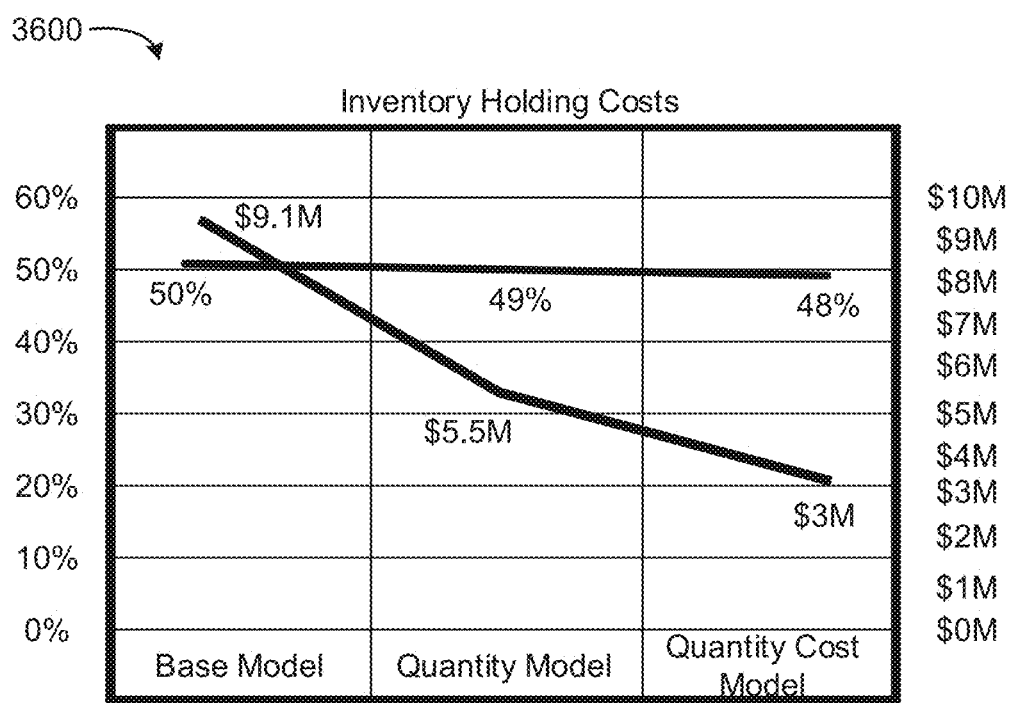
FIG. 36 is a graph illustrating the performance of the components for managing service part replenishment of FIG. 34 for an inventory, according to an exemplary embodiment.

Referring now to FIGS. 35-36, graphs 3500 and 3600 are shown illustrating the performance of the base model, the quantity model, and the quantity cost model of FIG. 34. The performance of the three models for truck inventor is shown in FIG. 35 by chart 3500. Furthermore, the performance of the three models for a parts facility inventor is shown In FIG. 36 by chart 3600. As can be seen from the FIGS. 35-36, the base model is the most expensive model requiring the highest purchase of parts. Furthermore, the quantity model reduces the parts cost while the quantity cost model reduces the inventor costs even further.

Referring now to FIGS. 37-51, interfaces 3700-5100 are shown for providing a user with insights and receiving input for controlling the security system 302a are shown, according to various exemplary embodiments. The interface system 308 can be configured to generate, via the dashboard generator 524, the interface 3700-5100 and provide the interfaces to the user device 314. Via the user device 314, a user can provide input to the alarm analysis system 310.

Figure 37:
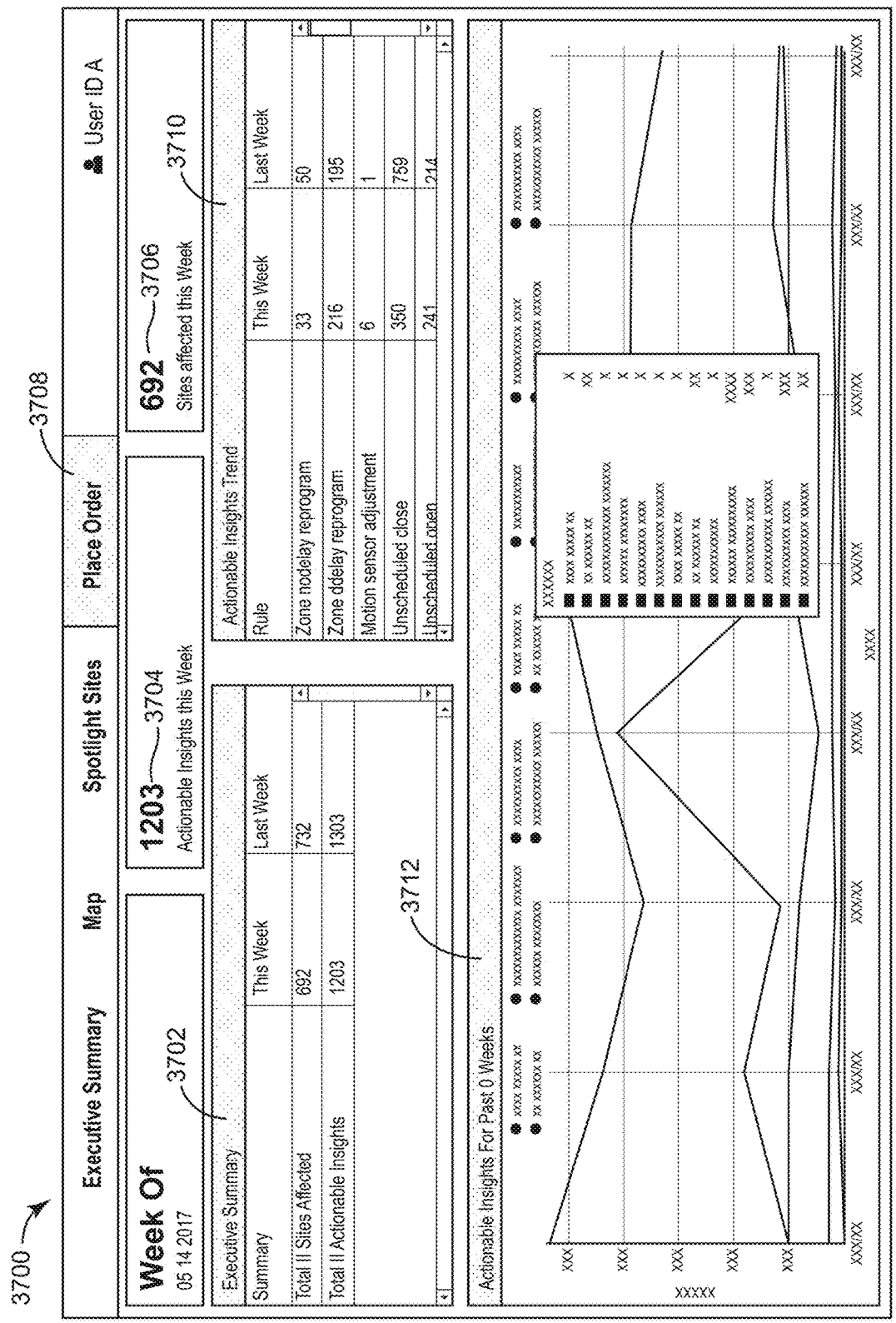
FIG. 37 is a dashboard interface displaying security information to a user for one or more buildings associated with the user, according to an exemplary embodiment.

Referring now to FIG. 37, a dashboard interface 3700 illustrating information for a user regarding one or more buildings associated with the user is shown, according to an exemplary embodiment. The interface 3700 is shown to include an identifier 3704 of the number of actionable insights for a current week. The insights may be the insights generated by the alarm analysis system 310. Furthermore, if the user is associated with multiple buildings, the number of sites affected in the current week is shown as identified by marker 3706.

The executive summary 3702 indicates the total number of sites affected in the current week and the total number of sites affected by alarms in the previous week. Furthermore, the executive summary 3702 shows the total number of actionable insights for all sights in the current week and for the previous week. An actionable insight trend 3710 is shown in interface 3700. The actionable insight trend 3710 indicates the various alarm rules 518 and the number of times the rule has been triggered in the current week and in the previous week.

An actionable insight trend 3712 illustrates a trend across multiple weeks of the number of times a rule or alarm has been triggered. There may be various rules or alarms included in the trend. Each rule or alarm may be indicated by a distinct colored line. If a user hovers over the actionable insight trend 3712 with a mouse cursor or otherwise interact with the actionable insight trend 3712, the user may be presented with the triggered rules or false alarms associated with the triggered rules and the number of times each false alarm rule or false alarm was triggered at a particular point in time.

Figure 38:
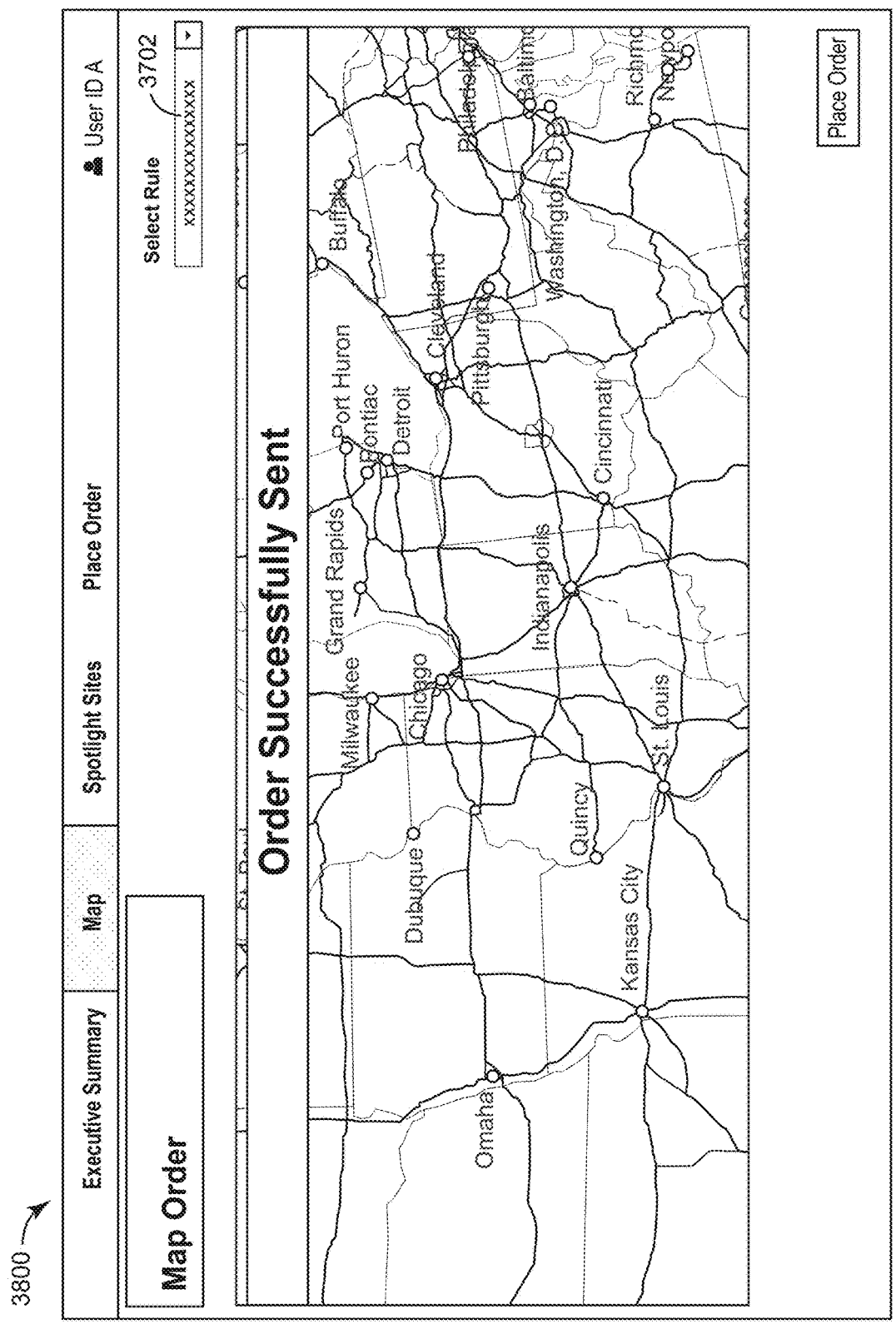
FIG. 38 is an interface indicating the locations of the one or more buildings of FIG. 37 on a map, according to an exemplary embodiment.

Referring now to FIG. 38, an interface 3800 is shown illustrating a map indicating the location of multiple buildings (e.g., the buildings 10a-10d), according to an exemplary embodiment. The map may indicate the location of multiple buildings associated with a particular entity (e.g., owner, company). Each building may be marked on the map of interface 3800. A user may interact with the particular building to review security system status for the building. The interface 3800 may include a rule filter 3802. The rule filter 3802 may include a particular false alarm rule that a user can select. Only buildings of the entity that are experiencing or have recently experienced the selected rule may then be displayed on the map of interface 3800.

Referring now to FIG. 39, an interface 3900 is shown indicating the performance of various sites associated with an entity, according to an exemplary embodiment. The interface 3900 may be a "spotlight" interface indicating the worst performing sites. A user may select the worst performing ten sites button 3902 to view the ten sites that have the highest number of rules or alarms triggered in the current week and further an indication of the number and type of each rule or alarm. If the user selects the worst performing ten sites trend analysis 3904, trend analysis for the worst ten sites may be displayed. The trend may be the same as and/or similar to actionable insights trend 3710 of FIG. 11. However, each trend may be for a particular site instead of all sights together.

Referring now to FIG. 40, a place order interface 4000 is shown, according to an exemplary embodiment. The place order interface 4000 may indicate various sites, the addresses for the sites, the city, the state, and/or the zip code. An alarm count may be displayed for each site. A recommendation for an alarm, e.g., the recommendation 526 of a particular rule, is displayed in the place order interface 4000. A user can review the recommendation and either place an order (accept the recommendation) or forego the order. Accepting the recommendation may cause an on-premises security system to be programmed with recommended parameters. In some embodiments, where a technician is required to go to the site (e.g., to adjust the position of a sensor, to directly implement a parameter change) placing an order may cause a site technician to visit the site and make the change.

Figure 41:
FIG. 41 is an login interface for a security system interface system, according to an exemplary embodiment.

Referring now to FIG. 41, an interface 4100 is shown for a user to login to the interfaces 3700-5100. The user may be provided with the login interface 4100 when the user navigates to a website or opens a mobile application via the user device 314. A user may provide a login ID and a password to access the interfaces 3700-5100.

Figure 42:
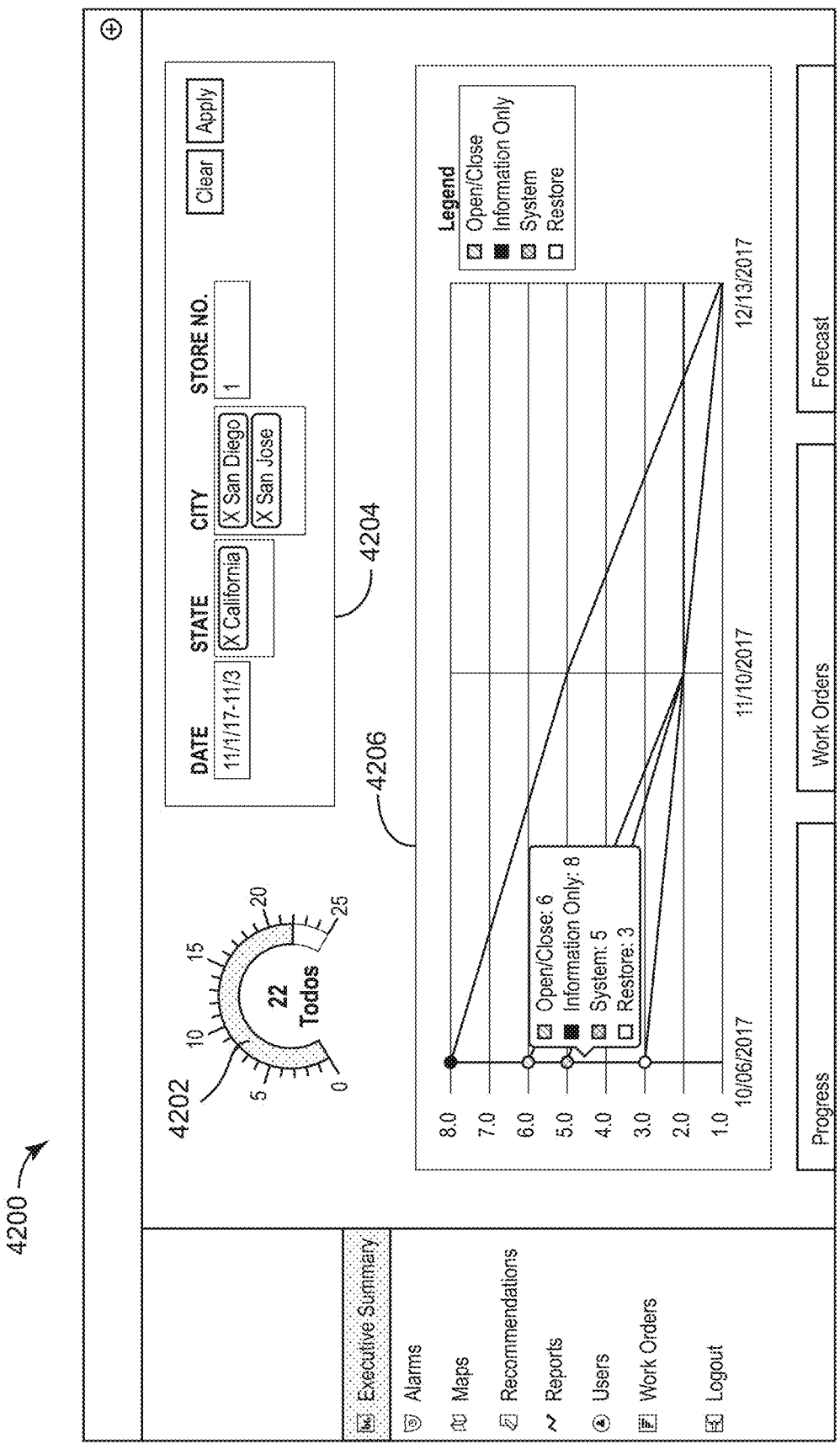
FIG. 42 is an executive summary interface displaying security information for one or more building sites, according to an exemplary embodiment.
Figure 43:
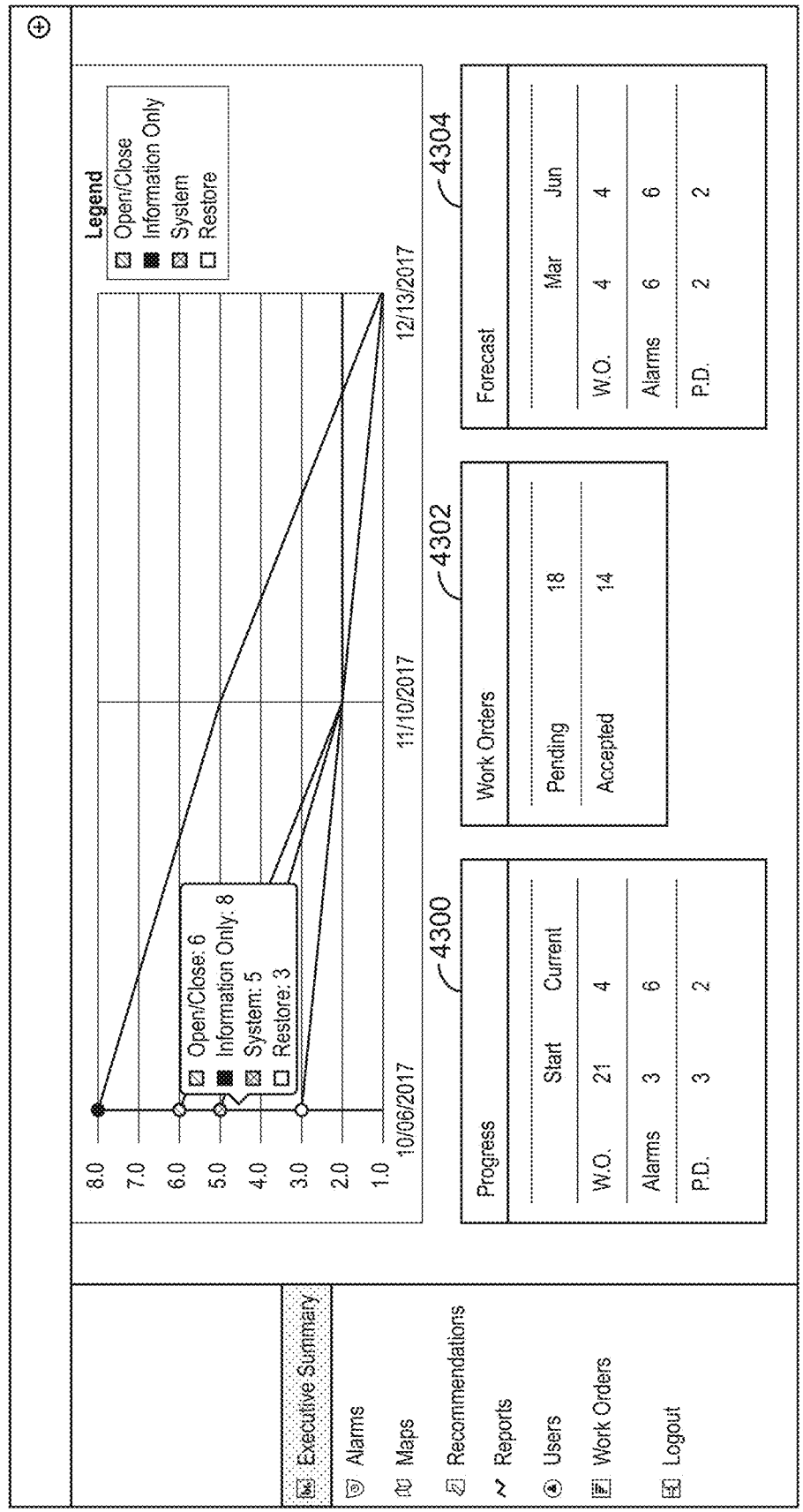
FIG. 43 is the executive summary interface of FIG. 42 shown to include a progress window, a work order window, and a forecast window, according to an exemplary embodiment.

Referring now to FIGS. 42 and 43, an executive summary interface 4200 is shown displaying security information for one or more building sites, according to an exemplary embodiment. The interface 4200 is shown to include a "todos" meter 4202. The todos meter 4202 can display the heath of one or multiple sites associated with a particular entity. More specifically, the todos meter 4202 can indicate a number of actionable insights for false alarm reduction that require user review and/or approval. In some embodiments, the meter 4202 can show a number of rules that have triggered or a number of building alarms (e.g., addressable alarms) that have occurred. The filter 4204 can be configured to filter the security information displayed in the interface 4200 to display security information for particular sites, e.g., for one or more states or cities, and/or for a particular date range.

Based on the filter parameters, the number of sites that remain after filtering may be displayed. The trend 4206 may display the number of different types of alarms that have been occurred. The alarm information of the trend 4206 may be governed by the filter parameters of the filter 4204.

In FIG. 43, the interface 4200 is shown to include a progress box 4300. The progress box 4300 may display the current number of work orders, alarms, and/or police department calls. The progress box 4300 may also show a starting number of work orders, alarms, and police department calls. In this regard, a user can track the performance of a building at a first point in time to the current point in time to identify whether the performance of the building is increasing. The work orders box 4302 may show the current number of pending and accepted work orders. The work orders can be work orders determined based on false alarm rules 518 triggering. The work orders can be accepted and/or rejected via the work order interface 4800. The forecast 4304 may indicate a predicted or forecasted number of work orders (W.O.), alarms, and police dispatches (P.D.) for multiple months into the future. In this regard, if the current month is February, predictions for the months of March and June can be generated. In some embodiments, the predictions are generated based on past performance. For example, based on the performance of months January and February, the dashboard generator 524 can be configured to generate predictions for March and June. In some embodiments, the dashboard generator 524 can be configured to implement a Bayesian model, e.g., the model described with reference to FIGS. 10A-10C to predict a number of work orders, alarms (e.g., addressable alarms, triggered false alarm rules 518), and/or police dispatches.

Figure 44:
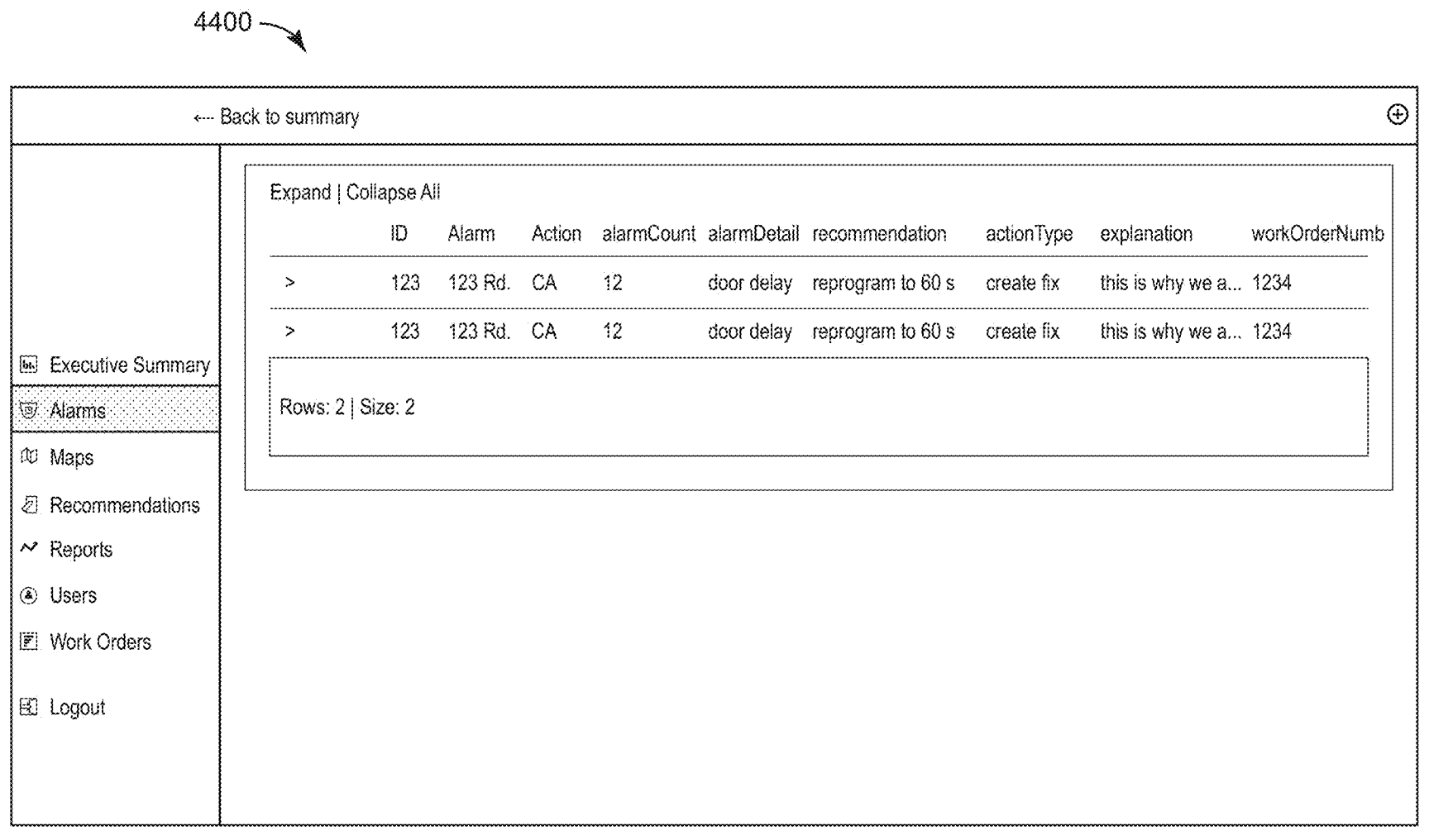

Referring now to FIG. 44, an interface 4400 is shown displaying various addressable alarms and recommendations for alarms, according to an exemplary embodiment. The recommendations may be that the recommendations 526 of the alarm rules 518. The interface 4400 may indicate a particular alarm identifier, an alarm name, an action, the number of ties the alarm has occurred, details on the alarm, the recommendation, an action type, and an explanation for the alarm. The user can accept the recommendation and a work order number may be generated and displayed in the interface 4400.

Figure 45:
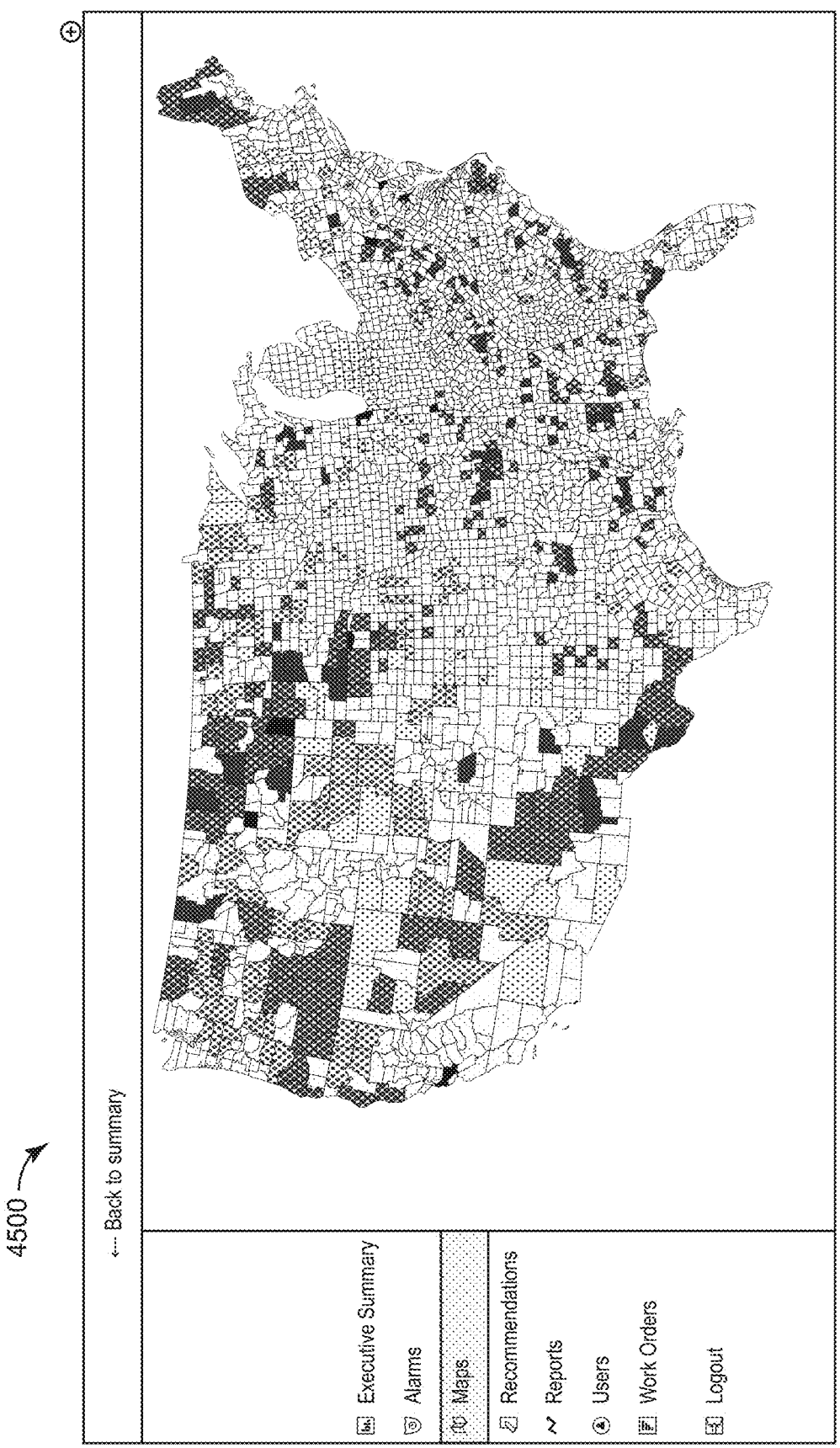
FIG. 45 is a map indicating the security status of sites in particular geographic regions, according to an exemplary embodiment.

Referring now to FIG. 45, a map interface 4500 is shown illustrating a map with different colored areas, according to an exemplary embodiment. The various colored areas may indicate that sites within the particular area are experiencing a particular number of alarms. For example, green areas may indicate that there are few or no alarms. However, red may indicate areas where the sites are experiencing a large number of alarms. Yellow regions may indicate a medium number of alarms or the potential that a significant number of alarms will occur in the future.

Referring now to FIG. 46, recommendations interface 4600 is shown, according to an exemplary embodiment. The recommendations interface 4600 shows a type of false alarm rule (e.g., door delay, scheduling error, etc.) and a recommendation for the false alarm rule. For the door delay alarms, the recommendation is to program the door delay to sixty seconds. The recommendations interface 4600 may display work orders and allow a user to generate a work order for a particular alarm.

Figure 47:
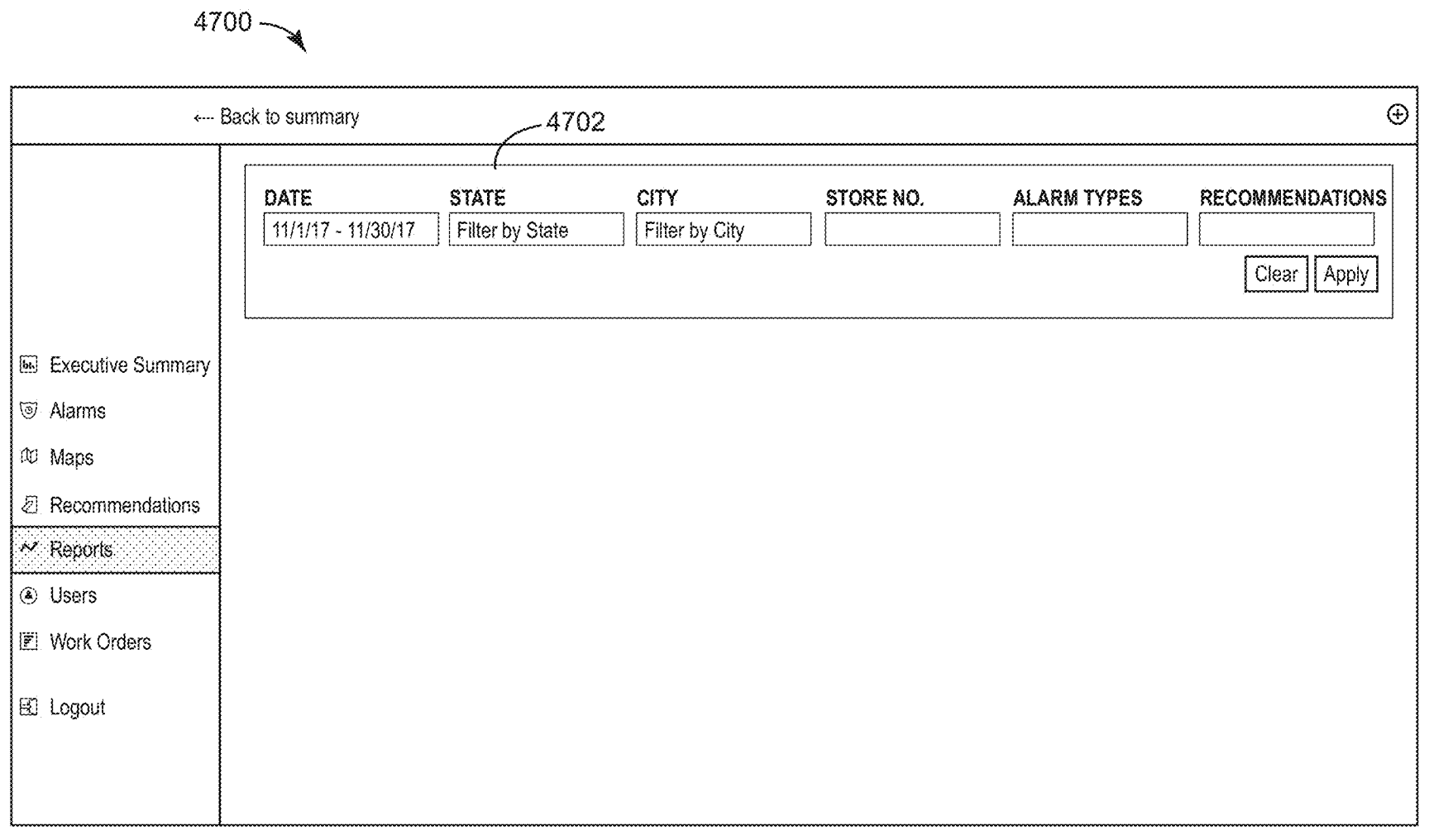

Referring now to FIG. 47, a reports interface 4700 is shown, according to an exemplary embodiment. The reports interface 4700 may show the security information for particular sites. The reports interface 4700 may include various alarm trends, the number and type of alarms, and various other security information. The interface 4700 may include a filter 4702 to filter the reports by particular date ranges, states, cities, alarm types, etc. Based on the filter parameters of the filter 4702, the number of sites associated with the filter parameters and the number of recommendations may be shown in the filter 4702.

Figure 48:
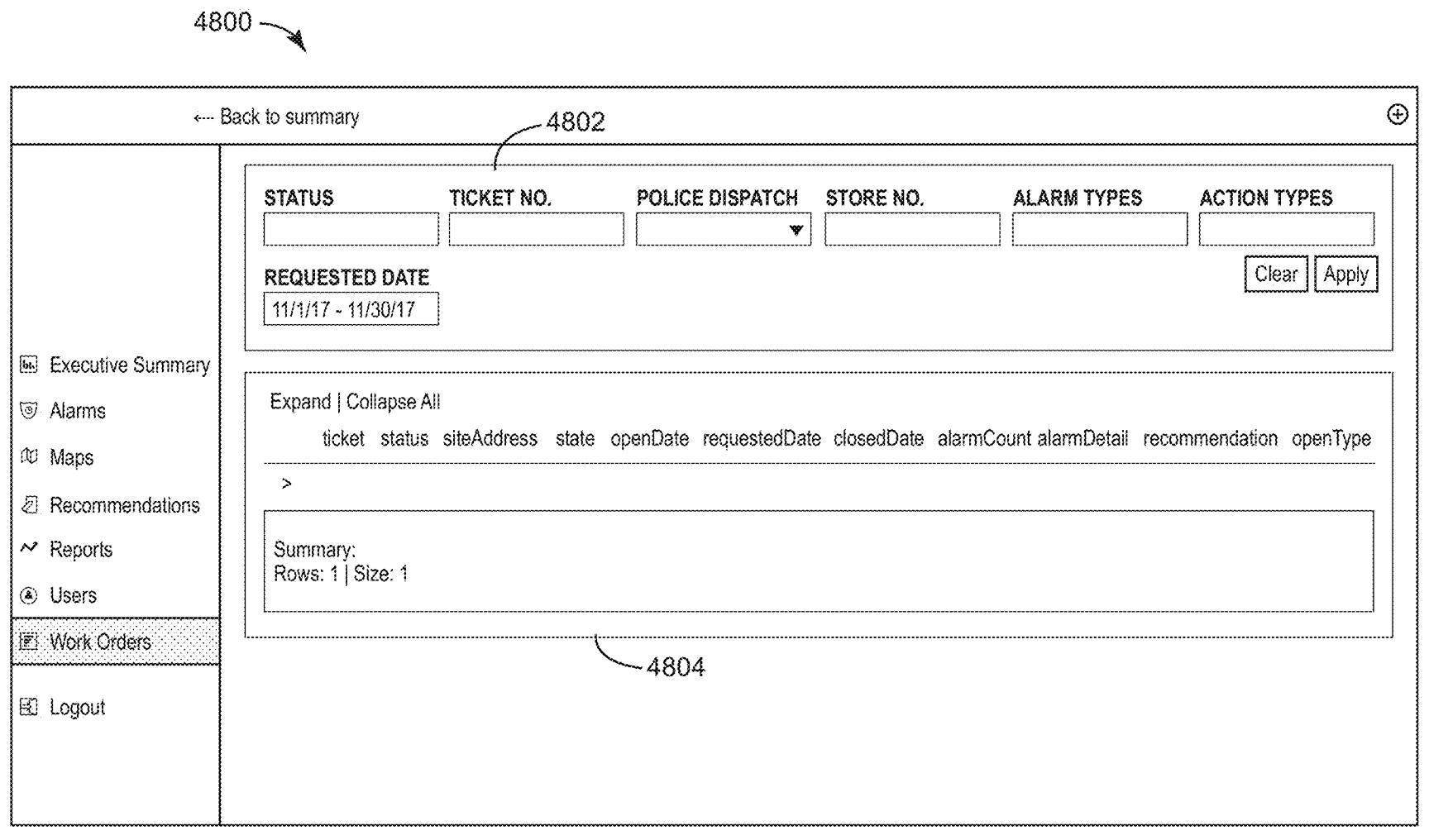

Referring now to FIG. 48, a work order interface 4800 is shown, according to an exemplary embodiment. The work order interface 4800 is shown to include a filter 4802 in which a user can input various filter parameters. The user can input a work order status, a ticket number, an associated police dispatch, a store number, an alarm type, an action type, and/or a request data and filter by one or more of the aforementioned parameters. The work order interface 4800 is shown to include a work order display 4804 where the various work orders filtered by the parameters of the filter 4802 are displayed. For each work order, a ticket number, a status, a site address, a site state, the date the work order was opened, the date the work order was requested, the date the work order was closed, the number of alarms associated with the work order, the details of the alarm, the recommendation, and an action type can be displayed.

Figure 49:
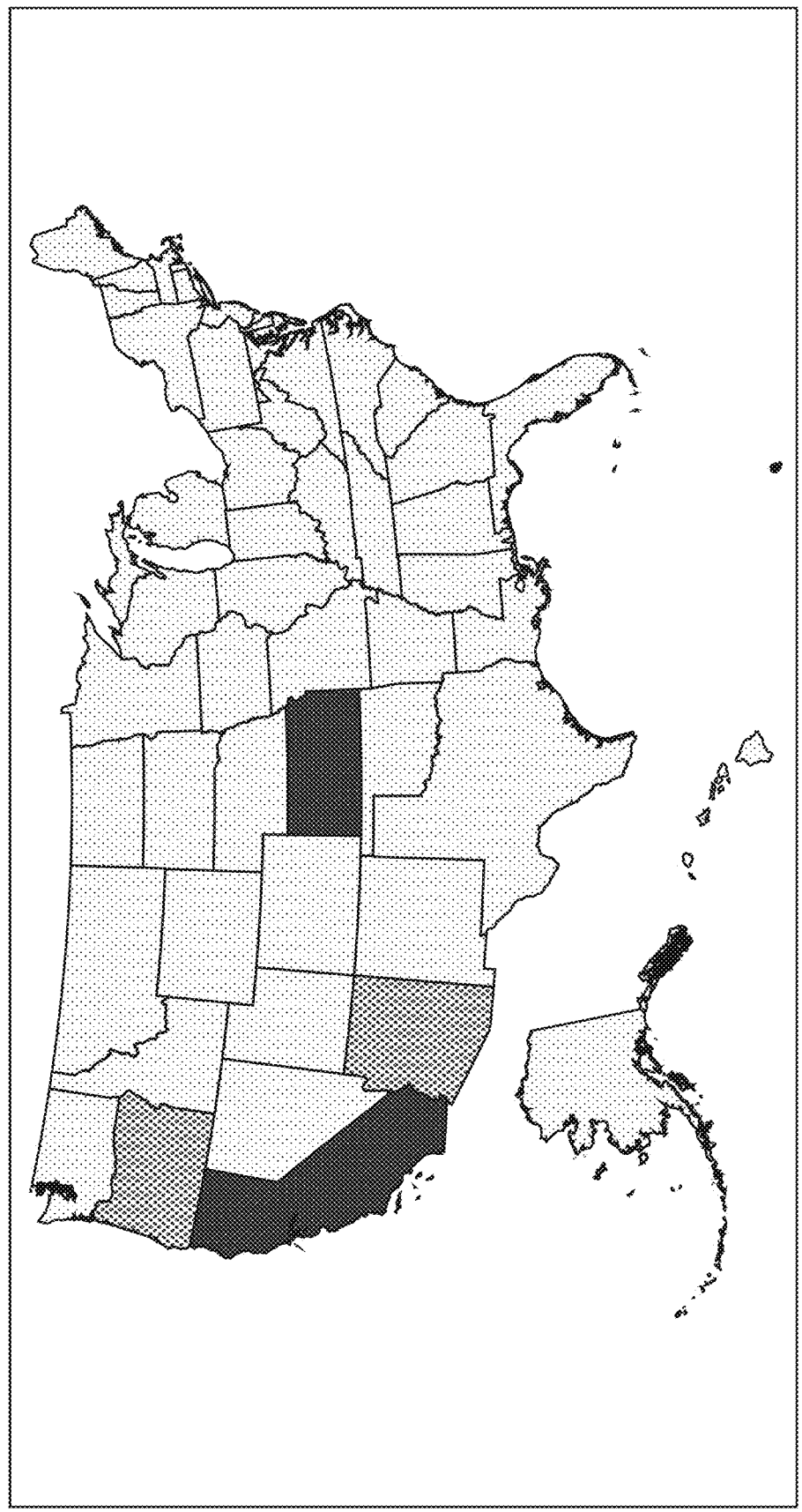
FIG. 49 is a map interface indicating the status of the building sites at particular geographic regions, according to an exemplary embodiment.

Referring now to FIG. 49, a map interface 4900 is shown, according to an exemplary embodiment. Each state or area in the map may be colored a particular color. The status of the sites in each area may be denoted by color. Green mean that the sites are good, yellow may mean that there are some minor problems or the sites are ok, while red may mean that there is danger. A user can select one of the areas (states) and navigate to another detailed interface, e.g., the interfaces 4900 and 5000 as described with reference to FIGS. 49 and 50.

Figure 50:
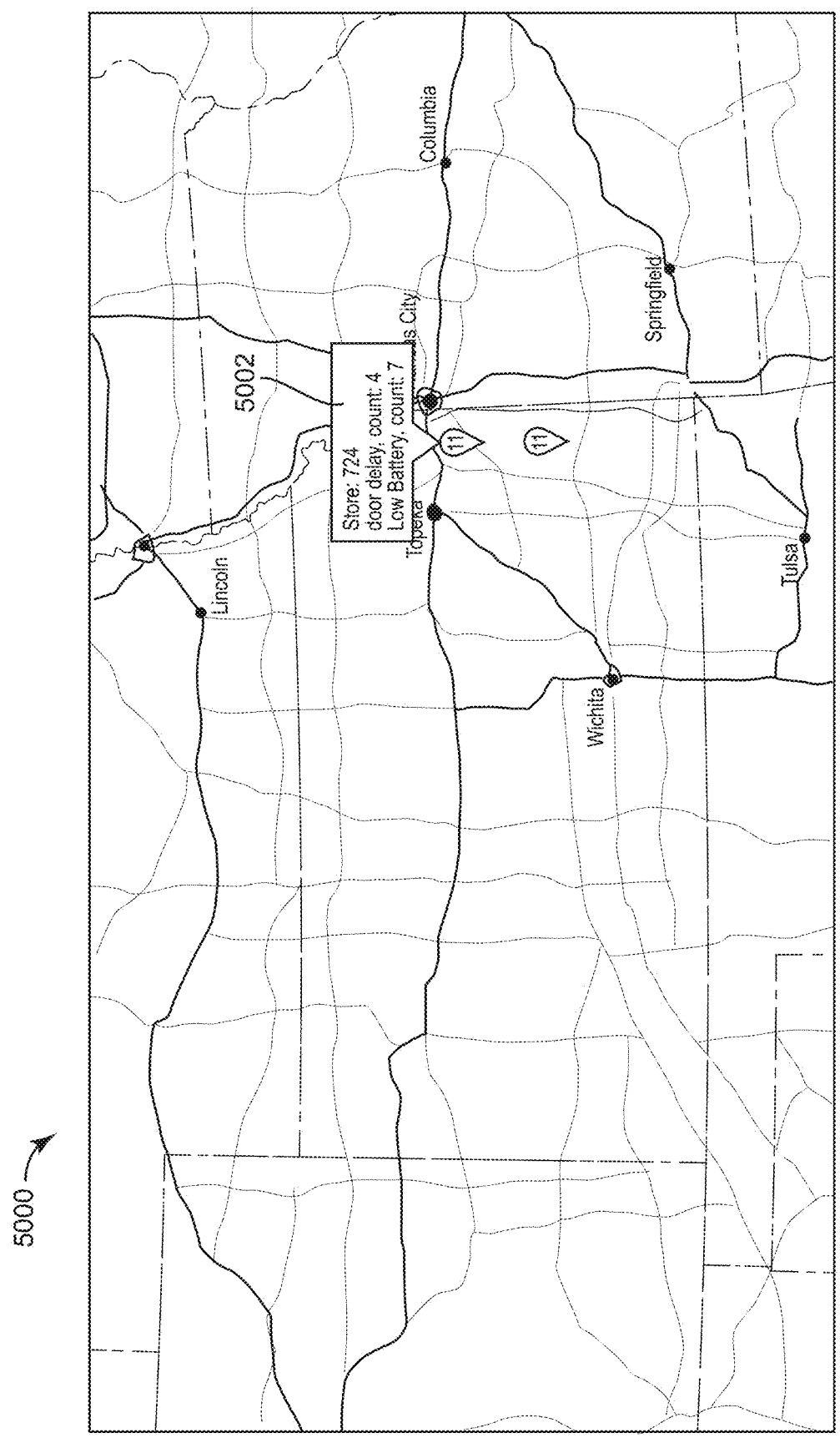
FIG. 50 is a map interface indicating the locations of one or more building sites, according to an exemplary embodiment.

Referring now to FIG. 50, a map interface 5000 with site markers is shown, according to an exemplary embodiment. On the map interface 5000, various sites are located via pins. Each pin may show a site number of otherwise may display the number of alarms triggered at the site. If a user hovers over the pin, a window 5002 may be displayed indicating additional information for the site. The window 5002 may display a store number, a door delay alarm count, a low battery alarm count, or the count of any other triggered alarm (e.g., addressable false alarm, triggered false alarm rule 518). In some embodiments, the map interface 5000 is divided into areas based on city, district, site locations, etc. The areas can be colored (e.g., red, green, yellow) based on the number of alarms triggered for the particular area.

Figure 51:
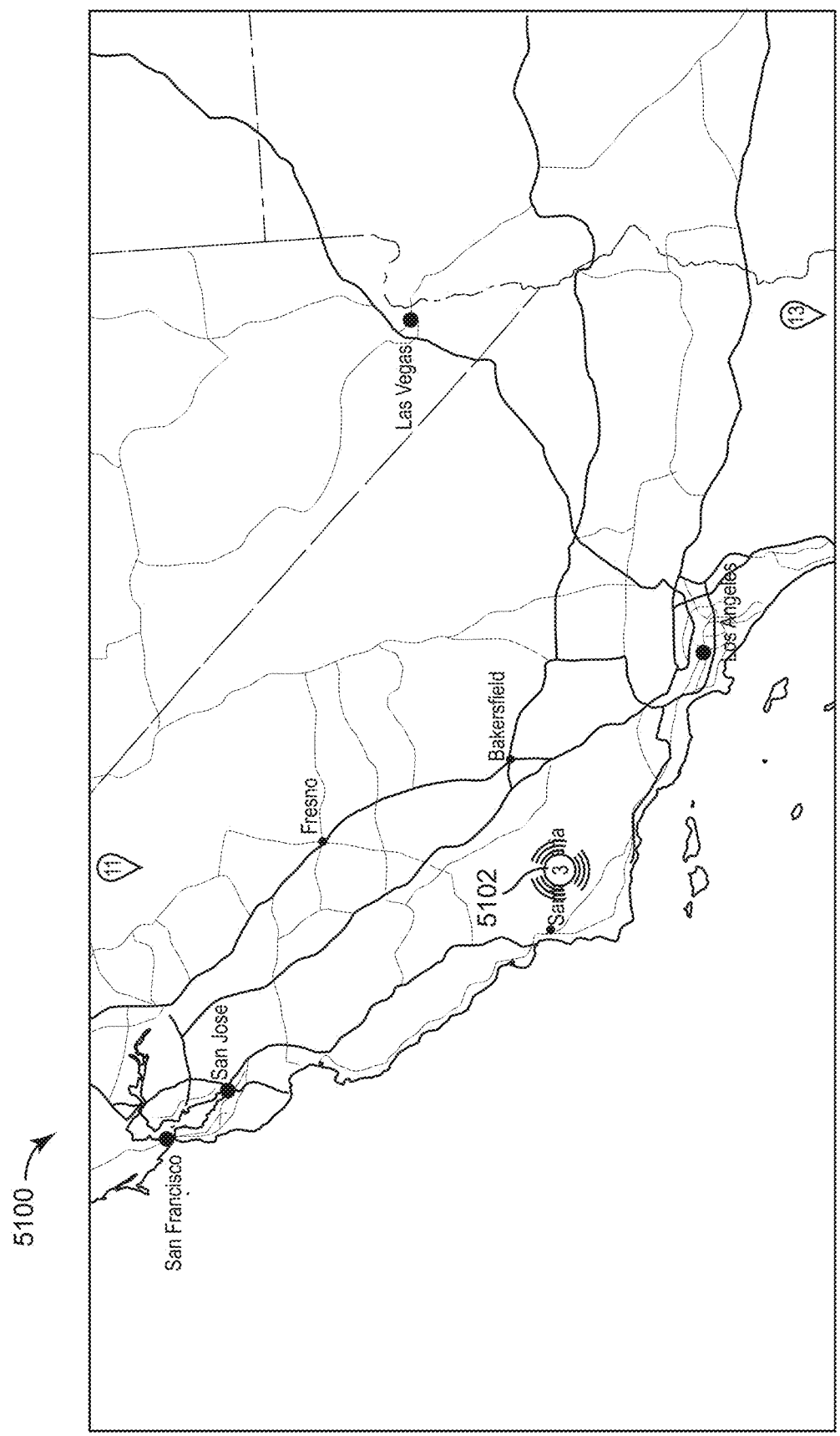
FIG. 51 is a map interface illustrating a cluster of building sites that are close together, according to an exemplary embodiment.

Referring now to FIG. 51, a map interface 5100 with a site cluster 5102 is shown, according to an exemplary embodiment. The map interface 5100 may indicate various stores via markers. If multiple stores are located within a predefined distance of each other, a cluster, e.g., the cluster 5102, may be displayed on the map interface 5100. The cluster may indicate the number of sites in the cluster or the number of alarms triggered for the sites of the cluster. The cluster may be a particular color, red, green, and/or yellow based on the number and/or severity of the alarms triggered for the sites of the cluster 5102.

Figure 52:
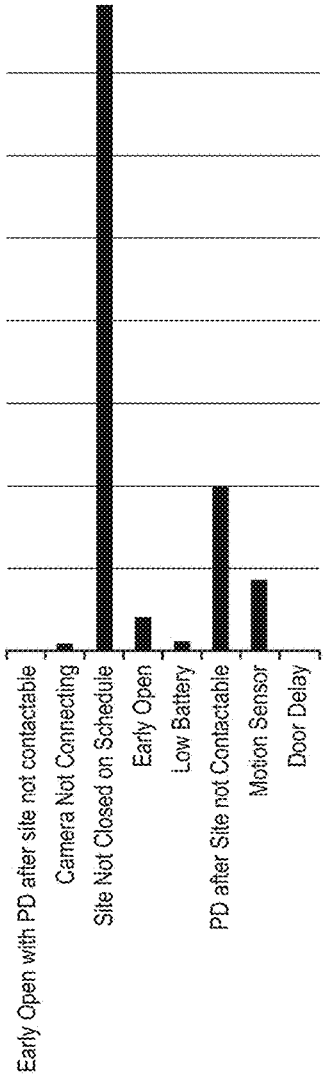
FIG. 52 is a chart illustrating alarm activity for various false alarm rules, according to an exemplary embodiment.
Figure 53:
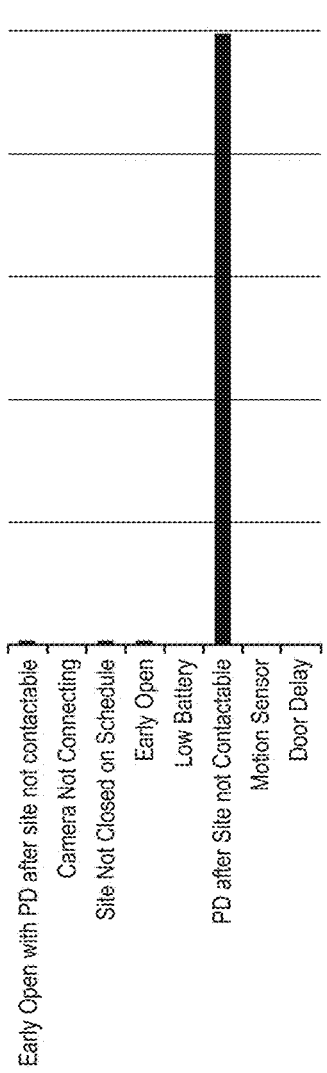
FIG. 53 is a chart illustrating police dispatches associated with various false alarm rules, according to an exemplary embodiment.

Referring now to FIGS. 52 and 53, exemplary reports of alarm activity and police dispatch activity are shown via charts 5200 and 5300, according to an exemplary embodiment. The charts 5200 and 5300 can be generated by dashboard generator 524 and included in the interfaces 3100-5100 and/or included in an exported report, e.g., a PDF report, a MICROSOFT® EXCEL report, etc. The dashboard generator 524 can be configured to record alarm activity and/or police dispatch activity associated with the false alarm rules 518. This data can be recorded for a day, a week, a month, a year, and for a particular building site, cluster of building sites, and/or national account. The dashboard generator 524 can be configured to generate the charts 5200 and 5300 to give insight to a user regarding alarm and police dispatch activity that can be prevented.

Figure 54:
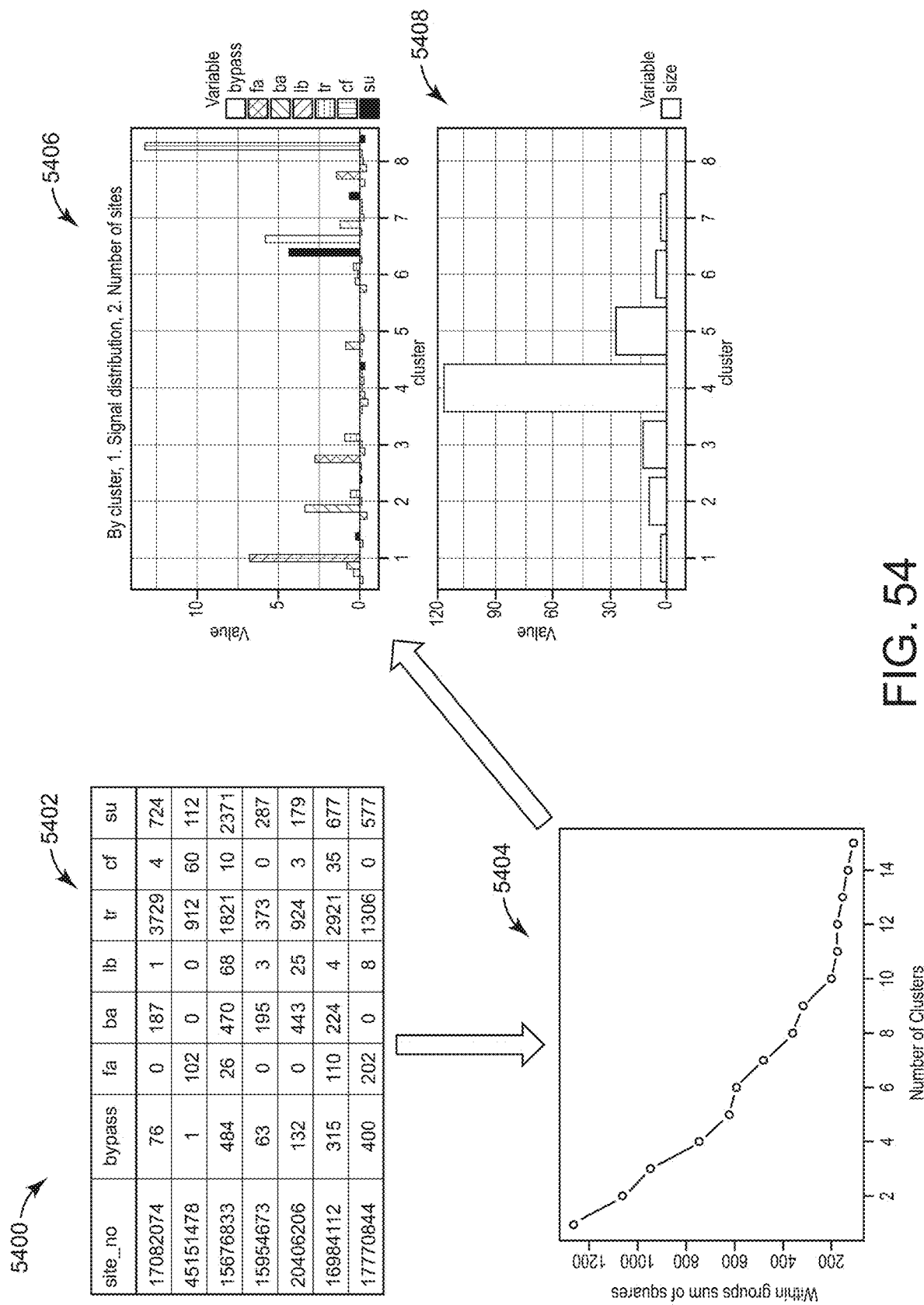
FIG. 54 is a set of graphs illustrating an exploratory data analysis of unsupervised clustering of building sites by signals, according to an exemplary embodiment.

Referring now to FIG. 54. a set of graphs 5400 for an exploratory data analysis of unsupervised clustering of building sites by signals is shown, according to an exemplary embodiment. From the graphs 5400, it can be seen that how events are recorded can be a good indication of how users operate building equipment (e.g., security panes). From the graphs 5400, it can be seen that since events can be indicative of how building equipment is operated, sequences of events can provide further insight into false alarms. Graph 5402 indicates data of various sites and the number of different events that occur at the sites (e.g., bypass events, fire alarm events, burglar alarm events, low battery events, etc.). These sites can be clustered in various numbers of clusters based on the number and type of events of each site. As shown in graph 5404, the greater the number of clusters, the lower the sum of squares for the clusters (e.g., less error). Graph 5406 indicates the number of events of eight clusters. As can be seen, the number and type of events of each cluster varies. However, as shown in graph 5408, although each cluster may have a different number and type of events, the majority of sites fall into the same cluster (cluster 4). Since the majority of sites behave in the same way, this can indicate that events are a good indication of how users are operating the building equipment of a site.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for generating a false alarm rule for preventing a false alarm that occurs at a building, the system comprising:
 a communications interface configured to receive building data from a plurality of building devices associated with the building, the building data comprising events; and
 a processing circuit configured to:
  receive, via the communications interface, the building data comprising the events of the plurality of building devices, wherein the events comprise a first non-alarm event, a second non-alarm event different than the first non-alarm event, and a false alarm event;

generate an event sequence based on the events, wherein the event sequence comprises at least the first non-alarm event and the second non-alarm event and indicates a relationship between at least the first non-alarm event and the second non-alarm event that is indicative of a situation at the building that causes the false alarm event to occur;

generate the false alarm rule based on the event sequence, wherein the false alarm rule comprises a recommendation for preventing the false alarm event from occurring;

receive first building data comprising first events associated with a first period of time;

determine a number of times that the false alarm rule triggered during the first period of time based on the first building data;

determine a predicted number of times that the false alarm rule will trigger in the future during a second period of time after the first period of time based on the number of times that the false alarm rule triggered during the first period of time; and generate an insight based on the predicted number of times the false alarm rule will trigger in the future during the second period of time and provide the insight to a user via a user device.

2. The system of claim 1, wherein the processing circuit is configured to:

provide, via the communications interface, the event sequence to a domain expert device of a domain expert; and receive the recommendation for the event sequence from the domain expert via the domain expert device;

wherein the processing circuit is configured to generate the false alarm rule based on the event sequence and further based on the recommendation received from the domain expert.

3. The system of claim 1, wherein the processing circuit is configured to select, via a classifier, the recommendation for the false alarm rule by selecting, based on the event sequence, the recommendation from a plurality of recommendations associated with a plurality of possible classifications of the classifier;

wherein the processing circuit is configured to generate the false alarm rule based on the event sequence and further based on the recommendation selected via the classifier.

4. The system of claim 1, wherein the processing circuit is configured to:

receive, via the communications interface, second events from the plurality of building devices;

determine, based on the second events, whether the false alarm rule is triggered; and provide the recommendation of the false alarm rule to the user via a user interface in response to determining that the false alarm rule is triggered.

5. The system of claim 4, wherein the processing circuit is configured to determine whether the false alarm rule is triggered by selecting, via a classifier, the false alarm rule from a plurality of false alarm rules based on the second events.

6. The system of claim 1, wherein the processing circuit is configured to generate the event sequence by:

generating grouped events by performing a parameter search to group the events based on one or more characteristics of the events; and performing a sequence analysis on the grouped events to generate the event sequence.

7. The system of claim 6, wherein performing the sequence analysis comprises performing at least one of a first order Markov chain analysis on the grouped events, a second order Markov chain analysis on the grouped events, or a General Sequential Pattern (GSP) mining analysis on the grouped events.

8. The system of claim 6, wherein performing the parameter search to group the events comprises at least one of:

searching the events based on a time window by identifying time related events that are associated with a time that is within the time window; or performing the parameter search to group the events by searching the events based on a spatial distance window by identifying distance related events that are associated with a location that is within the spatial distance window, wherein performing the parameter search based on the spatial distance window groups events that occur in a predefined area.

9. The system of claim 1, wherein the processing circuit is configured to determine the predicted number of times that the false alarm rule will trigger in the future by performing a Bayesian analysis on the first building data associated with the first period of time.

10. A method for generating a false alarm rule for preventing a false alarm that occurs at a building by one or more processing circuits, the method comprising:

receiving, by the one or more processing circuits, building data for building devices of the building, wherein the building data comprises events of the building devices, wherein the events comprise a first non-alarm event, a second non-alarm event different than the first non-alarm event, and a false alarm event;

generating, by the one or more processing circuits, an event sequence based on the events, wherein the event sequence comprises at least the first non-alarm event and the second non-alarm event and indicates a relationship between at least the first non-alarm event and the second non-alarm event that is indicative of a situation at the building that causes the false alarm event to occur;

generating, by the one or more processing circuits, the false alarm rule based on the event sequence, wherein the false alarm rule comprises a recommendation for preventing the false alarm event from occurring;

receiving, by the one or more processing circuits, first building data comprising first events associated with a first period of time;

determining, by the one or more processing circuits, a number of times that the false alarm rule triggered during the first period of time based on the first building data;

determining, by the one or more processing circuits, a predicted number of times that the false alarm rule will trigger in the future during a second period of time after the first period of time based on the number of times that the false alarm rule triggered during the first period of time; and generating, by the one or more processing circuits, an insight based on the predicted number of times the false alarm rule will trigger in the future during the second period of time and provide the insight to a user via a user device.

11. The method of claim 10, further comprising:
providing, by the one or more processing circuits, the event sequence to a domain expert device of a domain expert; and
receiving, by the one or more processing circuits, the recommendation for the event sequence from the domain expert via the domain expert device;
wherein generating, by the one or more processing circuits, the false alarm rule based on the event sequence comprises generating the false alarm rule further based on the recommendation received from the domain expert.

12. The method of claim 10, further comprising selecting, by the one or more processing circuits via a classifier, the recommendation for the false alarm rule by selecting, based on the event sequence, the recommendation from a plurality of recommendations associated with a plurality of possible classifications of the classifier;
wherein generating, by the one or more processing circuits, the false alarm rule based on the event sequence comprises generating the false alarm rule further based on the recommendation selected via the classifier.

13. The method of claim 10, further comprising:
receiving, by the one or more processing circuits, second events from the building devices;
determining, by the one or more processing circuits, whether the false alarm rule is triggered based on the second events; and
providing, by the one or more processing circuits, the recommendation of the false alarm rule to the user via a user interface in response to determining, by the one or more processing circuits, that the false alarm rule is triggered.

14. The method of claim 13, wherein determining, by the one or more processing circuits, whether the false alarm rule is triggered comprises selecting, via a classifier, the false alarm rule from a plurality of false alarm rules based on the second events.

15. The method of claim 10, wherein generating, by the one or more processing circuits the event sequence comprises:
generating grouped events by performing a parameter search to group the events based on one or more characteristics of the events; and
performing a sequence analysis on the grouped events to generate the event sequence.

16. The method of claim 15, wherein performing the sequence analysis comprises performing at least one of a first order Markov chain analysis on the grouped events, a second Markov chain analysis on the grouped events, or a General Sequential Pattern (GSP) mining analysis on the grouped events.

17. The method of claim 15, wherein performing the parameter search to group the events comprises at least one of:
searching the events based on a time window by identifying time related events that are associated with a time that is within the time window; or
performing the parameter search to group the events by searching the events based on a spatial distance window by identifying distance related events that are associated with a location that is within the spatial distance window, wherein performing the parameter search based on the spatial distance window groups events that occur in a predefined area.

18. A non-transitory computer readable medium having machine instructions stored therein, the instructions being executable by a processor of a building management system to perform operations comprising:
receiving building data for building devices of a building, wherein the building data comprises events of the building devices, wherein the events comprise a first non-alarm event, a second non-alarm event different than the first non-alarm event, and a false alarm event;
generating an event sequence based on the events, wherein the event sequence comprises at least the first non-alarm event and the second non-alarm event and indicates a relationship between at least the first non-alarm event and the second non-alarm event that is indicative of a situation at the building that causes the false alarm event to occur;
generating a false alarm rule based on the event sequence, wherein the false alarm rule comprises a recommendation for preventing the false alarm event from occurring;
receiving second events from the building devices;
determining whether the false alarm rule is triggered based on the second events;
providing the recommendation of the false alarm rule to a user via a user interface in response to determining that the false alarm rule is triggered;
receiving first building data comprising first events associated with a first period of time;
determining a number of times that the false alarm rule triggered during the first period of time based on the first building data;
determining a predicted number of times that the false alarm rule will trigger in the future during a second period of time after the first period of time based on the number of times that the false alarm rule triggered during the first period of time; and
generating an insight based on the predicted number of times the false alarm rule will trigger in the future during the second period of time and provide the insight to the user via a user device.

19. The non-transitory computer readable medium of claim 18, wherein generating the event sequence comprises:
generating grouped events by performing a parameter search to group the events based on one or more characteristics of the events, wherein performing the parameter search to group the events comprises at least one of:
searching the events based on a time window by identifying time related events that are associated with a time that is within the time window; or
performing the parameter search to group the events by searching the events based on a spatial distance window by identifying distance related events that are associated with a location that is within the spatial distance window, wherein performing the parameter search based on the spatial distance window groups events that occur in a predefined area; and
performing a sequence analysis on the grouped events to generate the event sequence wherein performing the sequence analysis comprises performing at least one of a first order Markov chain analysis on the grouped events, a second Markov chain analysis on the grouped events, or a General Sequential Pattern (GSP) mining analysis on the grouped events.

20. The non-transitory computer readable medium of claim 18, wherein the operations further comprise:

providing, via a communications interface, the event sequence to a domain expert device of a domain expert; and receiving the recommendation for the event sequence from the domain expert via the domain expert device;

wherein generating the false alarm rule based on the event sequence is based on the recommendation received from the domain expert.

* * * * *